US006791233B2

(12) United States Patent
Tomonari et al.

(10) Patent No.: US 6,791,233 B2
(45) Date of Patent: Sep. 14, 2004

(54) SEMICONDUCTOR DEVICE

(75) Inventors: Shigeaki Tomonari, Osaka (JP); Hitoshi Yoshida, Osaka (JP); Masanao Kamakura, Osaka (JP); Hiroshi Kawada, Osaka (JP); Masaaki Saito, Osaka (JP); Kazuhiro Nobutoki, Mie (JP); Jun Ogihara, Osaka (JP); Shuichi Nagao, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/053,576

(22) Filed: Jan. 24, 2002

(65) Prior Publication Data
US 2003/0160538 A1 Aug. 28, 2003

Related U.S. Application Data

(62) Division of application No. 09/511,948, filed on Feb. 23, 2000, now Pat. No. 6,384,509.

(30) Foreign Application Priority Data

Feb. 23, 1999 (JP) .......................................... P 11-045592
Feb. 23, 1999 (JP) .......................................... P 11-045615

(51) Int. Cl.$^7$ ............................................... H02N 10/00
(52) U.S. Cl. ......................................... 310/307; 251/11
(58) Field of Search ............................ 310/307; 251/11, 251/129.04, 369

(56) References Cited

U.S. PATENT DOCUMENTS

| 1,258,368 A | 3/1918 | Smith ........................ 194/283 |
| 4,115,750 A | 9/1978 | Hansen et al. ............... 337/107 |
| 5,058,856 A | 10/1991 | Gordon et al. ................ 251/11 |
| 5,059,133 A | 10/1991 | Hikami et al. .............. 439/161 |
| 5,069,419 A | 12/1991 | Jerman ........................ 251/11 |
| 5,271,597 A | 12/1993 | Jerman ........................ 251/11 |

(List continued on next page.)

FOREIGN PATENT DOCUMENTS

| JP | 7-286258 | 10/1995 | .......... C23C/14/00 |
| JP | 9-88805 | 3/1997 | ............. F03G/7/06 |
| JP | 9-229222 | * 9/1997 | .......... F16K/31/02 |
| JP | 10-173306 | 6/1998 | ............. H05K/1/14 |
| JP | 2000-309000 | * 11/2000 | ............. B81B/3/00 |
| JP | 2001-153252 | * 6/2001 | ............. F16K/31/02 |
| JP | 2000-317897 | * 11/2001 | ............. B81B/3/00 |

OTHER PUBLICATIONS

"Silicon Microvalves for Gas Flow Control" Phillip W. Barth, Ph.D. Hewlett–Packard Laboratorisspp 276–279 The 8$^{th}$ International on Solid–State Sensors and Actuators, and Eurosensors IX. Stockholm, Sweden, Jun. 25–29, 1995 (in parent case 09/511,948 now USP 6,384,509).

(List continued on next page.)

Primary Examiner—Thomas M. Dougherty
(74) Attorney, Agent, or Firm—Nixon & Vanderhye P.C.

(57) ABSTRACT

A flexible area 2 is joined at one end via a thermal insulation area 7 to a semiconductor substrate 3 which becomes a frame and at an opposite end to a moving element 5. The thermal insulation area 7 is made of a thermal insulation material a resin such as polyimide or a fluoridated resin. The flexible area 2 is made up of a thin portion 2S and a thin film 2M different in thermal expansion coefficient. When a diffused resistor 6 formed on the surface of the thin portion 2S is heated, the flexible area 2 is displaced because of the thermal expansion difference between the thin portion 2S and the thin film 2M, and the moving element 5 is displayed with respect to the semiconductor substrate 3.

24 Claims, 56 Drawing Sheets

U.S. PATENT DOCUMENTS

| | | | |
|---|---|---|---|
| 5,441,597 A | * 8/1995 | Bonne et al. | 216/2 |
| 5,529,279 A | 6/1996 | Beatty et al. | 251/11 |
| 5,681,024 A | 10/1997 | Lisec et al. | 251/11 |
| 5,870,007 A | 2/1999 | Carr et al. | 333/262 |
| 5,920,417 A | 7/1999 | Johnson | 359/223 |
| 6,044,646 A | 4/2000 | Silverbrook | 1/528 |
| 6,087,638 A | 7/2000 | Silverbrook | 219/540 |
| 6,114,794 A | 9/2000 | Dhuler et al. | 310/307 |
| 6,124,663 A | 9/2000 | Haake et al. | 310/307 |
| 6,168,395 B1 | * 1/2001 | Quenzer et al. | 417/413.3 |
| 6,382,588 B1 | * 5/2002 | Hierold | 251/129.04 |
| 6,384,509 B1 | * 5/2002 | Tomonari et al. | 310/307 |
| 6,557,820 B2 | * 5/2003 | Wetzel et al. | 251/30.02 |
| 6,626,417 B2 | * 9/2003 | Winger et al. | 251/129.06 |
| 6,644,786 B1 | * 11/2003 | Lebens | 347/54 |

OTHER PUBLICATIONS

"Electrically–Activated, Micromachined Diaphragm Valves" Hal Jerman IC Sensors Milpitas, CA 95035 pp 363–367 (in parent case 09/511,948, now usp 6,384,509).

* cited by examiner

SEMICONDUCTOR DEVICE

This is a Division of application Ser. No. 09/511,948, filed Feb. 23, 2000, now U.S. Pat. No. 6,384,509.

BACKGROUND OF INVENTION

1. Field of Invention

This invention relates to a semiconductor device made up of a semiconductor substrate, a flexible area isolated from the semiconductor substrate and displaced in response to temperature change, and a heat insulation area placed between the semiconductor substrate and the flexible area, a semiconductor microactuator using the semiconductor device, a semiconductor microvalve, a semiconductor microrelay, and a semiconductor microactuator manufacturing method.

2. Related Art

A semiconductor microactuator includes at least two materials having different thermal expansion coefficients in combination as a bimetal structure wherein the bimetal structure is heated and the difference between the thermal expansion coefficients is used to provide displacement is available as a mechanism using a semiconductor device made up of a semiconductor substrate, a flexible area isolated from the semiconductor substrate and displaced in response to temperature change, and a heat insulation area placed between the semiconductor substrate and the flexible area. The semiconductor microactuator is disclosed in U.S. Pat. No. 5,069,419 "Semiconductor microactuator."

A semiconductor microactuator described in U.S. Pat. No. 5,069,419 is as shown in FIG. 53 (top view) and FIG. 54 (sectional view); it has a flexible area of a bimetal structure comprising an aluminum thin film 304 formed in a part of a silicon diaphragm 300. If an electric current is made to flow into a heater 301 formed in the silicon diaphragm 300, heat is generated and the temperature of the diaphragm 300 rises. Since silicon and aluminum differ largely in thermal expansion coefficient, a thermal stress occurs, bending the diaphragm 300, producing displacement of a moving part 305 placed contiguous with the diaphragm 300. To provide efficient displacement, a hinge 303 of a silicon dioxide thin film is placed between the periphery of the diaphragm 300 and a silicon frame 302 of a semiconductor substrate for preventing heat generated in the diaphragm 300 from escaping to the silicon frame 302.

However, considering the current state of application, it is desired to furthermore decrease the heat loss. Specifically, the heat escape (heat loss) is thought of as power (consumption power) supplied all the time to maintain the diaphragm 300 at a predetermined temperature (for example, 150° C.).

Then, it is desired that the power consumption is 100 mW or less considering miniature, portable battery-driven applications.

Further, as examples of semiconductor microrelays in related arts, semiconductor microrelays are disclosed in JP-A-6-338244 and JP-A-7-14483. The semiconductor microrelays disclosed therein will be discussed with reference to the accompanying drawing.

FIG. 55 is a sectional view to show the structure of the semiconductor microrelay in the related art. As shown in FIG. 55, the semiconductor microrelay has a cantilever beam 313 having a first thermal expansion coefficient and made of a silicon monocrystalline substrate 312 with an opposite end supported so that one end can be moved. On the rear side of the cantilever beam 313, the semiconductor microrelay has a metal layer 315 having a second thermal expansion coefficient larger than the first thermal expansion coefficient via a conductive layer 315. On the main surface of the cantilever beam 313, a contact circuit 317 is provided via an oxide film 314 on the one end side. Also, a heater circuit 318 is provided via the oxide film 314 on the roughly full face of the main surface of the cantilever beam 313.

On the other hand, an opposed contact part 320 having a conductive layer 319 as an opposed surface is provided at a position facing the contract circuit 317 with a predetermined space above the contract circuit 317. An electric current is made to flow into the heater circuit 318, whereby the heater circuit 318 is heated. Thus, a flexible area consisting of the cantilever beam 313 and the metal layer 316 is heated. At this time, the thermal expansion coefficient of the metal layer 316 is set larger than that of the cantilever beam 313, so that the cantilever beam 313 and the metal layer 316 are displaced upward. Therefore, the contact circuit 317 provided on the one end of the cantilever beam 313 is pressed against the opposed contact part 320 and is brought into conduction. Such a bimetal-driven relay enables an increase in the contact spacing and an increase in the contact load as compared with a conventional electrostatically driven relay. Thus, a relay with small contact resistance and good reliability with less welds, etc., can be provided.

However, the semiconductor microrelay in the related art also involves the following problem: To drive the relay, it is necessary to make an electric current flow into the heater circuit 318 provided on the main surface of the cantilever beam 313 for heating the cantilever beam 313 and the metal layer 316. However, the silicon monocrystal forming the cantilever beam 313 is a material having very good thermal conductivity, the cantilever beam 313 is connected at the opposite end to the silicon monocrystalline substrate 312, and large heat is escaped from the cantilever beam 313 to the silicon monocrystalline substrate 312, so that it becomes extremely difficult to raise the temperature of the cantilever beam 313 with small power consumption.

That is, with the semiconductor microrelay in the related art, large power must be supplied all the time to maintain the conduction state. The value is extremely large as compared with a mechanical relay that can be driven with several ten mW. For practical use, realizing low power consumption is a large challenge.

SUMMARY OF INVENTION

As described above, the semiconductor microactuator using the semiconductor device, the semiconductor microvalve, and the semiconductor microrelay in the related arts require large power consumption and thus it becomes difficult to drive them with a battery and it is made impossible to miniaturize them for portable use.

It is therefore an object of the invention to provide a semiconductor device with small power consumption, manufactured by an easy manufacturing process, a semiconductor microactuator using the semiconductor device, a semiconductor microvalve, a semiconductor microrelay, and a semiconductor microactuator manufacturing method.

To the end, according to a first aspect of the present invention, there is provided a semiconductor device comprising a semiconductor substrate, a flexible area being isolated from the semiconductor substrate and displaced in response to temperature change, and a thermal insulation area being placed between the semiconductor substrate and the flexible area and made of a resin for joining the semiconductor substrate and the flexible area. The thermal insulation area made of a resin is placed between the semiconductor substrate and the flexible area, whereby heat escape when the temperature of the flexible area is changed is prevented, so that power consumption can be suppressed and further the manufacturing method is simple.

In a second aspect to the present invention, in the semiconductor device as first aspect of the present invention, the material of which the thermal insulation area is made has a thermal conductivity coefficient of about 0.4 W/(m° C.) or less. The heat insulation properties between the flexible area and the semiconductor substrate are enhanced.

In a third aspect of the present invention, in the semiconductor device as the second aspect of the present invention, the material of which the thermal insulation area is made is polyimide. The heat insulation properties between the flexible area and the semiconductor substrate are enhanced and manufacturing the semiconductor device is facilitated.

In a fourth aspect of the present invention, in the third aspect of the present invention, the material of which the thermal insulation area is made is a fluoridated resin. The heat insulation properties between the flexible area and the semiconductor substrate are enhanced and manufacturing the semiconductor device is facilitated.

In a fifth aspect of the present invention, in the first to fourth aspect of the present invention, a reinforcement layer made of a harder material than the material of which the thermal insulation area is made is provided on at least one face orthogonal to a thickness direction of the thermal insulation area. The joint strength of the semiconductor substrate and the flexible area can be increased.

In a sixth aspect of the present invention, in the fifth aspect of the present invention, the reinforcement layer has a Young's modulus of $9.8 \times 10^9$ N/m$^2$ or more. The joint strength of the semiconductor substrate and the flexible area can be increased.

In a seventh aspect of the present invention, in the sixth aspect of the present invention, the reinforcement layer is a silicon dioxide thin film. The joint strength of the semiconductor substrate and the flexible area can be increased.

In an eighth aspect of the present invention, in the first to seventh aspect of the present invention, the portions of the semiconductor substrate and the flexible area in contact with the thermal insulation area form comb teeth. The joint strength of the semiconductor substrate and the flexible area can be increased.

According to a ninth aspect of the present invention, there is provided a semiconductor device comprising a semiconductor device as the first to eighth aspect of the present invention and a moving element placed contiguous with the flexible area, wherein when temperature of the flexible area changes, the moving element is displaced relative to the semiconductor substrate. The semiconductor device which has similar advantages to those in the invention as claimed in claims 1 to 8 as well as can be driven with low power consumption can be provided.

In a tenth aspect of the present invention, in the ninth aspect of the present invention, the flexible area has a cantilever structure. The semiconductor device can be provided with large displacement of the moving element.

In an eleventh aspect of the present invention, in ninth aspect of the present invention, the moving element is supported by a plurality of flexible areas. The moving element can be supported stably.

In a twelfth aspect of the present invention, in the eleventh aspect of the present invention, the flexible areas are in the shape of a cross with the moving element at the center. Good displacement accuracy of the moving element can be provided.

In a thirteenth aspect of the present invention, in the ninth aspect of the present invention, displacement of the moving element contains displacement rotating in a horizontal direction to a substrate face of the semiconductor substrate. The displacement of the moving element becomes large.

In a fourteenth aspect of the present invention, in the eleventh or thirteenth aspect of the present invention, the flexible areas are four flexible areas each shaped like L, the four flexible areas being placed at equal intervals in every direction with the moving element at the center. The lengths of the flexible areas can be increased, so that the displacement of the moving element can be made large.

In a fifteenth aspect of the present invention, in the ninth to fourteenth aspect of the present invention, the flexible area is made up of at least two areas having different thermal expansion coefficients and is displaced in response to the difference between the thermal expansion coefficients. As the temperature of the flexible area is changed, the flexible area can be displaced.

In a sixteenth aspect of the present invention, in the fifteenth aspect of the present invention, the flexible area includes an area made of silicon and an area made of aluminum. As the temperature of the flexible area is changed, the flexible area can be displaced because of the thermal expansion difference between aluminum and silicon.

In a seventeenth aspect of the present invention, in the fifteenth aspect of the present invention, the flexible area includes an area made of silicon and an area made of nickel. As the temperature of the flexible area is changed, the flexible area can be displaced because of the thermal expansion difference between nickel and silicon.

In a eighteenth aspect of the present invention, in the fifteenth aspect of the present invention, at least one of the areas making up the flexible area is made of the same material as the thermal insulation area. Since the flexible area and the thermal insulation area can be formed at the same time, the manufacturing process is simplified and the costs can be reduced.

In a nineteenth aspect of the present invention, in the eighteenth aspect of the present invention, the flexible area includes an area made of silicon and an area made of polyimide as the area made of the same material as the thermal insulation area. In addition to a similar advantage to that in the invention, as the temperature of the flexible area is changed, the flexible area can be displaced because of the thermal expansion difference between silicon and polyimide, and the heat insulation properties of the flexible area owing to polyimide.

In a twentieth aspect of the present invention the invention, in the eighteenth aspect of the present invention, the flexible area includes an area made of silicon and an area made of a fluoridated resin as the area made of the same material as the thermal insulation area. In addition to a similar advantage, as the temperature of the flexible area is changed, the flexible area can be displaced because of the thermal expansion difference between silicon and the fluoridated resin, and the heat insulation properties of the flexible area owing to the fluoridated resin.

In a twenty-first aspect of the present invention, in the ninth to fourteenth aspect of the present invention, the flexible area is made of a shape memory alloy. As the temperature of the flexible area is changed, the flexible area can be displaced.

In a twenty-second aspect of the present invention, in the ninth to twenty-first aspect of the present invention, a thermal insulation area made of a resin for joining the flexible area and the moving element is provided between the flexible area and the moving element. The heat insulation properties between the flexible area and the moving element can be provided and power consumption when the temperature of the flexible area is changed can be more suppressed.

In a twenty-third aspect of the present invention, in the twenty-second aspect of the present invention, wherein rigidity of the thermal insulation area provided between the semiconductor substrate and the flexible area is made different from that of the thermal insulation area provided between the flexible area and the moving element. The displacement direction of the moving element can be determined depending on the rigidity difference between the thermal insulation areas.

In a twenty-fourth aspect of the present invention, in the ninth to twenty-third aspects of the present invention, the flexible area contains heat means for heating the flexible area. The semiconductor device can be miniaturized.

In a twenty-fifth aspect of the present invention, in the ninth to twenty-fifth aspects of the present invention, wiring for supplying power to the heat means for heating the flexible area is formed without the intervention of the thermal insulation area. The heat insulation distance of the wiring can be increased and the heat insulation properties of the flexible area can be enhanced.

In a twenty-sixth aspect of the present invention, in the ninth to twenty-fifth aspect of the present invention, the moving element is formed with a concave part. The heat capacity of the moving element is lessened, so that the temperature change of the flexible area can be accelerated.

In a twenty-seventh aspect of the present invention, in the ninth to twenty-sixth aspects of the present invention, a round for easing a stress is provided in the proximity of the joint part of the flexible area and the moving element or the semiconductor substrate. The stress applied in the proximity of the joint part when the flexible area is displaced is spread by means of the round, whereby the part can be prevented from being destroyed.

In a twenty-eighth aspect of the present invention, in the twenty-seventh aspect of the present invention, the semiconductor substrate is formed with a projection part projecting toward the joint part to the flexible area and the round is formed so that the shape of the round on the substrate face on the semiconductor substrate becomes like R at both ends of the base end part of the projection part. The stress applied to both ends of the base end part of the projection part when the flexible area is displaced is spread by means of the round, whereby the portion can be prevented from being destroyed.

In a twenty-ninth aspect of the present invention, in twenty-seventh aspect of the present invention, the semiconductor substrate is etched from the substrate face to make a concave part, the flexible area is formed in a bottom face part of the concave part, and the round is formed so as to become shaped like R on the boundary between the bottom face part and a flank part of the concave part. The stress applied to the boundary between the bottom face part and the flank part of the concave part when the flexible area is displaced is spread by means of the round, whereby the portion can be prevented from being destroyed.

According to a thirtieth aspect of the present invention, there is provided a semiconductor microvalve comprising a semiconductor device in any of ninth to twenty-ninth aspects and a fluid element being joined to the semiconductor device and having a flow passage with a flowing fluid quantity changing in response to displacement of the moving element. The semiconductor microvalve which has similar advantages in ninth to twenty-ninth aspect of the present invention as well as can be driven with low power consumption can be provided.

In a thirty-first aspect of the present invention, in the thirties of the present invention, the semiconductor device and the fluid element are joined by anodic junction. It is made possible to join the semiconductor device and the fluid element.

In a thirty-second aspect of the present invention, in the thirties aspect of the present invention, the semiconductor device and the fluid element are joined by eutectic junction. It is made possible to join the semiconductor device and the fluid element.

In a thirty-third aspect of the present invention, in the thirtieth aspect of the present invention, the semiconductor device and the fluid element are joined via a spacer layer. The thermal expansion difference between the semiconductor device and the fluid element when they are joined is absorbed in the spacer layer and the stress applied to the flexible area can be suppressed.

In a thirty-fourth aspect of the present invention, in the thirty-third aspect of the present invention, the spacer layer is made of polyimide. The thermal expansion difference between the semiconductor device and the fluid element when they are joined is absorbed because of elasticity of polyimide and the stress applied to the flexible area can be suppressed.

According to a thirty-fifth aspect of the present invention, there is provided a semiconductor microrelay comprising a semiconductor device as the ninth to twenty ninth aspect of the present invention and a fixed element being joined to the semiconductor device and having fixed contacts being placed at positions corresponding to a moving contact provided on the moving element, the fixed contacts being able to come in contact with the moving contact. The semiconductor microrelay which has similar advantages to those in the invention as claimed in claims 9 to 29 as well as can be driven with low power consumption can be provided.

In a thirty-sixth aspect of the present invention, in the thirty-fifth aspect of the present invention, the fixed contacts are placed away from each other and come in contact with the moving contact, whereby they are brought into conduction via the moving contact. The semiconductor microrelay wherein the fixed contacts placed away from each other can be brought into conduction can be provided.

In a thirty-seventh aspect of the present invention, in the thirty-fifth or thirty-sixth aspect of the present invention, the moving contact and the fixed contacts are gold cobalt. The moving contact and the fixed contacts can be brought into conduction.

In a thirty-eighth aspect of the present invention, in the thirty-fifth to thirty-seventh aspect of the present invention, the semiconductor device and the fixed element are joined by anodic junction. It is made possible to join the semiconductor device and the fixed element.

In a thirty-ninth aspect of the present invention, in the thirty-fifth to thirty-seventh aspect of the present invention, the semiconductor device and the fixed element are joined by eutectic junction. It is made possible to join the semiconductor device and the fixed element.

In a fortieth aspect of the present invention, in the thirty-fifth to thirty-seventh aspect of the present invention, the semiconductor device and the fixed element are joined via a spacer layer. The thermal expansion difference between the semiconductor device and the fluid element when they are joined is absorbed in the spacer layer and the stress applied to the flexible area can be suppressed.

In a forty-first aspect of the present invention, in the fortieth aspect of the present invention, the spacer layer is made of polyimide. The thermal expansion difference between the semiconductor device and the fluid element when they are joined is absorbed because of elasticity of polyimide and the stress applied to the flexible area can be suppressed.

According to a forty-second aspect of the present invention, there is provided a manufacturing method of a semiconductor device in the eighteenth aspect of the present invention prepared by a process comprising the steps of:

etching and removing one face of the semiconductor substrate to form a bottom face part as one area forming a part of the flexible area;

etching and removing the other face of the semiconductor substrate to form the concave part in the moving element;

etching and removing the other face of the semiconductor substrate to form at least a portion which becomes the thermal insulation area placed between the semiconductor substrate and the flexible area;

filling the portion which becomes the thermal insulation area with a thermal insulation material to form the thermal insulation area; and applying a coat of the thermal insulation material to the one face of the semiconductor substrate to form one area forming a part of the flexible area.

The thermal insulation area and one area forming a part of the flexible area are formed of the same material at the same time, whereby the manufacturing process is simplified and the costs can be reduced.

According to a forty-third aspect of the present invention, there is provided a manufacturing method of a semiconductor device in sixteenth aspect of the present invention prepared by a process comprising the steps of:

etching and removing one face of the semiconductor substrate to form a bottom face part as one area forming a part of the flexible area;

etching and removing the other face of the semiconductor substrate to form the concave part in the moving element;

etching and removing the other face of the semiconductor substrate to form at least a portion which becomes the thermal insulation area placed between the semiconductor substrate and the flexible area;

forming an aluminum thin film as an area defined in the flexible area on the other face of the semiconductor substrate and a wire for applying an electric power to the heating means;

filling the portion which becomes the thermal insulation area with a thermal insulation material to form the thermal insulation area.

whereby the manufacturing process is simplified and the costs can be reduced.

According to a forty-fourth aspect of the present invention, there is provided a manufacturing method of a semiconductor device in seventeenth aspect of the present invention prepared by a process comprising the steps of:

etching and removing one face of the semiconductor substrate to form a bottom face part as one area forming a part of the flexible area;

etching and removing the other face of the semiconductor substrate to form the concave part in the moving element;

etching and removing the other face of the semiconductor substrate to form at least a portion which becomes the thermal insulation area placed between the semiconductor substrate and the flexible area;

forming a wire for applying an electric power to the heating means;

filling the portion which becomes the thermal insulation area with a thermal insulation material to form the thermal insulation area; and forming a nickel thin film as an area defined in the flexible area on the other face of the semiconductor substrate.

According to a forty-fifth aspect of the present invention there is provided a manufacturing method of a semiconductor device in the first aspect of the present invention prepared by a process comprising the steps of:

etching and removing one face of the semiconductor substrate to form at least a portion which becomes the thermal insulation area placed between the semiconductor substrate and the flexible area;

filling the portion which becomes the thermal insulation area with a thermal insulation material to form the thermal insulation area; and etching and removing the other face of the semiconductor substrate to form the thermal insulation area.

According to a forty-sixth aspect of the present invention, there is provided a manufacturing method of a semiconductor device in the fifth aspect of the present invention prepared by a process comprising the steps of:

etching and removing one face of the semiconductor substrate to form at least a portion which becomes the thermal insulation area placed between the semiconductor substrate and the flexible area;

forming a reinforce layer in the thermal insulation area;

filling the portion which becomes the thermal insulation area with a thermal insulation material to form the thermal insulation area; and etching and removing the other face of the semiconductor substrate to form the thermal insulation area.

This invention is carried out paying attention to the fact that a resin material such as polyimide or a fluoridated resin has high heat insulation properties (about 80 times those of silicon dioxide) and further is liquid and easy to work and that a thin film having any desired thickness (several $\mu$m to several ten $\mu$m) can be easily provided by a semiconductor manufacturing process of spin coat, etc.

BRIEF DESCRIPTION OF THE DRAWINGS

In the accompanying drawings:

FIG. 4(a) is a schematic drawing, FIG. 4(b) is a distribution drawing, and FIG. 4(c) is a distribution drawing;

FIGS. 15(a) to 15(e) are sectional views to show a manufacturing method of the semiconductor microactuator in FIG. 13;

DETAILED DESCRIPTION OF PREFERRED EMBODIMENTS

Principal of Present Invention

Figure 1:
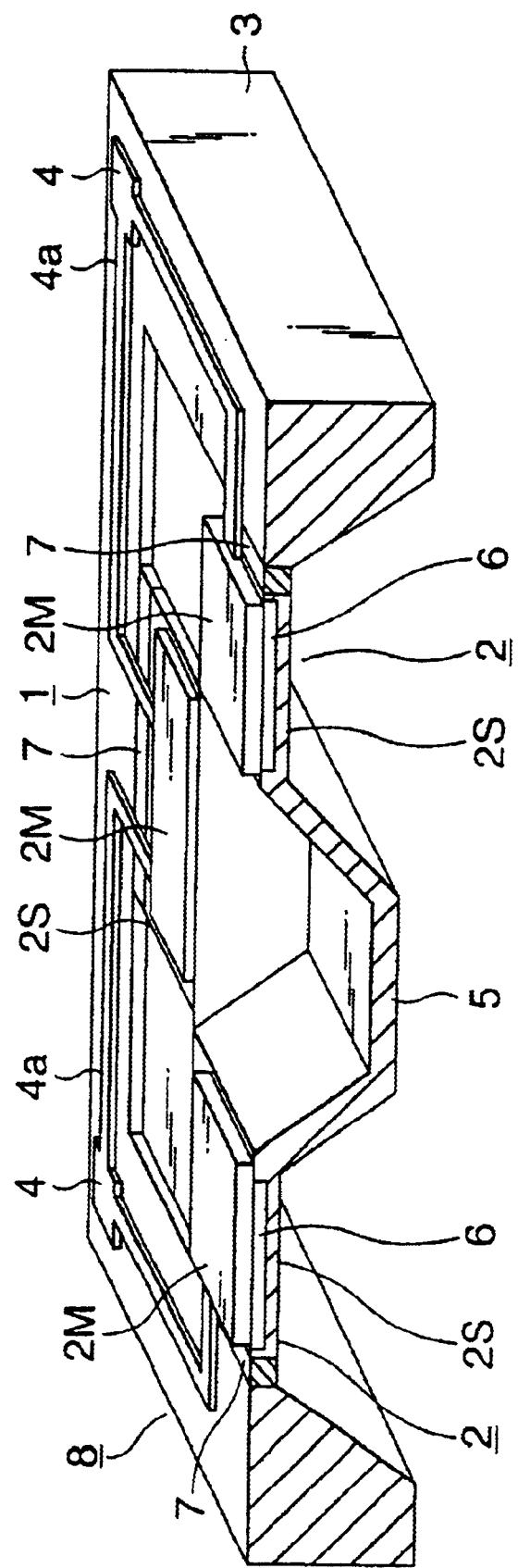
FIG. 1 is a partially cutaway view in perspective of the structure of a semiconductor microactuator using a semiconductor device corresponding to a first embodiment of the invention.

However, the semiconductor microactuator having the structure shown in U.S. Pat. No. 5,069,419 involves the following problem: First, the thermal insulation effect of the hinge structure of the silicon dioxide thin film will be considered. Generally, heat quantity Q escaping from a high-temperature portion to a low-temperature portion is $$Q(W) = -\lambda(t_2-t_1)/\delta)A \quad \text{(Expression X)}$$

where Q: Heat quantity (heat move speed)

$t_2-t_1$: Temperature difference (° C.)

$\delta$: Distance from heat source (cm)

A: Cross section perpendicular to direction of heat flow ($cm^2$)

$\lambda$: Heat conductivity (J/cm s° C.)

Then, the relational expression is used to calculate the heat quantity escaping from the diaphragm 300 to the silicon frame 302. Letting the temperature difference between the diaphragm 300 and the silicon frame 302 be 150° C., the width of the hinge 303 be 30 $\mu$m, the diameter of the diaphragm 200 be 2.5 mm, and the thickness of the hinge 303 be 2 $\mu$m (estimated from "Electrically-Activated, Micromachined Diaphragm Valves" Technical Digest IEEE Solid-State Sensor and Actuator Workshop, pp65–69, June 1990), cross section perpendicular to the direction of heat flow, A1, is $$A1=2.5 \text{ mm} \times \pi \times 2 \mu\text{m}=0.25 \text{ cm} \times \pi \times 2 \times 10^{-4} \text{ cm}=1.57 \times 10^{-4} \text{ cm}^2$$

Since the heat conductivity $\lambda$ of silicon dioxide equals 0.0084 (W/cm° C.), escape heat quantity Q1 is $$Q1 = 0.084(W/\text{cm} \, ^\circ\text{C.}) \times 150^\circ \text{C.}/(30 \times 10^{-4} \text{ cm}) \times 1.57 \times 10^{-4} \text{ cm}^2 = 0.66 \, W = 600 \text{ mW}$$

Next, the heat quantity escaping from the diaphragm 300 to the silicon frame 302 if the hinge structure of silicon dioxide is not provided is calculated. Letting the thickness of the silicon diaphragm 300 be 10 $\mu$m, cross section perpendicular to the direction of heat flow, A2, is calculated as follows:

$$A2=2.5 \text{ mm} \times \pi \times 10 \mu\text{m}=0.25 \text{ cm} \times \pi \times 10 \times 10^{-4} \text{ cm}=7.85 \times 10^{-4} \text{ cm}^2$$

Since the heat conductivity $\lambda$ of silicon equals 1.48 (W/cm° C.), escape heat quantity Q2 is $$Q2=1.48(W/\text{cm}^\circ \text{C.}) \times 150^\circ \text{C.}/(30 \times 10^{-4} \text{ cm}) \times 7.85 \times 10^{-4}{}_{cm}{}^2=58 \, W$$

Then, the hinge 303 of silicon dioxide thin film is provided, whereby about 90-times thermal insulation effect can be produced. Thus, the semiconductor microactuator described in U.S. Pat. No. 5,069,419 has a structure with better thermal efficiency than that of the conventional structure. However, considering the current state of application, it is desired to furthermore decrease the heat loss. Specifically, the heat escape (heat loss) is thought of as power (consumption power) supplied all the time to maintain the diaphragm 300 at a predetermined temperature (for example, 150° C.).

In the semiconductor microactuator described in U.S. Pat. No. 5,069,419, the silicon dioxide thin film is thick as 2 $\mu$m in the part of the hinge 303. The factor for determining the thickness of the silicon dioxide thin film of the hinge 303 is not clearly described in the specification. However, if the semiconductor microactuator described in U.S. Pat. No. 5,069,419 is used with a microvalve, etc., it is conceivable that pressure applied to a moving element will concentrate on the hinge 303, and a film thickness is required to such an extent that the hinge 303 is not broken under the pressure. However, if the film thickness of the hinge 303 is increased, the thermal insulation effect is reduced as shown in the heat escape calculation expression (expression X). Then, it can be estimated that the thickness of the silicon dioxide thin film having a reasonable strength and producing a thermal insulation effect is determined 2 $\mu$m.

By the way, the semiconductor microactuator described in U.S. Pat. No. 5,069,419 is of a moving structure with bimetal made up of the silicon diaphragm 300 and the aluminum thin film 304 as described in the specification; to provide electric insulation, a silicon dioxide thin film 306 is inserted between the diaphragm 300 and the aluminum thin film 304.

In a semiconductor manufacturing process, it is desired that the silicon dioxide thin film 306 and the silicon dioxide thin film of the hinge 303 are formed at the same time and have the same film thickness. However, if the film thickness of the silicon dioxide thin film 306 inserted between the diaphragm 300 and the aluminum thin film 304 becomes thick as 2 $\mu$m, it is conceivable that the bimetal characteristic of the drive source will degraded. In the example described in the document "Electrically-Activated, Micromachined Diaphragm Valves" Technical Digest IEEE Solid-State Sensor and Actuator Workshop, pp65–69, June 1990, the aluminum thin film 304 has a film thickness of 5 to 6 $\mu$m and if the silicon dioxide thin film 306 having a film thickness of 2 $\mu$m is inserted between the diaphragm 300 and the aluminum thin film 304, it can be easily estimated that the silicon dioxide thin film 306 will become a factor for hindering bending of the diaphragm 300 at the heating time.

In the semiconductor manufacturing process, normally a thin film of silicon dioxide is formed at a high temperature of about 2000° C. Thus, considering the thermal expansion coefficients of silicon and silicon dioxide, it is possible that a considerable internal stress occurs between the silicon diaphragm 300 and the silicon dioxide thin film 306. As the silicon dioxide thin film 306 becomes thicker, the internal stress grows, causing the bimetal characteristic to be degraded. Thus, the silicon dioxide thin film 306 between the diaphragm 300 and the aluminum thin film 304 must be thinned as much as possible ($2 \times 10^{-8}$ m (200 A)) and the silicon dioxide film of the hinge 303 must be made thick to some extent (2 µm). However, formation of such a thin film structure of silicon dioxide requires a very complicated semiconductor manufacturing process. The manufacturing process is not mentioned in the specification of U.S. Pat. No. 5,069,419.

As a remedy, another hinge structure is disclosed in U.S. Pat. No. 5,271,597, wherein the thin film structure of silicon dioxide as described above is not adopted and a silicon dioxide thin film of a hinge part and a silicon dioxide thin film between a diaphragm and an aluminum thin film have the same film thickness. In this method, the silicon dioxide thin film of the hinge part is thinned and to make up for reduction in the strength of the hinge part as the film is thinned, silicon of a part of the diaphragm is used for bonding the diaphragm and a silicon frame in addition to the hinge, thus the thermal insulation effect is reduced and a structure for lessening power consumption of the semiconductor microactuator is not provided. Thus, a large number of problems remain to be solved in the thermal insulation structure in the semiconductor microactuator.

As an example of a semiconductor microvalve in a related art, a microminiature valve is described in U.S. Pat. No. 5,058,856. This microminiature valve also uses a semiconductor microactuator comprising at least two materials having different thermal expansion coefficients in combination as a bimetal structure wherein the bimetal structure is heated and the difference between the thermal expansion coefficients is used to provide displacement. The microactuator has a thermal insulation structure provided by placing a torsion bar suspension. This structure minimizes the heat loss to a silicon frame because of a decrease in the cross section perpendicular to a heat flow and an increase in the length of a passage through which the heat flow passes. However, since the torsion bar suspension structure is formed of silicon, it is considered that a sufficient thermal insulation effect cannot be produced as discussed in the calculation of heat escape.

This can be estimated from a microvalve performance comparison table described in the document "SILICON MICROVALVES FOR GAS FLOW CONTROL" The 8th International Conference on Solid-State Sensor and Actuators, Stockholm, Sweden, 1995, p276–279. This document compares a microvalve involving the "semiconductor microactuator" disclosed in U.S. Pat. No. 5,069,419 with a microvalve related to the "microminiature valve" disclosed in U.S. Pat. No. 5,058,856; the latter has pressure resistance six times that of the former and flow quantity range 10 times that of the former, but power consumption about twice that of the former and heat resistance about a third that of the former.

Thus, the microminiature valve disclosed in U.S. Pat. No. 5,058,856 has a structure capable of generating a large force because of the torsion bar suspension structure formed of silicon, but consumes larger power.

First Embodiment

Figure 2A:
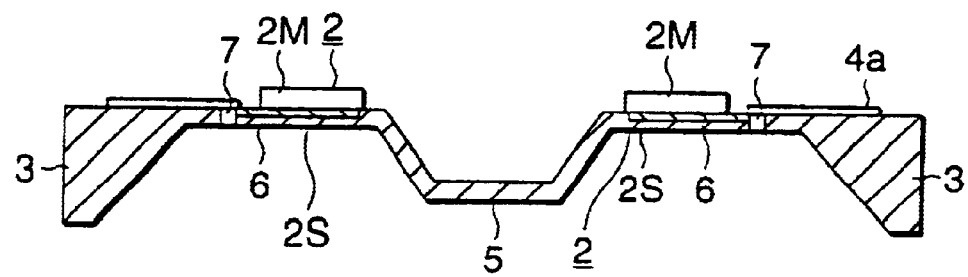
FIG. 2(a) is a sectional view to show the structure of the semiconductor microactuator in FIG. 1
Figure 2B:
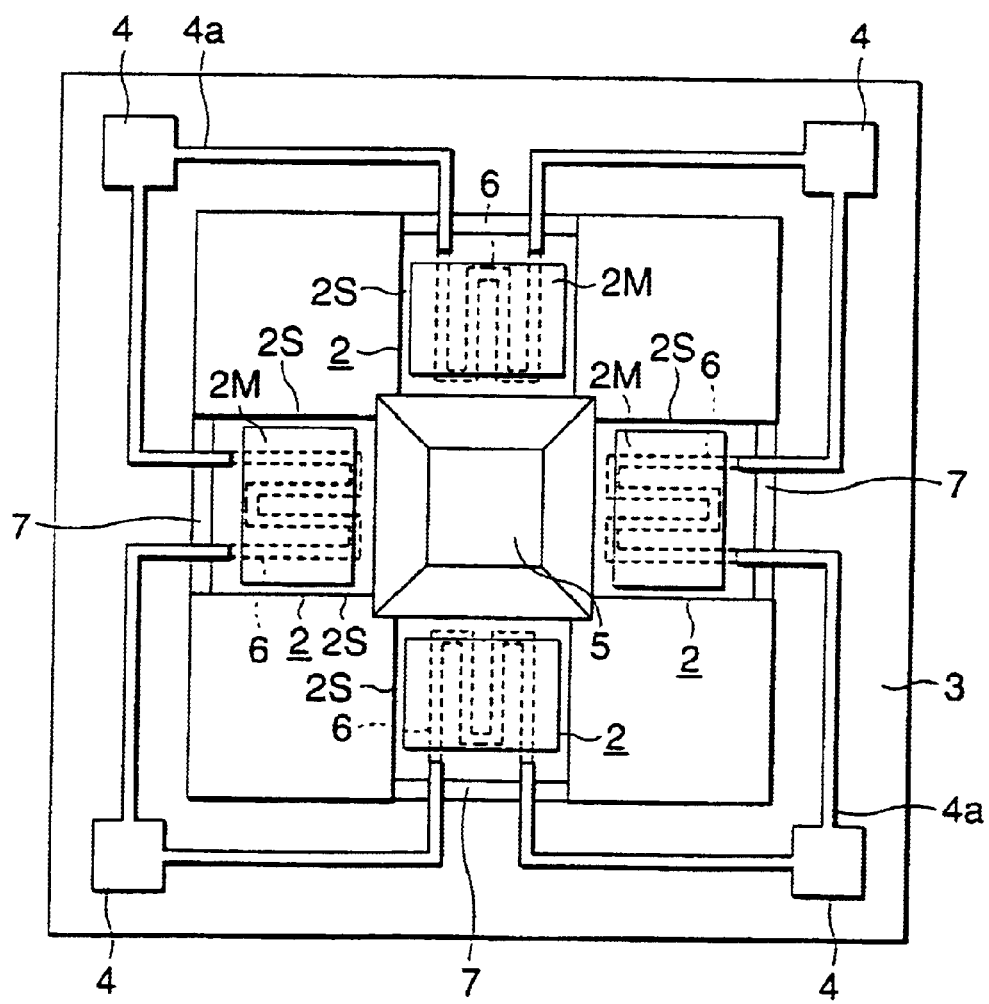
FIG. 2(b) is a top view to show the structure of the semiconductor microactuator in FIG. 1.

A first embodiment of the invention will be discussed. FIG. 1 is a partially cutaway view in perspective of the structure of a semiconductor microactuator using a semiconductor device according to the invention. FIG. 2A is a sectional view and FIG. 2B is a top view.

As shown in the figures, a semiconductor microactuator 1 includes a semiconductor substrate 3 which becomes a hollow frame shaped roughly like a quadrangle, four thin portions 2S each shaped roughly like a quadrangle piece, the thin portions 2S separated from the semiconductor substrate 3 with one ends connected via thermal insulation areas 7 inwardly roughly from the centers of the sides of the semiconductor substrate 3, a moving element 5 formed like a hollow quadrangular prismoid with the top face opened like a quadrangle and narrower toward the bottom, the moving element 5 having top opening margins connected to opposite ends of the thin portions 2S, and thin films 2M of aluminum thin films, nickel thin films, or the like placed on the top faces of the thin portions 2S, the thin films 2M and the thin portions 2S making up flexible areas 2.

The semiconductor substrate 3, the thin portions 2S, and the moving element 5 are formed, for example, by working a semiconductor substrate of a silicon substrate, etc. Each thin portion 2S is formed on a surface with an impurity-diffused resistor 6 (diffused resistor 6) of heating means. Power is supplied to the diffused resistors 6 by wiring 4a connected to electrode pads 4 placed at the four corners of the semiconductor substrate 3 and the temperatures of the diffused resistors 6 rise, heating the flexible areas 2 each made up of the thin portion 2S and the thin film 2M. The thin film 2M is made of aluminum, nickel, or the like as described above and the thin portion 2S is made of silicon, etc.; the thin film 2M and the thin portion 2S have different thermal expansion coefficients.

Each thermal insulation area 7 for joining the semiconductor substrate 3 and the flexible area 2 has roughly the same thickness as the thin portion 2S and is made of a thermal insulation material such as a fluoridated resin or polyimide for thermally insulating the semiconductor substrate 3 and the flexible area 2. Of the electrode pads 4 placed at the four corners of the semiconductor substrate 3, the electrode pads 4 in the upper-right corner and the lower-left corner in FIG. 2B are connected to an external power supply and the series circuit of two diffused resistors 6 is connected in parallel to power supply.

The four flexible areas 2 are in the shape of a cross with the moving element 5 at the center and the surroundings of the moving element 5 are supported by the flexible areas 2. The semiconductor substrate 3, the flexible areas 2, and the thermal insulation areas 7 each between the semiconductor substrate 3 and the flexible area 2 make up a semiconductor device 8.

In the described semiconductor microactuator 1, upon application of power to the diffused resistors 6, the temperature rises, heating the flexible areas 2, and a thermal stress occurs because of the difference between the thermal expansion coefficients of the thin film 2M and the thin portion 2S making up each flexible area 2. For example, if metal thin films of aluminum, nickel, etc., are formed as the thin films 2M, the metal of aluminum, nickel, etc., has a lager thermal expansion coefficient than silicon forming the thin portions 2S, so that the flexible areas 2 are bent downward in the figure. The moving element 5 placed contiguous with the flexible areas 2 receives the thermal stress of the flexible areas 2 and is displaced downward with respect to the semiconductor substrate 3.

As described above, the semiconductor microactuator 1 includes the four flexible areas 2 in the shape of a cross with the moving element 5 at the center and displacement of the moving element 5 becomes irrotational displacement relative to the semiconductor substrate 3; good control accuracy of displacement is provided and a large force can be generated. As described above, each flexible area 2 is formed on the surface with the diffused resistor 6 for heating the flexible area 2, namely, contains the diffused resistor 6, so that the semiconductor microactuator 1 can be miniaturized.

The semiconductor microactuator 1 of the embodiment includes each flexible area 2 made up of two areas having different thermal expansion coefficients, namely, the thin portion 2S and the thin film 2M, but the invention is not limited to it. For example, each flexible area 2 may be made of a shape memory alloy of nickel titanium, etc., and the flexible area 2 made of a shape memory alloy may be displaced because of temperature change.

Of course, this invention is limited for use of semiconductor microactuator. It is applicable for a temperature sensor in such a manner that the displacement of the flexible area caused by changing the temperature is measured by, for example, the laser displacement device to detect the temperature in accordance with the displacement of the flexible area. Namely the present invnetion is applied to the semiconductor device using the effect such that the thermal insulation area 7 is provided between each flexible area 2 and the semiconductor substrate 3, so that the semiconductor microactuator 1 has the advantage that heat produced when the flexible areas 2 are heated can be prevented from escaping to the semiconductor substrate 3.

Figure 3:
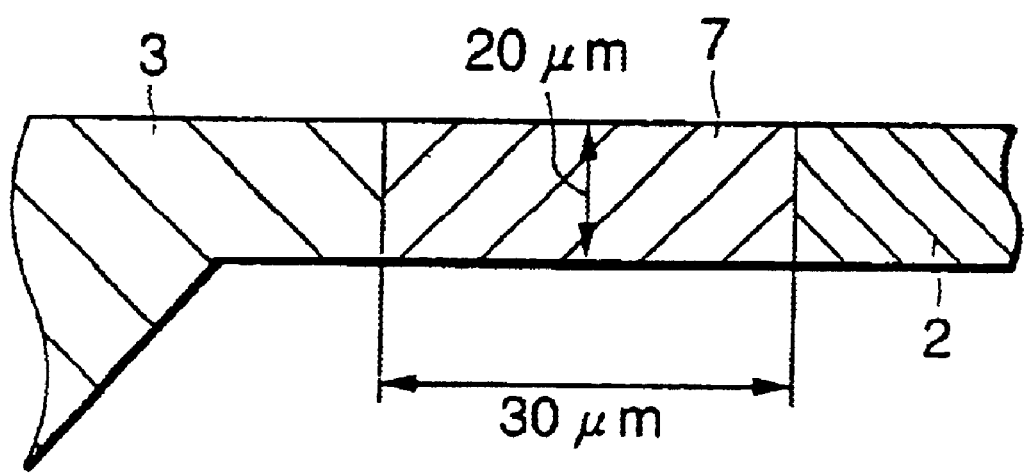
FIG. 3 is a sectional view to show the structure of the semiconductor device in FIG. 1.

To describe the function of the semiconductor device 8 used with the semiconductor microactuator 1 of the invention, the case where the length and the thickness in the joint direction of the semiconductor substrate 3 and the flexible area 2 in the thermal insulation area 7 are 30 $\mu$m and 20 $\mu$m respectively and polyimide is used as the material as shown in FIG. 3, which is a sectional view of the semiconductor device 8, will be discussed as a specific example. Assume that the length in the joint direction of the flexible area 2 shown in FIG. 1 is 800 $\mu$m and the width of the flexible area 2 (length in the direction orthogonal to the joint direction) is 600 $\mu$m.

Heat quantity Q3 escaped from the flexible area 2 through the thermal insulation area 7 to the semiconductor substrate 3 is calculated according to the expression X shown in the description of the related art. Here, cross section perpendicular to the direction of the heat flow of escape heat, A10, is $A10$=(thickness of polyimide)×(width of flexible area)=20 $\mu$m×600 $\mu$m=1.2×10$^{-4}$ cm$^2$ The heat conductivity of polyimide is $1.17 \times 10^{-3}$ (W/cm° C.) and the distance from the heat source, $\delta$, namely, the distance between the flexible area 2 and the semiconductor substrate 3 is 30 $\mu$m. Thus, the heat quantity Q3 escaped from the flexible area 2 heated to 150° C. to the semiconductor substrate 3 is $Q3 =$ $1.17 \times 10^{-3} (W/cm \ °C.) \times (150° \ C./(30 \times 10^{-4} \ cm)) \times 1.2 \times 10^{-4} (cm^2) =$ $4.2 \times 10^{-3} (W) = 4.2 \ (mW)$ Since the semiconductor device 8 has the four flexible areas 2 as described above, the heat quantity becomes 16.8 mW as a whole. This indicates that the temperature of the flexible area 2 can be maintained at 150° C. by feeding input power 16.8 mW into the diffused resistor 6; the power consumption can be reduced to 1/40 as compared with 660 mW in the related art.

Figure 4A:
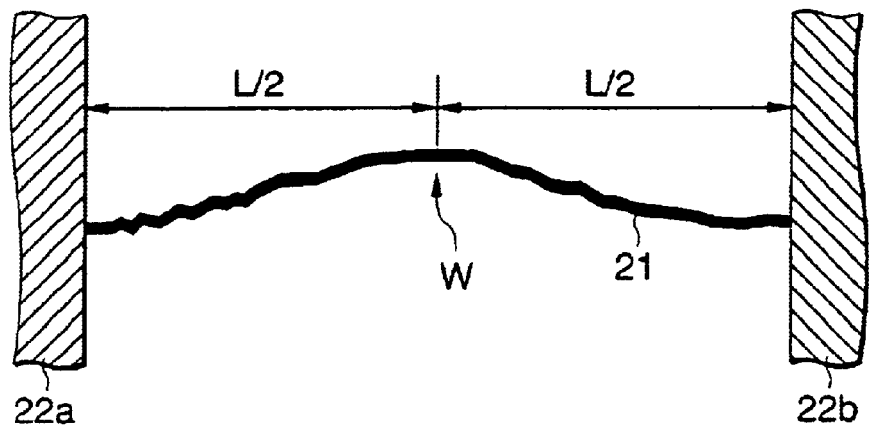
FIGS. 4(a) to 4(c) show a structure model used to find the strength of the semiconductor device in FIG. 1.
Figure 4B:
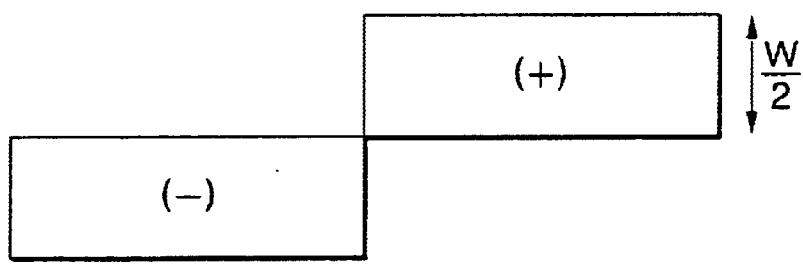
Figure 4C:
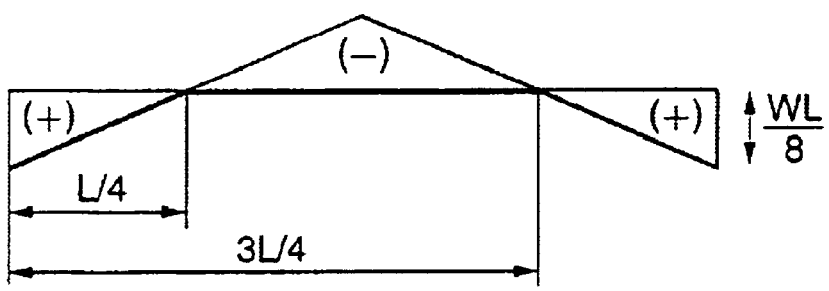

Next, the strength of the thermal insulation area 7 made of polyimide will be discussed. A model of a twin-cantilever structure with both ends fixed shown in FIG. 4A will be considered. If load W is imposed on the center of a beam 21 (corresponding to the flexible area 2) from below as shown in FIG. 4A, the shearing force and moment force of the beam 21 become as shown in FIGS. 4B and 4C respectively. In FIG. 4A, the thermal insulation area 7 is positioned either between a fixed end 22a and the beam 21 or between a fixed end 22b and the beam 21. Then, a force applied to the beam 21 is found, for example, if 1-g load W is imposed on the center of the beam 21 (corresponding to the case where a pressure of 46.7 kPa is put on an orifice 500 $\mu$m for a microvalve).

Shearing force applied to the beam, F1, is

F1=W/2=1.0×10$^{-3}$ (kgf)/2=0.5×10$^{-3}$ (kgf)=4.9×10$^{-3}$ (N), and maximum shearing strength applied to the beam, Fmax, is Fmax=F1/S1 (where S1 is the cross-sectional area of the beam). Here, letting width b1 of the beam 21 be 600 $\mu$m and thickness h1 of the beam 21 be 20 $\mu$m, the cross-sectional area S1 is S1=(b1)(h1)=600×10$^{-4}$×20×10$^{-4}$=1.2×10$^{-4}$ cm$^2$. Therefore, the maximum shearing strength applied to the beam 21, Fmax, is Fmax=0.50×10$^{-3}$ (kgf)/1.2×10$^{-4}$ (cm$^2$)= 4.16 (kgf/cm$^2$)=4.16×0.098 (MPa)=0.41 (MPa). Next, maximum stress applied to the beam 21, $\sigma$max, is found. The maximum stress $\sigma$max is represented as $\sigma$max=Mmax/Z1 where Mmax is the maximum moment and Z1 is a section modulus. The maximum moment Mmax equals WL/8 (where L is the length of the beam, 800 $\mu$m) as shown in FIG. 4C. Therefore, the maximum moment Mmax Mmax=WL/8=1.0×10$^{-3}$ (kgf)×800×10$^{-4}$ (cm)/8=1.0×10$^{-5}$ (kgf cm)=9.8×10$^{-5}$ (N cm). The section modulus Z1 is Z1=(b1)(h1)$^2$/6=1/6×600×10$^{-4}$×(20×10$^{-4}$)$^2$=4.0×10$^{-8}$ (cm$^3$). Then, the maximum stress $\sigma$max based on the moment is $\sigma max = Mmax/Z =$ $1.0 \times 10^{-5} (kgf \ cm)/4.0 \times 10^{-8} (cm^3) = 250 (kgf/cm^2) = 24.5 \ (MPa).$ The beam 21 is 600 $\mu$m wide and 800 $\mu$m long as described above.

Since polyimide has a disruptive strength of about 30 MPa, a semiconductor microactuator capable of resisting a load of about 1 g in the thermal insulation area 7 described above can be provided. The strength of the thermal insulation area 7 can be enhanced as shown in another example. Although not described, a similar advantage can also be expected with a fluoridated resin.

Figure 5A:
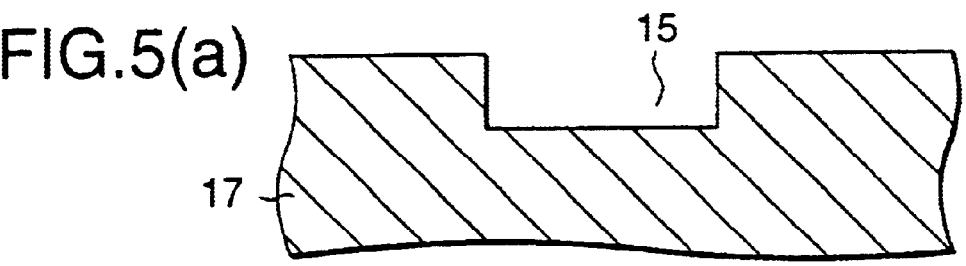
FIGS. 5(a) to 5(d) are sectional views to show a manufacturing method of the semiconductor device in FIG. 1.
Figure 5B:
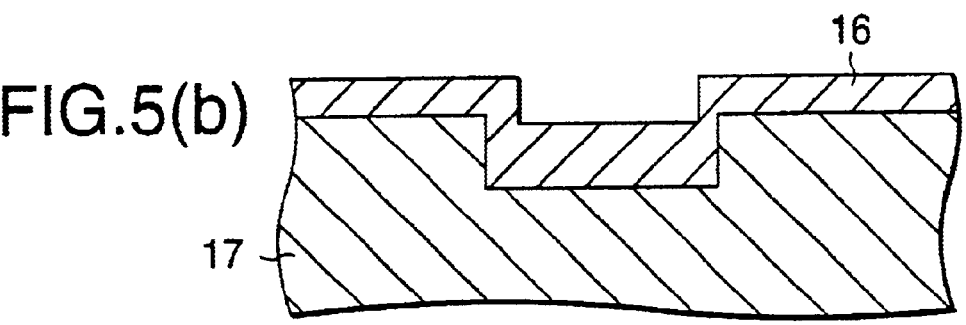
Figure 5C:
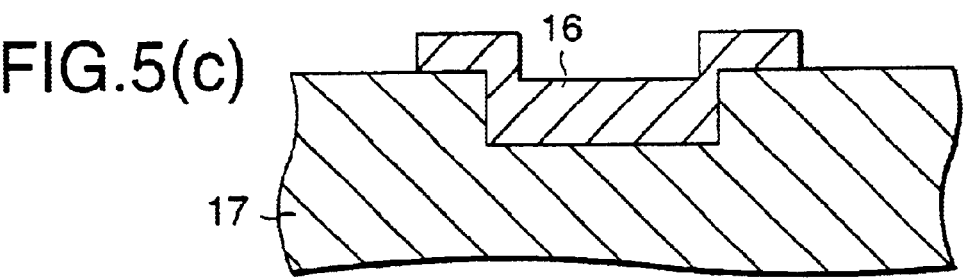
Figure 5D:
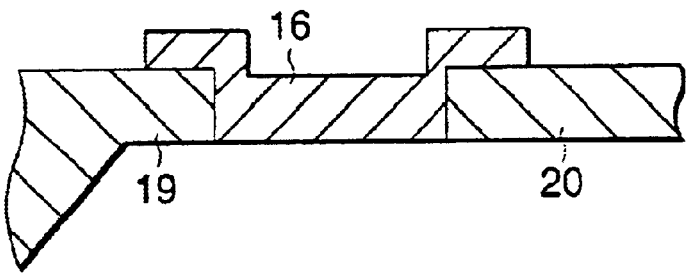

A formation method example of the thermal insulation area 7 will be discussed with reference to FIGS. 5A to 5D. First, as shown in FIG. 5A, the portion corresponding to a thermal insulation area on the surface of a semiconductor substrate 17 is etched with KOH, etc., to form a groove 15. Then, as shown in FIG. 5B, a coat of a polyimide thin film 16 is rotationally applied with a coater, etc., so as to fill the groove 15. Next, as shown in FIG. 5C, patterning is performed by executing a semiconductor photolithography process, etc., so that the polyimide thin film 16 of the portion filling the groove 15 is left and that other portions are removed, and heating is executed to about 400° C. to evaporate an organic solvent, etc., contained in polyimide and cure. Next, as shown in FIG. 5D, etching with KOH, etc., is performed from the rear face of the semiconductor substrate 17. In FIG. 5D, numeral 19 denotes a semiconductor substrate which becomes a frame and numeral 20 denotes a flexible area. The thermal insulation area 7 is formed through such a process.

Thus, the thermal insulation area 7 is formed between the flexible area 2 and the semiconductor substrate 8 utilizing the nature that the resin material of polyimide, fluoridated resin, etc., has high thermal insulation properties (thermal conductivity coefficient: 0.4 W/(m° C.) or less, about 80 times that of silicon dioxide) and is liquid and easy to work and can be easily formed to be a thin film of a desired thickness (several $\mu$m to several ten $\mu$m) by executing a semiconductor manufacturing process of spin coat, etc. Therefore, a semiconductor device having an excellent thermal insulation effect and strength as compared with the example in the related art can be easily provided using the semiconductor manufacturing process. As described above, the thermal insulation area 7 is made almost as thick as the thin portion 2S of the flexible area 2, whereby the semiconductor substrate 3 and the flexible area 2 are joined reliably and the strength of the joint portion can be enhanced.

The semiconductor microactuator 1 using the semiconductor device 8 comprising such advantages, which is easily manufactured and has high thermal insulation properties, prevents heat generated by the diffused resistors 6 from escaping and can be driven with low power consumption, namely, can be driven with a battery and thus can be miniaturized.

Figure 6A:
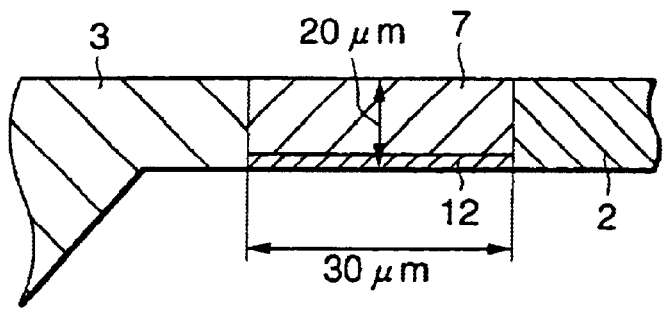
FIGS. 6(a) and 6(b) are a sectional view and a top view to show the structure of another semiconductor device.
Figure 6B:
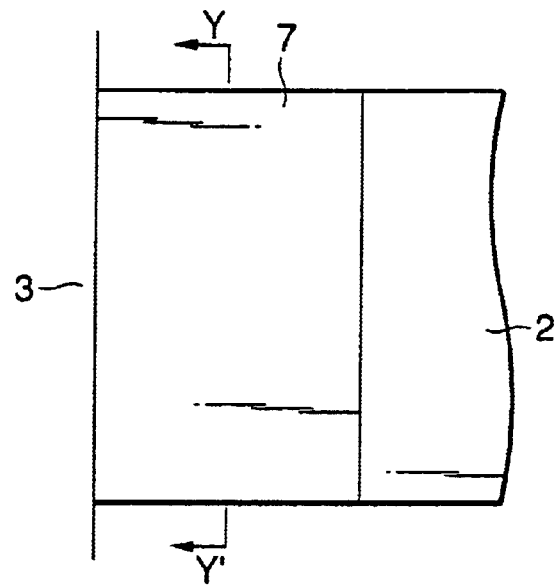
Figure 7:
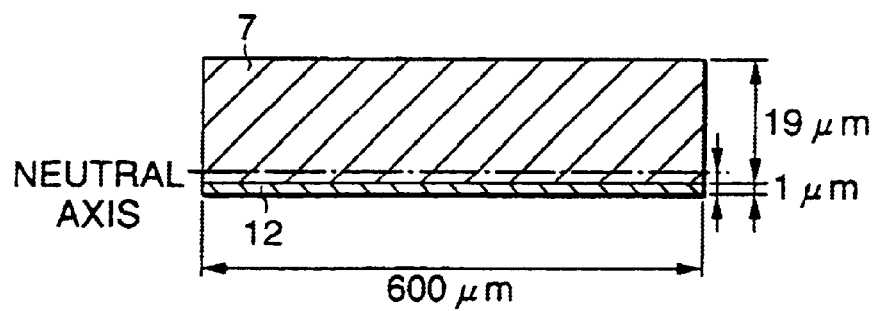
FIG. 7 is a sectional view taken on line Y–Y' in FIG. 6(b) to show the structure of the semiconductor device in FIGS. 6(a) and 6(b)

Next, another configuration example of the semiconductor device 8 will be discussed. As shown in FIGS. 6A and 6B, the example semiconductor device 8 is the same as the semiconductor device in FIG. 3 in that a thermal insulation area 7 made of a thermal insulation material such as a fluoridated resin or polyimide is formed between a semiconductor substrate 3 and a flexible area 2; the former differs from the latter in that the thermal insulation area 7 is formed on a bottom face (face orthogonal to the thickness direction) with a reinforcement layer 12 made of a harder material than the material forming the thermal insulation area 7, such as a silicon dioxide thin film (Young's modulus: $9.8 \times 10^{-9}$ N/m$^2$ or more). FIG. 6A is a sectional view and FIG. 6B is a top view. FIG. 7 is a sectional view taken on line Y–Y' in FIG. 6B.

Specifically, as shown in FIG. 7, the thermal insulation area 7 is 19 $\mu$m thick and the reinforcement layer 12 is 1 $\mu$m thick. As shown in FIG. 6A, the length in the joint direction of the semiconductor substrate 3 and the flexible area 2 in the thermal insulation area 7 is 30 $\mu$m and the length in the Y–Y' direction, namely, in the depth direction is 600 $\mu$m. Here, the strength of the thermal insulation area 7 to use polyimide as the material forming the thermal insulation area 7 and silicon dioxide as the material forming the reinforcement layer 12 is calculated under similar conditions to those of the strength calculation of the thermal insulation area 7 in FIG. 3 described above.

Letting the Young's modulus of the material of each of the thermal insulation area 7 and the reinforcement layer 12 be $E_i$ and the cross-sectional area of the cross section of each area shown in FIG. 7 be $A_i$, the distance from the bottom face to the neutral axis, $\eta a$, is given by the following expression:

$$\eta a_i = \frac{\sum_i E_i \int \eta dA_i}{\sum_i E_i \cdot A_i} \qquad \text{[Expression 1]}$$

The values are found with respect to silicon dioxide forming the reinforcement layer 12 as follows:

Young's modulus $E_s$; $7.3 \times 10^{10} (N/m^2)$ [Expression 2]

Cross-sectional area $A_s$; $1 \times 10^{-6} \times 600 \times 10^{-6} (m^2)$ $E_s \cdot A_s = 7.3 \times 10^{10} (N/m^2) \times 1 \times 10^{-6} \times 600 \times 10^{-6} (m^2)$ $= 43.8 N$ $E_s \int \eta dA_s = E_s \int_0^{1\mu m} \eta (600 \times 10^{-6} d\eta)$ $= 7.3 \times 6 \times 10^6 \times [\eta^2 / 2]_0^{1\mu m}$ $= 21.9 \times 10^{-6} N-m$ The values are found with respect to polyimide forming the thermal insulation area 7 as follows:

Young's modulus $E_f$; $5.0 \times 10^8 (N/m^2)$ [Expression 3]

Cross-sectional area $A_f$; $19 \times 10^{-6} \times 600 \times 10^{-6} (m^2)$ $E_f \cdot A_f = 5.0 \times 10^8 (N/m^2) \times 19 \times 10^{-6} \times 600 \times 10^{-6} (m^2)$ $= 5.70 N$ $E_f \int \eta dA_f = E_f \int_{1\mu m}^{20\mu m} \eta (600 \times 10^{-6} d\eta)$ $= 5.0 \times 6 \times 10^4 \times [\eta^2 / 2]_{1\mu m}^{20\mu m}$ $= 59.8 \times 10^{-6} N-m$ Using the found values, the distance to the neutral axis, $\eta a$, is found as follows:

$$\eta a = \frac{\sum_i E_i \int \eta dA_i}{\sum_i E_i \cdot A_i} = \qquad \text{[Expression 4]}$$

$$\frac{(21.9 + 59.8) \times 10^{-6}}{(42.8 + 5.7)} = 1.68 \times 10^{-6} (m) = 1.68 \mu m$$

Next, secondary moments $I_s$ and $I_f$ concerning the neutral axes of silicon dioxide and polyimide are found as follows:

$I_s = \int \eta_i^2 dA_i = \int_{0.66\mu m}^{1.68\mu m} \eta_i^2 (600 \times 10^{-6} d\eta_i)$ [Expression 5]

$= 600 \times 10^{-6} \times [\eta^3 / 3]_{-0.68\mu m}^{1.68\mu m}$ $= 8.86 \times 10^{-22} m^4$ $I_f = \int \eta_i^2 dA_i = \int_{0.68\mu m}^{18.32\mu m} \eta_i^2 (600 \times 10^{-6} d\eta_i)$ $= 600 \times 10^{-6} \times [\eta^3 / 3]_{-0.68\mu m}^{18.32\mu m}$ $= 1.22 \times 10^{-18} m^4$ Here, $\eta i = \eta - \eta a$, namely, $\eta i$ denotes the distance from the neutral axis. As previously described with reference to FIGS. 4A to 4C, if a load of 1 g is imposed on the center of the beam with both ends fixed, the maximum moment Mmax applied to the beam is Mmax=$1.00 \times 10^{-5}$ (kgf cm)=$9.8 \times 1.00 \times 10^{-5} \times 10^{-2}$ (N m)=$9.8 \times 10^{-7}$ (N m).

The maximum bending stress of silicon dioxide, σsmax, is calculated as follows:

$$\sigma_{s\max} = M_{\max} \frac{E_s \cdot \eta_i}{\sum_i E_i \cdot I_i} \quad \text{[Expression 6]}$$

$$= \frac{0.98 \times 10^{-6} \times 7.3 \times 10^{10} \times 1.68 \times 10^{-6}}{7.3 \times 10^{10} \times 8.86 \times 10^{-22} + 5 \times 10^8 \times 1.22 \times 10^{-18}}$$

$$= 1.78 \times 10^8 \, (\text{kg/m}^2) = 178 \, (\text{MPa})$$

Here, $I_i$ denotes each of the secondary moments $I_s$ and $I_f$. The maximum bending stress of polyimide, σfmax, is calculated as follows:

$$\sigma_{f\max} = M_{\max} \frac{E_f \cdot \eta_i}{\sum_i E_i \cdot I_i} \quad \text{[Expression 7]}$$

$$= \frac{0.98 \times 10^{-6} \times 5.0 \times 10^8 \times 18.32 \times 10^{-6}}{7.3 \times 10^{10} \times 8.86 \times 10^{-22} + 5 \times 10^8 \times 1.22 \times 10^{-18}}$$

$$= 1.33 \times 10^7 \, (\text{kg/m}^2) = 13.3 \, (\text{MPa})$$

Therefore, the stress applied to the thermal insulation area 7 made of polyimide becomes about a half that in the example shown in FIG. 3. Apparently, it is equivalent to twice the strength. In FIG. 6, the reinforcement layer 12 is provided on the bottom face of the thermal insulation area 7, but if the reinforcement layer 12 is provided on the top face of the thermal insulation area 7, a similar effect can be produced if the direction is a direction orthogonal to the thickness direction. If the reinforcement layer 12 is provided on both the top and bottom faces of the thermal insulation area 7, twice the effect produced by providing the reinforcement layer 12 on either the top or bottom face of the thermal insulation area 7 can be produced.

Figure 8A:
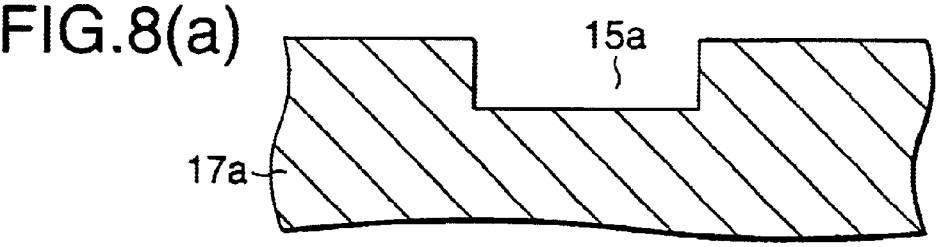
FIGS. 8(a) to 8(e) are sectional views to show a manufacturing method of the semiconductor device in FIGS. 6(a) and 6(b)
Figure 8B:
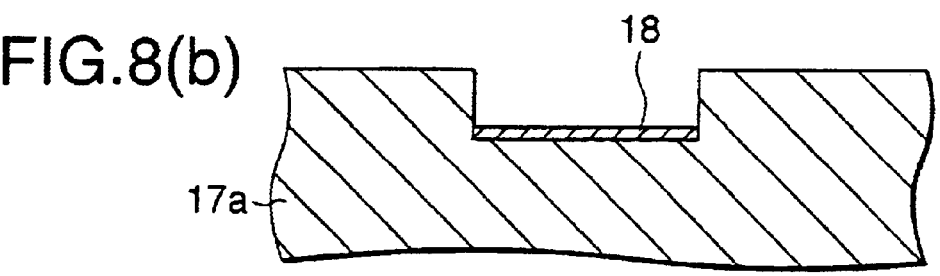

A formation method example of the thermal insulation area 7 shown in FIGS. 6A and 6B will be discussed with reference to FIGS. 8A to 8E. First, as shown in FIG. 8A, the portion corresponding to a thermal insulation area on the surface of a semiconductor substrate 17a is etched with KOH, etc., to form a groove 15a. Then, as shown in FIG. 8B, a silicon dioxide thin film 18 is formed on the surface of the semiconductor substrate 17a by thermal oxidation, etc. The silicon dioxide thin film 18 is removed except the surface portion of the groove 15a by etching, etc.

Figure 8C:
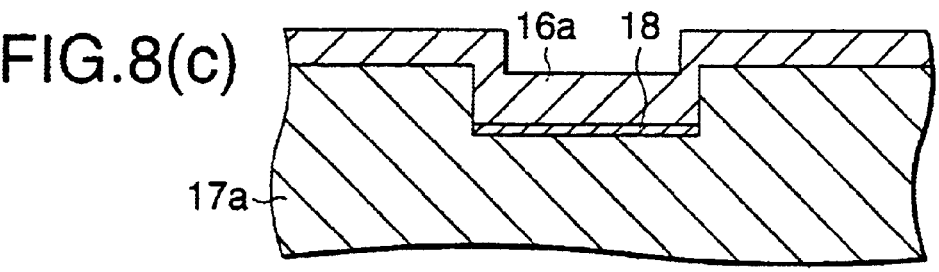
Figure 8D:
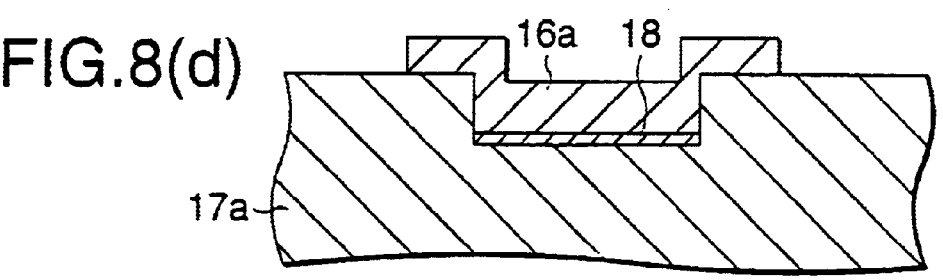
Figure 8E:
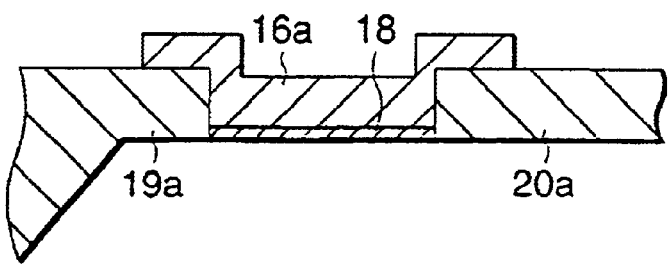

Next, as shown in FIG. 8C, a coat of a polyimide thin film 16a is rotationally applied with a coater, etc., so as to fill the groove 15a. Next, as shown in FIG. 8D, patterning is performed by executing a semiconductor photolithography process, etc., so that the polyimide thin film 16a of the portion filling the groove 15a is left and that other portions are removed, and heating is executed to about 400° C. to evaporate an organic solvent, etc., contained in polyimide and cure. Next, as shown in FIG. 8E, etching with KOH, etc., is performed from the rear face of the semiconductor substrate 17a, thereby forming the thermal insulation area. In FIG. 8E, numeral 19a denotes a semiconductor substrate which becomes a frame and numeral 20a denotes a flexible area.

Next, still another configuration example of semiconductor device of the invention will be discussed. As shown in FIG. 9B, which is a top view, a thermal insulation area 10 is provided between a semiconductor substrate 3 and a flexible area 2 and the portions of the semiconductor substrate 3 and the flexible area 2 in contact with the thermal insulation area 10 form comb teeth in the joint direction of the semiconductor substrate 3 and the flexible area 2 (orthogonal direction to line B-B'). As shown in FIG. 10, which is a sectional view taken on line B-B' in FIG. 9B, the flexible area 2, the semiconductor substrate 3, and the thermal insulation area 10 are mixed in the B-B' direction. The thermal insulation area 10 is formed of a fluoridated resin, polyimide, etc.

Figure 9A:
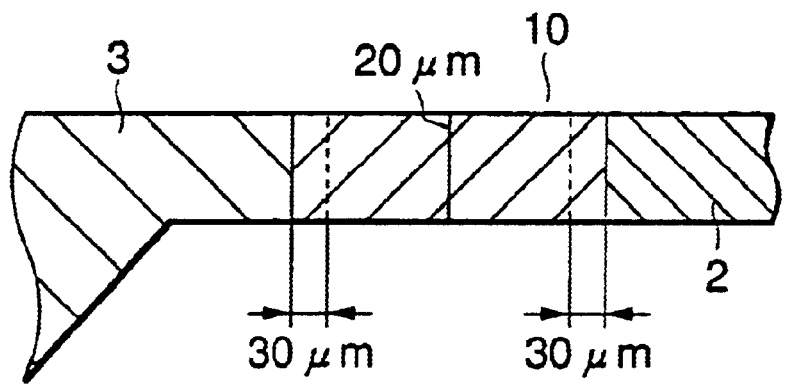
FIGS. 9(a) and 9(b) are a sectional view and a top view to show the structure of still another semiconductor device.
Figure 9B:
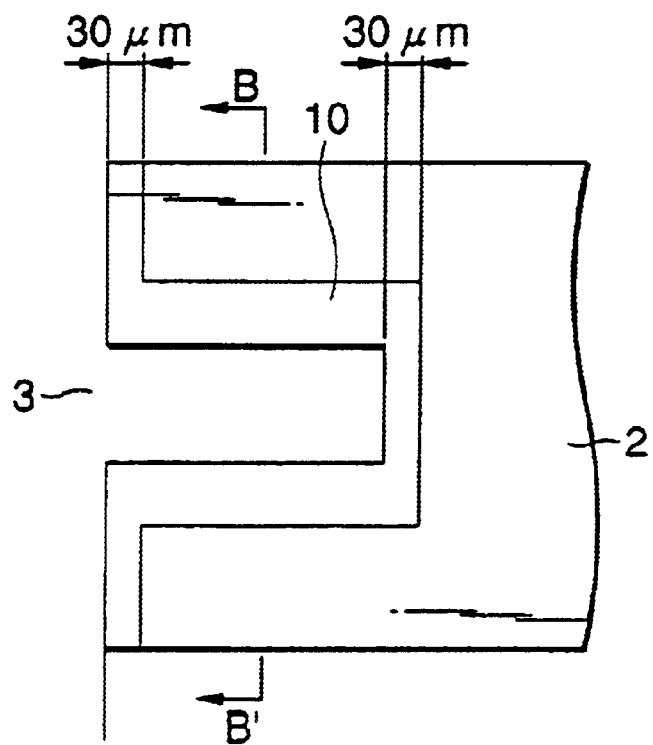
Figure 10:
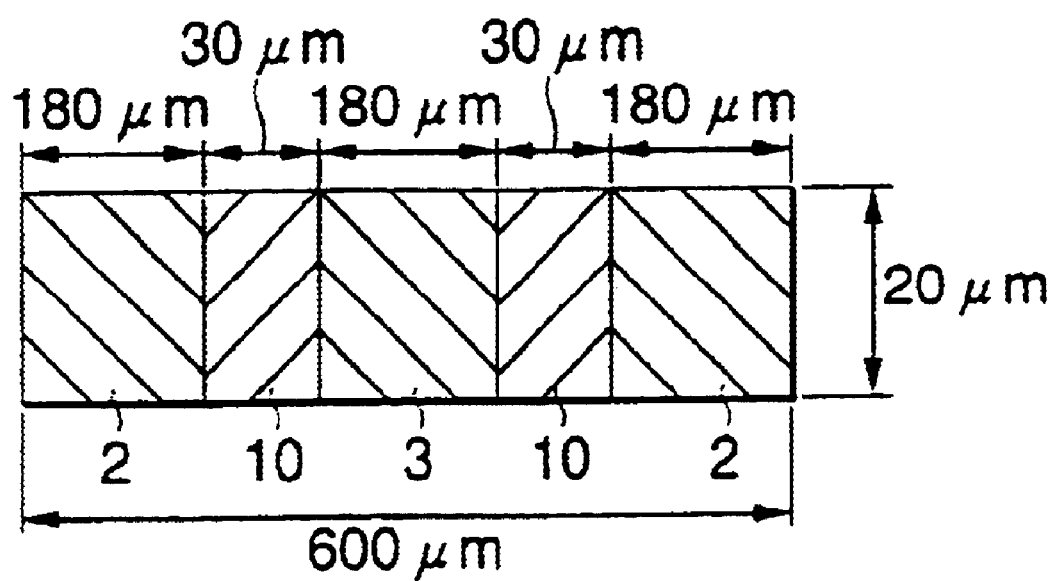
FIG. 10 is a sectional view taken on line B–B' in FIG. 9(b) to show the structure of the semiconductor device in FIGS. 9(a) and 9(b)

To calculate the strength of the thermal insulation area 10, let the thickness of the thermal insulation area 10 be 20 μm and the width in a direction perpendicular to the B–B' direction be 30 μm, as shown in FIGS. 9A and 9B, as a specific example. As shown in FIG. 10, let the width in the B-B' direction of each comb tooth consisting of the flexible area 2 and the semiconductor substrate 3 be 180 μm and the width in the B-B' direction of the thermal insulation area 10 be 30 μm. The material of the thermal insulation area 10 is polyimide and the semiconductor substrate 3 and the flexible area 2 are formed of silicon. The strength of the thermal insulation area 10 is calculated under similar conditions to those of the strength calculation in FIG. 3 for comparison.

For a structure comprising silicon and polyimide in combination as shown in FIG. 10, letting the Young's modulus of silicon be $E_{si}$, the Young's modulus of polyimide be $E_{ph}$, the secondary moment of the cross section of the silicon part be $I_{si}$, the secondary moment of the cross section of the polyimide part be $I_{ph}$, the moment applied to the silicon part be $M_{si}$, and the moment applied to the polyimide part be $M_{ph}$, the following relational expression is involved:

$$\frac{1}{\rho} = \frac{M_{Si}}{E_{Si} \cdot I_{Si}} = \frac{M_{Ph}}{E_{Ph} \cdot I_{Ph}} = k(\text{constant}) \quad \text{[Expression 8]}$$

$$M_{max} = M_{Si} + M_{Ph} \quad \rho: \text{Curvature}$$

Then, the moment of the silicon part, $M_{si}$, and the moment of the polyimide part, $M_{ph}$, are represented by $$M_{Si} = k \cdot E_{Si} \cdot I_{Si} \quad M_{Ph} = k \cdot E_{Ph} \cdot I_{Ph}$$

$$k = \frac{M_{Ph}}{E_{Ph} \cdot I_{Ph}}$$

Then, the moment applied to the whole of the thermal insulation structure, $M_{max}$, is $$M_{\max} = M_{Si} + M_{Ph} = k \cdot E_{Si} \cdot I_{Si} + M_{Ph}$$

$$= \frac{E_{Si} \cdot I_{Si}}{E_{Ph} \cdot I_{Ph}} M_{Ph} + M_{Ph}$$

Expression 9

The moment of the polyimide part, $M_{ph}$, is $$M_{Ph} = \frac{M_{\max}}{\frac{E_{Si} \cdot I_{Si}}{E_{Ph} \cdot I_{Ph}} + 1}$$

Likewise, the moment of the silicon part, $M_{si}$, is $$M_{Si} = \frac{M_{\max}}{\frac{E_{Ph} \cdot I_{Ph}}{E_{Si} \cdot I_{Si}} + 1}$$

The values concerning the silicon part and the polyimide part are calculated.

Young's modulus of silicon, $E_{si} = 0.19 \times 10^{-12}$ (N/m²) = $1.9 \times 10^{-12}$ (dyne/cm²)

$$E_{Si} = 1.9 \times 10^{12} (\text{dyne/cm}^2) \times 1.019 \times 10^{-6} = 1.93 \times 10^6 \text{ kgf/cm}^2 \quad \text{[Expression 10]}$$

$$I_{Si} = \frac{1}{12}bh^3 = \frac{1}{12} \times 180 \times 3 \times 10^{-4}(\text{cm}) \times (20 \times 10^{-4} \text{cm})^3$$
$$= 3.6 \times 10^{-11} \text{ cm}^4$$

Therefore, $$E_{Si}I_{Si} = 1.93 \times 10^6 \quad (\text{kgf/cm}^2) \times 3.6 \times 10^{-11} \quad (\text{cm}^4) =$$
$$6.94 \times 10^{-5} \quad (\text{kgf/cm}^2) = 6.8 \times 10^{-4} \text{ N cm}^2.$$

The Young's modulus of polyimide, $E_{ph}$, is 500 MPa $$E_{Ph} = 5.0 \times 10^6 (\text{Pa}) \times 1.019 \times 10^{-5} = 5.10 \times 10^3 \text{ kgf/cm}^2 \quad \text{[Expression 11]}$$

$$I_{Ph} = \frac{1}{12}bh^3 = \frac{1}{12} \times 30 \times 2 \times 10^{-4} \text{ (cm)} \times (20 \times 10^{-4} \text{ cm})^3$$
$$= 4.0 \times 10^{-12} \text{ cm}^4$$

Therefore, $E_{ph} I_{ph}$=5.10×10³ (kgf/cm²)×4×10⁻¹² (cm⁴)= 2.04×10⁻⁸ (kgf/cm²)=2.00×10⁻⁷ (N cm²).

The moment applied to the polyimide part, $M_{ph}$, is as follows:

$$M_{Ph} = \quad \text{[Expression 12]}$$
$$\frac{1.0 \times 10^{-5}(\text{kgf} \cdot \text{cm})}{\frac{6.94 \times 10^{-5}}{2.04 \times 10^{-8}} + 1} = 2.93 \times 10^{-9} \text{ (kgf} \cdot \text{cm)}$$

$M_{ph}$=2.93×10⁻⁹ (kgf cm)=2.87×10⁻⁸ (N cm).

Likewise, the moment applied to the silicon part, $M_{si}$, is as follows:

$$M_{Si} = \quad \text{[Expression 13]}$$
$$\frac{1.0 \times 10^{-5} \text{ (kgf} \cdot \text{cm)}}{\frac{2.04 \times 10^{-6}}{6.94 \times 10^{-5}} + 1} = 9.99 \times 10^{-6} \text{ (kgf} \cdot \text{cm)}$$

$M_{si}$=9.99×10⁻⁶ (kgf cm)=9.79×10⁻⁶ (N cm).

Then, the maximum stress applied to the polyimide part, $\sigma_{ph}$, is as follows:

$$Za = \frac{1}{6}bh^2 = 2.0 \times 10^{-9} (\text{cm}^3) \quad \text{[Expression 14]}$$
$$\sigma_{Ph} = \frac{M_{Ph}}{Za} = \frac{2.93 \times 10^{-9}(\text{kgf} \cdot \text{cm})}{3.8 \times 10^{-9}(\text{cm}^3)} = 0.77 (\text{kgf/cm}^2) = 7.54 \times 10^{-2}(\text{MPa})$$

Here, Za is a section modulus. The maximum stress applied to the polyimide part, $\sigma_{si}$, is found as follows:

$$Zb = \frac{1}{6}bh^2 = 3.5 \times 10^{-8}(\text{cm}^3) \quad \text{[Expression 15]}$$
$$\sigma_{Si} = \frac{M_{Si}}{Zb} =$$
$$\frac{9.99 \times 10^{-6}(\text{kgf} \cdot \text{cm})}{3.6 \times 10^{-8}(\text{cm}^3)} = 2.77(\text{kgf/cm}^2) = 27(\text{MPa})$$

Here, Zb is a section modulus.

Therefore, the stress applied to the thermal insulation area made of polyimide becomes about 1/300 that in the example shown in FIG. 3. Apparently, it is equivalent to 300 times the strength. In FIG. 9, the number of comb teeth formed by the semiconductor substrate 3 and the flexible area 2 is not limited to that shown in FIG. 9; a similar effect can be produced by providing a structure containing at least two comb teeth or more.

Second Embodiment

Figure 11:
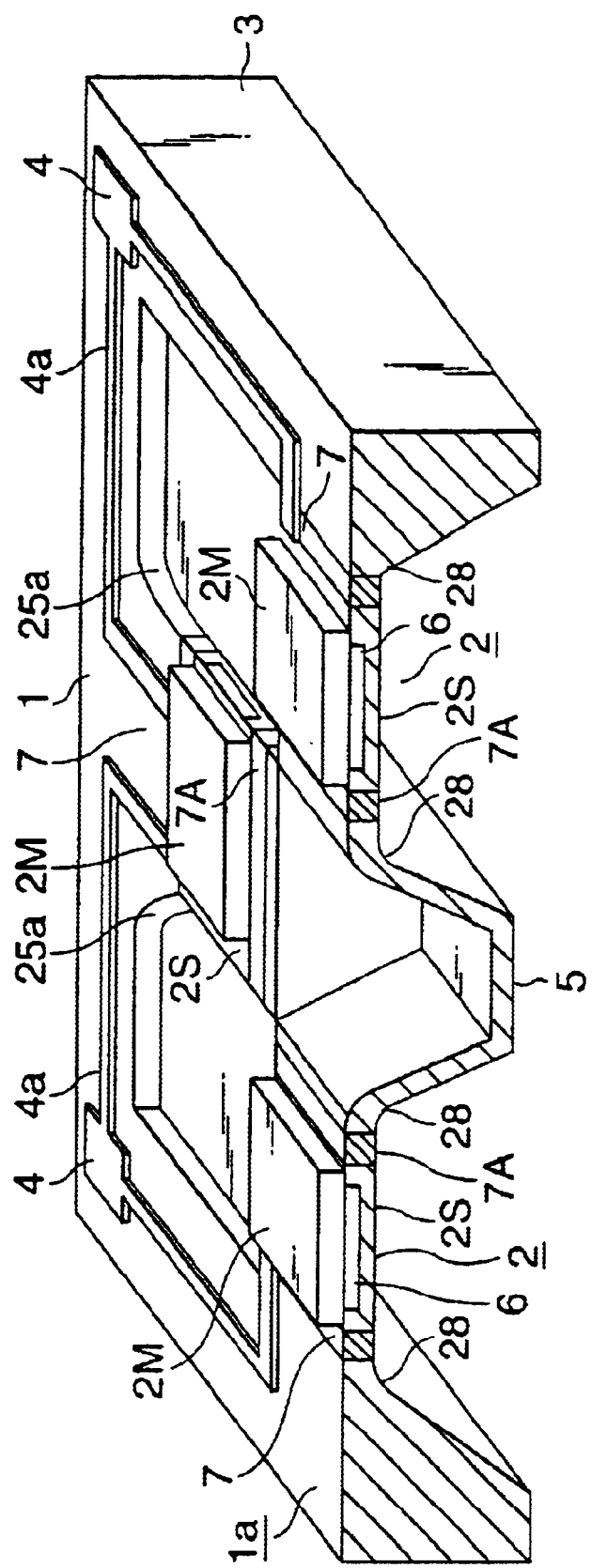
FIG. 11 is a partially cutaway view in perspective of the structure of a semiconductor microactuator corresponding to a second embodiment of the invention.
Figure 12A:
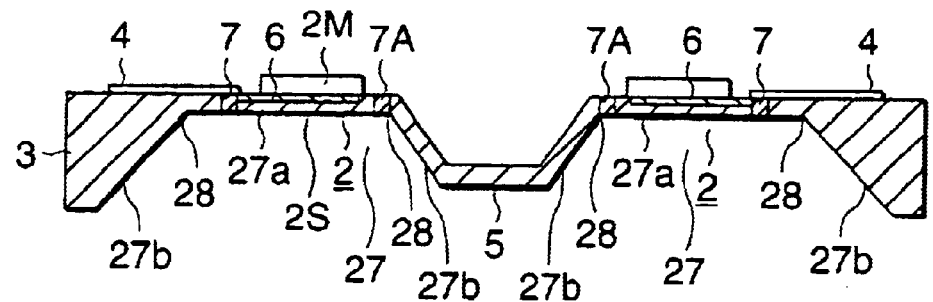
FIG. 12(a) is a sectional view to show the structure of the semiconductor microactuator in FIG. 11
Figure 12B:
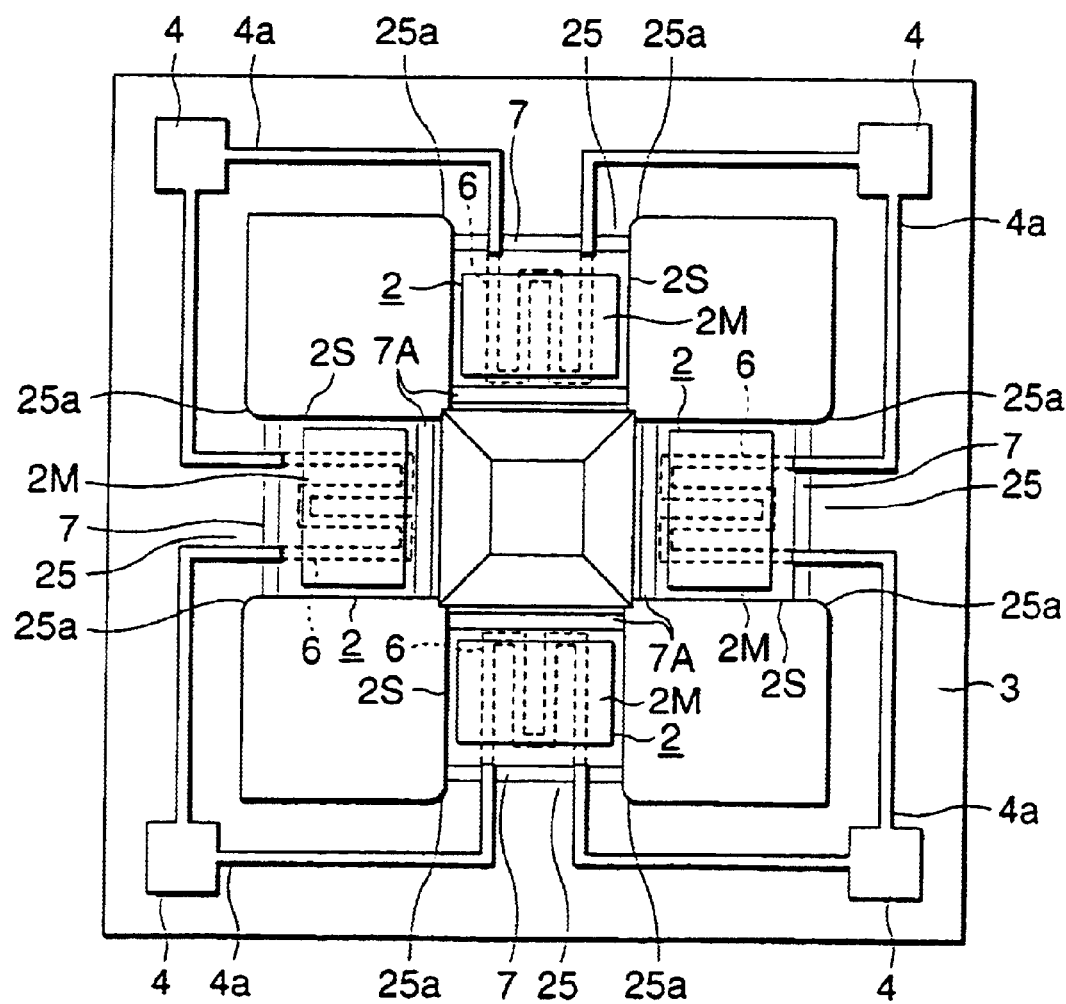
FIG. 12(b) is a top view to show the structure of the semiconductor microactuator in FIG. 11.

Next, a second embodiment of the invention will be discussed. FIG. 11 is a perspective view of a semiconductor microactuator in the first embodiment of the invention. FIG. 12A is a sectional view and FIG. 12B is a top view.

A semiconductor microactuator 1a of the second embodiment differs from the semiconductor microactuator previously described with reference to FIGS. 1 and 2 in that it includes a new thermal insulation area 7A between a flexible area 2 and a moving element 5 and that the flexible area 2 and the moving element 5 are joined by the thermal insulation area 7A.

The thermal insulation area 7A is thus provided, whereby the insulation properties between the flexible area 2 and the moving element 5 are enhanced and heat generated by a diffused resistor 6 is prevented from escaping to the moving element 5 for efficiently heating the flexible area 2, thereby decreasing power consumption.

The rigidity of a thermal insulation area 7 provided between a semiconductor substrate 3 and the flexible area 2 is made different from that of the thermal insulation area 7A provided between the flexible area 2 and the moving element 5 for determining the displacement direction of the moving element 5. For example, the rigidity of the thermal insulation area 7 is made higher than that of the thermal insulation area 7A, whereby the moving element 5 can be displaced downward in the thickness direction of the semiconductor substrate 3 (downward in FIG. 11); the rigidity of the thermal insulation area 7 is made lower than that of the thermal insulation area 7A, whereby the moving element 5 can be displaced to an opposite side.

In the embodiment, a round for easing a stress applied when the flexible area 2 is displaced is provided in the proximity of the joint part of the flexible area 2 and the semiconductor substrate 3 or the joint part of the flexible area 2 and the moving part 5.

That is, as shown in FIG. 12B, a projection part 25 projecting inward roughly from the center of each side of the semiconductor substrate 3 which becomes a frame and the flexible area 2 are joined by the thermal insulation area 7, and a round 25a is formed so that the shape on the substrate face on the semiconductor substrate 3 becomes like R at both ends of the base end part of the projection part 25. A mask is formed and wet etching, etc., is executed, thereby forming the rounds 25a.

As shown in FIG. 12A, a recess part 27 is made from the lower face side of the semiconductor substrate 3 in the figure and a thin portion 2S forming a part of the flexible area 2 is formed in a bottom face part 27a of the recess part 27, and a round 28 is formed so as to become shaped like R on the boundary between the bottom face part 27a and a flank part 27b of the recess part 27. The recess part 27 is made by etching from the substrate face of the semiconductor substrate. For example, a sacrificial layer is formed on the boundary between the bottom face part 27a and the flank part 27b of the recess part 27 and is removed by etching, whereby isotropy when the sacrificial layer is diffused is used to form the round 28.

The rounds 25a and 28 are thus formed, whereby the stress applied when the flexible area 2 is displaced is scattered and eased by means of the rounds 25a and 28, preventing the semiconductor substrate 3 from being destroyed. That is, if both base end part ends of the projection part 25 projecting inward from the semiconductor substrate 3 have an edge, there is a possibility that the stress of the flexible area 2 will concentrate on the edge, breaking the semiconductor substrate 3. Likewise, if the boundary between the bottom face part 27a and the flank part 27b of the recess part 27 provided for forming the flexible area 2 has an edge, there is a possibility that the stress of the flexible area 2 will concentrate on the edge, breaking the semiconductor substrate 3.

Figure 13:
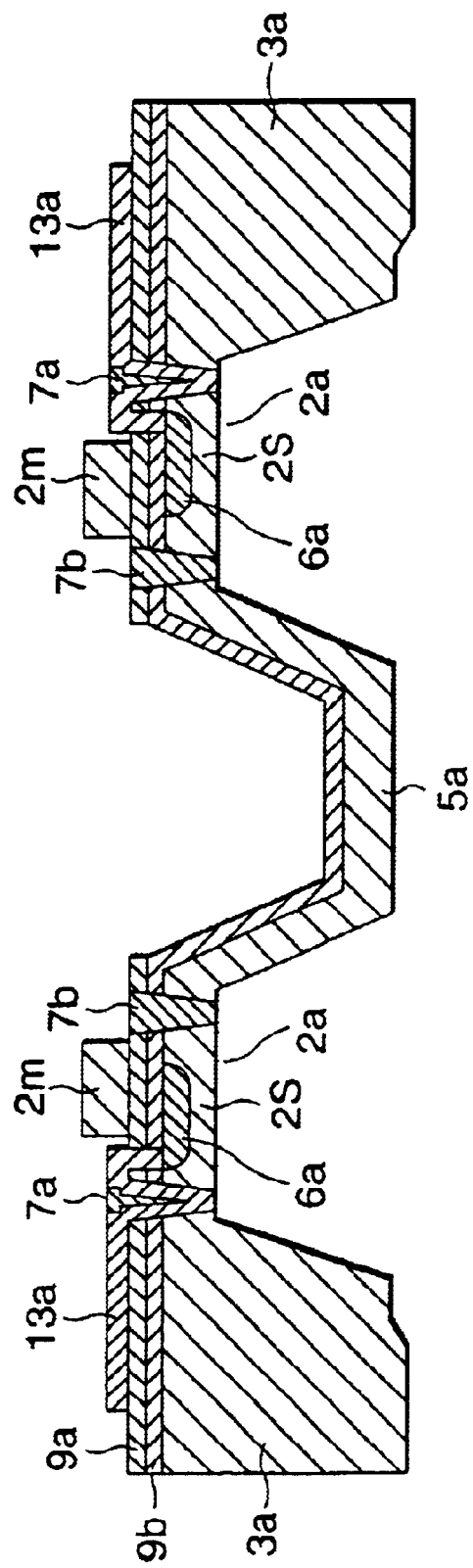
FIG. 13 is a sectional view to show the structure of another semiconductor microactuator.

FIG. 13 shows another structure example of the semiconductor microactuator formed with the thermal insulation areas between the flexible area and the semiconductor substrate and between the flexible area and the moving element as shown in FIGS. 11 and 12, and a manufacturing method therefor will be discussed.

As shown in FIG. 13, a semiconductor substrate 3a and a flexible area 2a are joined via a thermal insulation area 7a and the flexible area 2a and a moving element 5a are joined via a thermal insulation area 7b. The flexible area 2a is made up of a thin film 2m and a thin portion 2s different in thermal expansion coefficient, and a diffused resistor 6a is placed on a surface of the thin portion 2s. Wiring 13a for supplying power to the diffused resistor 6a is connected to the diffused resistor 6a through the bottom face of the thermal insulation area 7a from an electrode pad (not shown) on the semiconductor substrate 3a. Numerals 9a and 9b denote protective thin films.

Figure 14A:
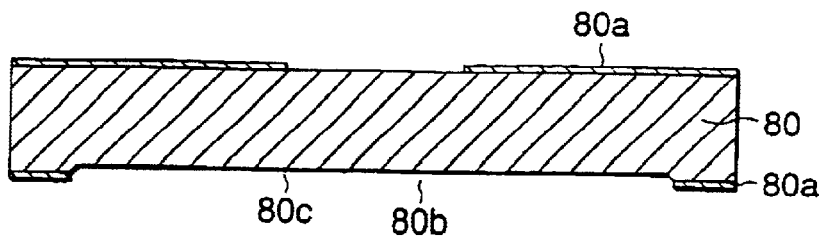
FIGS. 14(a) to 14(e) are sectional views to show a manufacturing method of the semiconductor microactuator in FIG. 13.

A manufacturing method of the semiconductor microactuator will be discussed with reference to FIGS. 14A to 14E. First, a silicon oxide film 80a is formed on both faces of a monocrystalline silicon substrate 80 by thermal oxidation, etc., and the silicon oxide film 80a formed on the rear face of the monocrystalline silicon substrate 80 is etched with a photoresist patterned to a predetermined pattern as a mask, thereby forming an opening 80b, and the photoresist is removed by plasma ashing, etc. The formed opening 80b is etched in aqueous potassium hydroxide (aqueous KOH), etc., thereby forming a gap 80c (FIG. 14A). At this time, TMAH (tetramethyl ammonium hydroxide solution), a hydrazine water solution, etc., may be used in place of the aqueous KOH. This also applies in the description to follow.

Figure 14B:
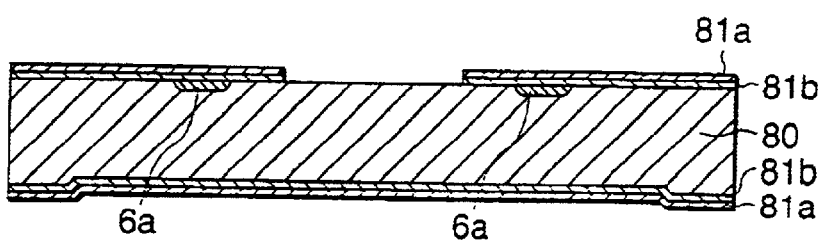

Next, the silicon oxide film 80a is fully removed, then boron, etc., is deposited and thermally diffused and diffused resistors 6a as heaters are formed on the surface of the monocrystalline silicon substrate 80. Subsequently, a silicon oxide film 81b is formed on both faces of the monocrystalline silicon substrate 80 by thermal oxidation, etc., and a silicon nitride film 81a is formed on the top of each silicon oxide film 81b by low-pressure CVD (chemical vapor deposition) (FIG. 14B).

Figure 14C:
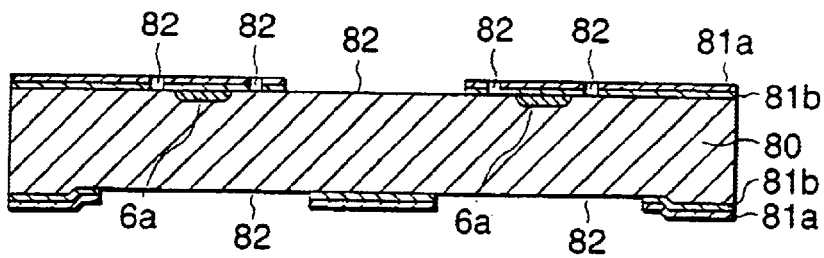

The silicon oxide films 81b and the silicon nitride film 81a are etched with photoresists patterned to predetermined patterns as masks, thereby forming openings 82, and the photoresists are removed by plasma ashing, etc., (FIG. 14C).

Figure 14D:
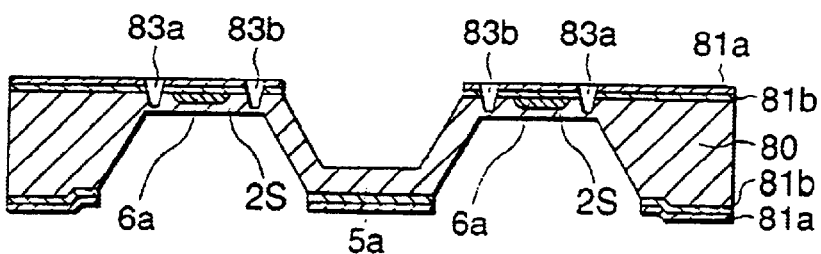

Next, the openings 82 in the monocrystalline semiconductor substrate 80 are etched in aqueous KOH, etc., thereby forming a moving element 5a and thin portions 2s. At this time, to provide the moving element 5a with any desired thickness and each thin portion 2s with any desired thickness, etching from each face of the monocrystalline semiconductor substrate 80 may be started at different timing. Then, the monocrystalline semiconductor substrate 80 is etched, thereby forming grooves 83a and 83b to form thermal insulation areas 7a and 7b. The grooves 83a and 83b are grooves to be filled with an organic material of polyimide, etc., at a later step, and etching is performed so that the bottom thickness of each groove becomes about 10 $\mu$m (FIG. 14D).

Figure 14E:
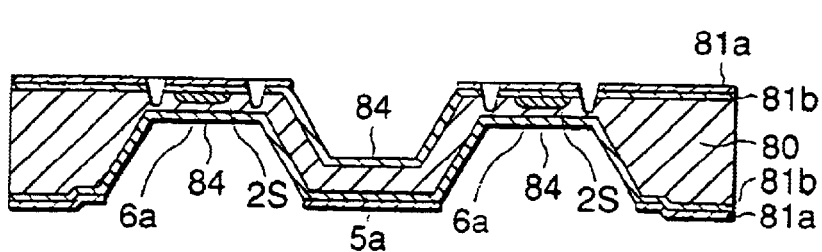

Subsequently, the substrate surface etched to form the moving element 5a and the thin portions 2s is oxidized for forming protective films 84 required when the substrate is plated (FIG. 14E).

Figure 15A:
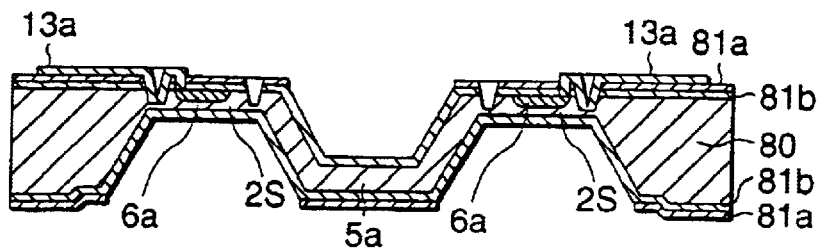

Aluminum is put on the top face of the monocrystalline semiconductor substrate 80 by sputtering or EB evaporation and wiring 13a (aluminum wiring) connected to the diffused resistors 6a is formed (FIG. 15A).

Figure 15B:
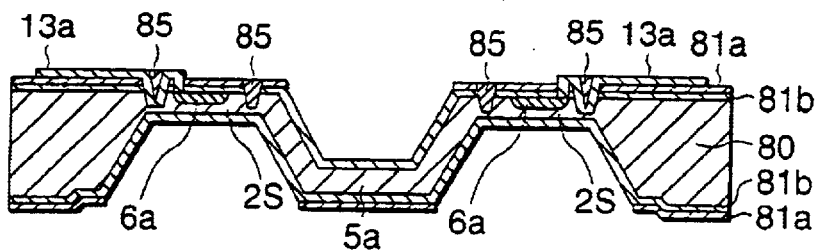

Next, the grooves 83a and 83b are filled with an organic substance 85 of polyimide, etc., (FIG. 15B). Thus, a structure wherein the wiring 13a is formed on the lower faces of the organic substances 85 is provided. The organic substances 85 of polyimide, etc., are formed only in predetermined portions using a semiconductor lithography process.

Figure 15C:
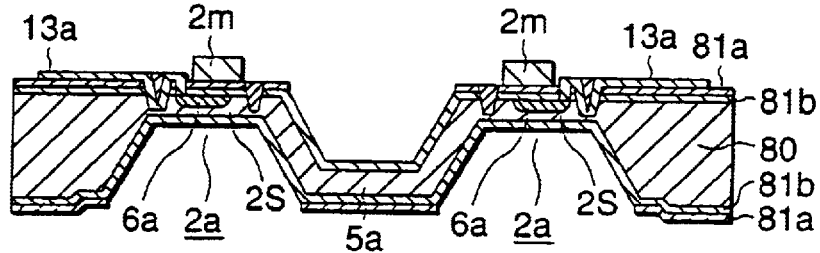

Next, a metal pattern of a predetermined pattern is formed on the silicon nitride film 81a (the protective thin film 9a in FIG. 13) above the thin portions 2s by plating, etc., to form thin films 2m (FIG. 15C). The thin portions 2s and the thin films 2m make up a bimetal structure of a drive source of the semiconductor microactuator.

Figure 15D:
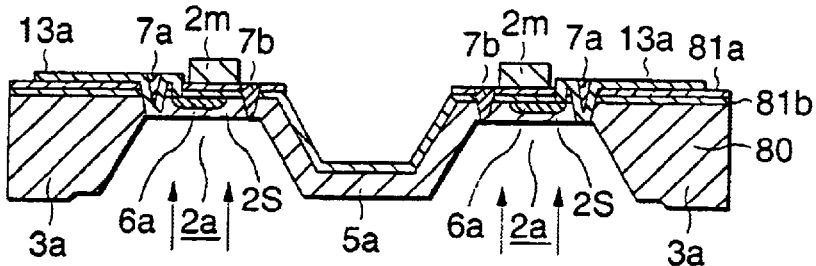

Next, etching is performed by RIE, etc., from the rear faces of the thin portions 2s and the thin portions 2s are separated from the periphery of the monocrystalline semiconductor substrate 80 (the semiconductor substrate 3a in FIG. 13) and the moving element 5a (FIG. 15D), whereby the moving element 5a, the flexible areas 2a, and the semiconductor substrate 3a are thermally insulated and the thermal insulation area 7a, 7b is provided therebetween.

Figure 16:
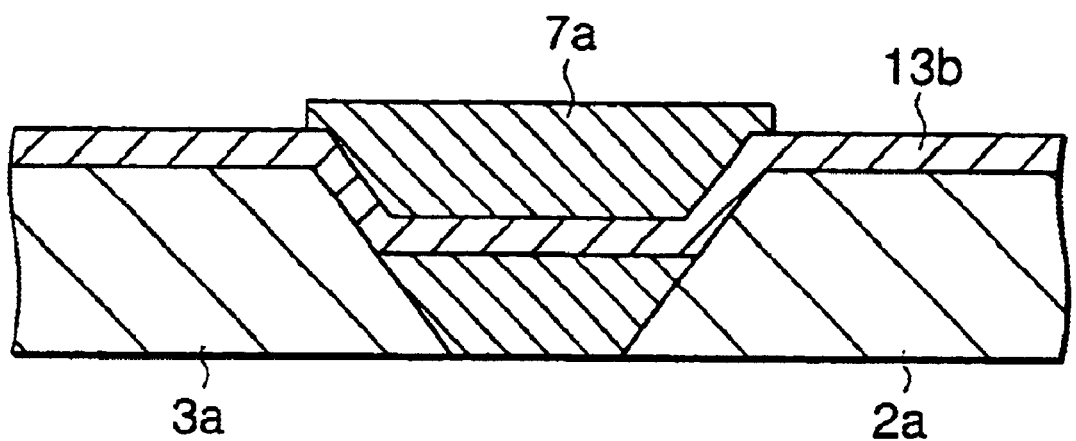
FIG. 16 is a sectional view to show another wiring structure of the semiconductor microactuator in FIG. 13.

By the way, in the structure example shown in FIG. 13, the wiring 13a is placed on the lower part face of the thermal insulation area 7a, but wiring (aluminum wiring) 13b may be placed roughly in the middle of the top and bottom faces of each thermal insulation area 7a, namely, in the thermal insulation areas 7a, as shown in FIG. 16.

To thus form the wiring 13b, after the formation step of the protective film 84 shown in FIG. 14E, the grooves 83a formed at the step in FIG. 14D may be filled with polyimide roughly to the centers at the step of filling with the organic substance 85 of polyimide, etc., shown in FIG. 15B, the wiring formation step shown in FIG. 15A may be performed, and the grooves 83a may be filled by again executing the filling step shown in FIG. 15B.

Since the wiring 13b is thus formed in the thermal insulation areas 7a, the aluminum protection effect at an etching step, etc., of later steps, is produced and a high-reliability wiring structure can be provided.

In the above-described wiring structure, the wiring may be placed on the top faces of the thermal insulation areas (FIG. 12A); the wiring is formed on the face on the side where the flexible areas, the thermal insulation areas, and the semiconductor substrate flush with each other, so that the wiring level difference is lessened and the line break prevention effect is produced as compared with the case where the wiring is placed in the thermal insulation areas or on the bottom faces thereof.

To thus form the wiring on the top faces of the thermal insulation areas, after the formation step of the protective film 84 shown in FIG. 14E, the grooves 83a formed at the step in FIG. 14D may be filled with polyimide at the step of filling with the organic substance 85 of polyimide, etc., shown in FIG. 15B, then the wiring may be formed on the top face of polyimide at the wiring formation step shown in FIG. 15A.

Third Embodiment

Figure 17:
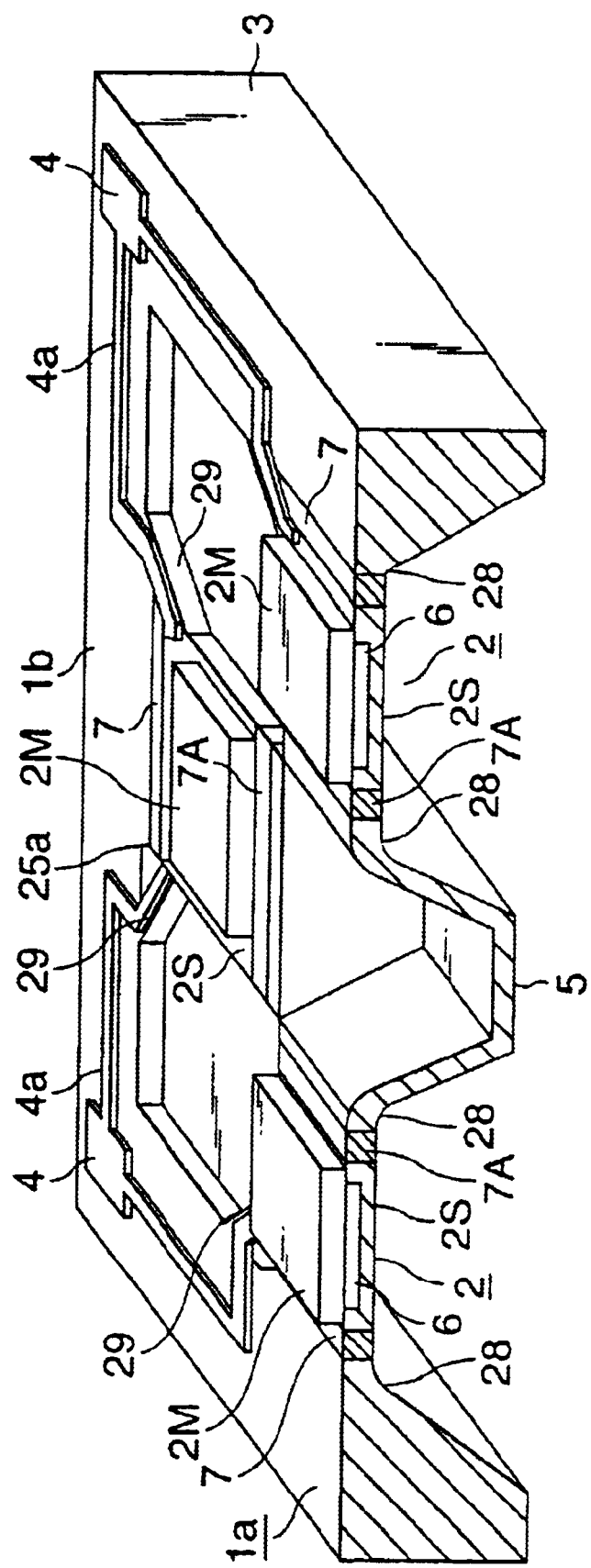
FIG. 17 is a partially cutaway view in perspective of the structure of a semiconductor microactuator corresponding to a third embodiment of the invention.
Figure 18:
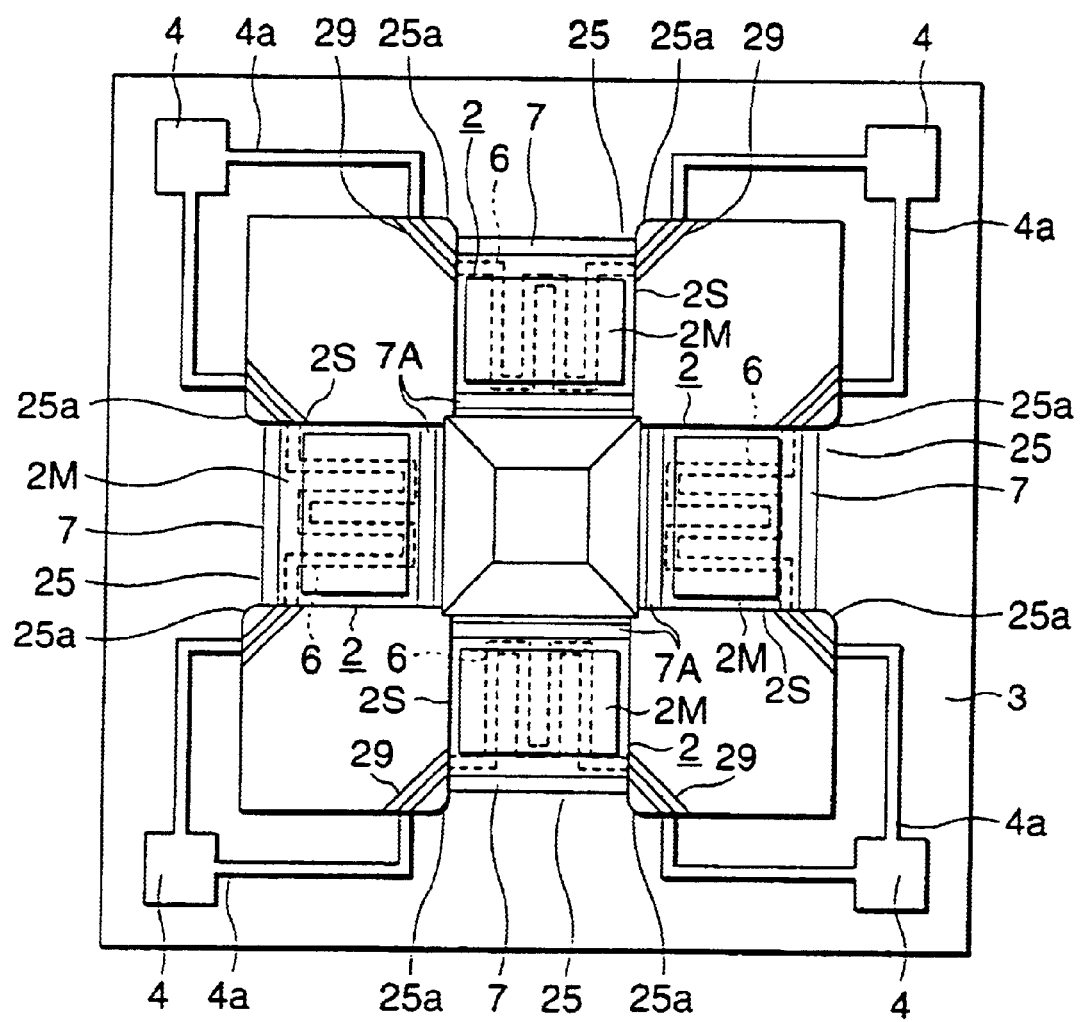
FIG. 18 is a top view to show the structure of the semiconductor microactuator corresponding to the third embodiment of the invention.

Next, a third embodiment of the invention will be discussed. FIGS. 17 and 18 are a perspective view and a top view to show the structure of a semiconductor microactuator in the third embodiment of the invention. A semiconductor microactuator in the third embodiment differs from that in the second embodiment in that the wiring 4a for supplying power to the diffused resistors 6 is connected to the diffused resistors 6 through the tops of the thermal insulation areas 7 in the second embodiment; whereas, in the third embodiment, a fillet part 29 made of an organic material, for example, is formed in a part extending over a semiconductor substrate 3 and a thin portion 2S of a flexible area 2 (so-called inlet corner) and wiring 4a is formed through the fillet parts 29. That is, in the embodiment, the wiring 4a is formed without the intervention of thermal insulation areas 7.

This structure can be manufactured by the following method: A groove is formed from the side of the top face of the semiconductor substrate where flexible areas 2 are formed, for example, by anisotropic etching, a resin of an organic material, such as polyimide, is poured into the groove and is cured at a high temperature, and etching is performed for removal until the fillet parts 29 appear from the rear face of the semiconductor substrate, then the wiring 4a is formed on the top faces of the fillet parts 29 by sputtering, etc., aluminum.

The wiring 4a is made of a material having very good thermal conductivity, such as aluminum, and thus may be heat resistance of a fraction of that of thermal insulation area 7 made of a resin although it has a small cross-sectional area. If the wiring 4a is formed in the thermal insulation areas 7, the thermal insulation distance of the wiring 4a cannot be provided and consequently the thermal insulation performance of the thermal insulation areas 7 cannot be provided. In the embodiment, the wiring 4a is formed without the intervention of the thermal insulation areas 7, so that a large thermal insulation distance of the wiring 4a can be provided and the thermal insulation effect can be enhanced with heat resistance degradation suppressed. The mechanical strength of the thermal insulation areas 7 is increased as the fillet parts 29 are formed.

Thus, with the semiconductor microactuator in the embodiment, the thermal insulation effect is enhanced and further low power consumption is enabled as compared with the semiconductor microactuator in the second embodiment.

Fourth Embodiment

Figure 19:
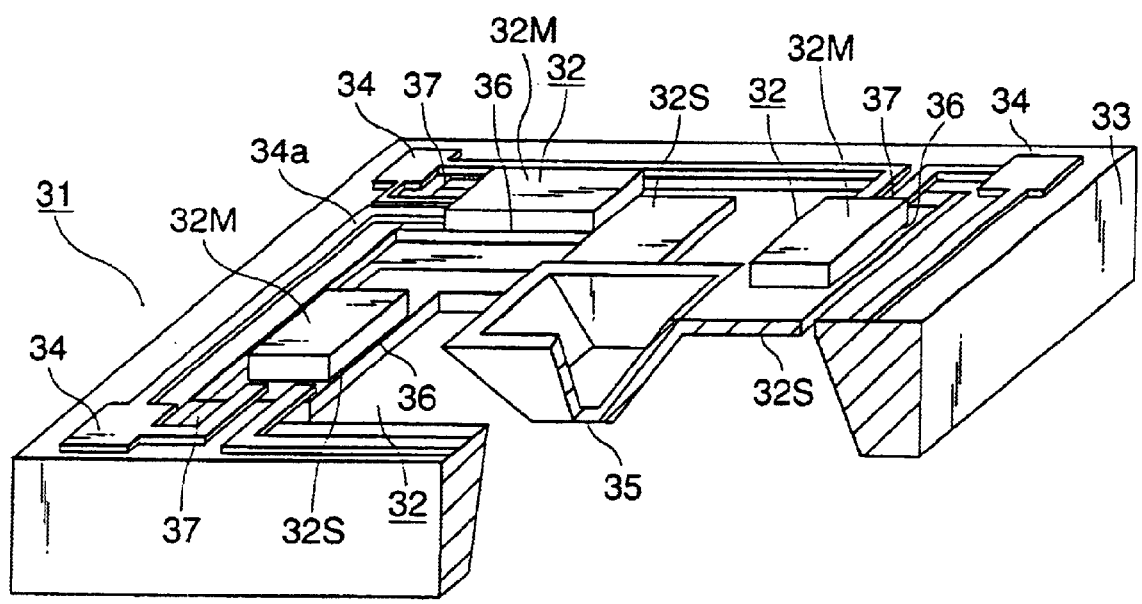
FIG. 19 is a partially cutaway view in perspective of the structure of a semiconductor microactuator corresponding to a fourth embodiment of the invention.
Figure 20:
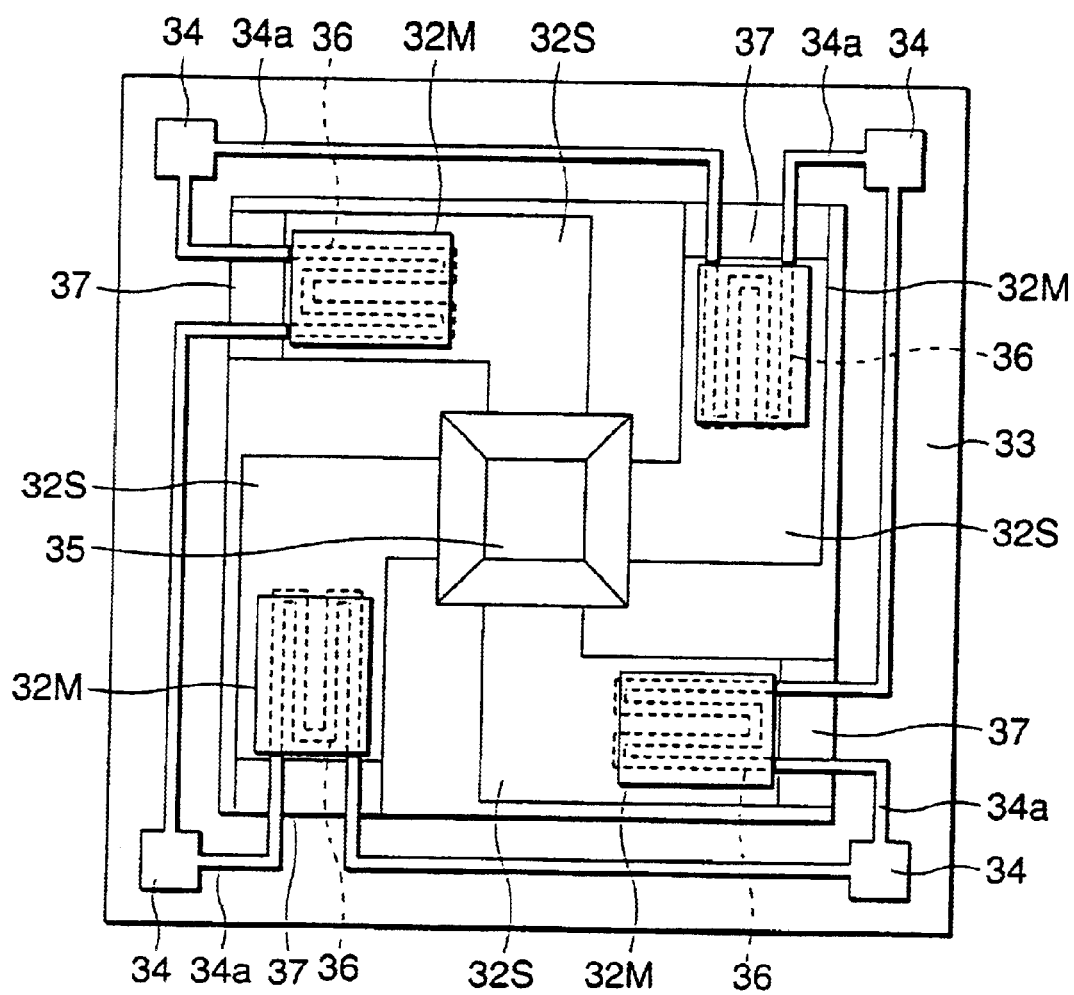
FIG. 20 is a top view to show the structure of the semiconductor microactuator corresponding to the fourth embodiment of the invention.

Next, a fourth embodiment of the invention will be discussed. FIGS. 19 and 20 are a perspective view and a top view to show the structure of a semiconductor microactuator in the fourth embodiment of the invention. A semiconductor microactuator 31 in the fourth embodiment differs from the semiconductor microactuator in the first embodiment in that the four thin portions 2S each shaped roughly like a quadrangle piece, of the flexible areas 2 are roughly in the shape of a cross with the moving element 5 at the center in the first embodiment; whereas, in the semiconductor microactuator 31 of the fourth embodiment, four thin portions 32S of flexible areas 32 are each shaped roughly like L, each thin portion 32S is connected at one end roughly to the center of each side of the top face margin opened like a quadrangle, of a moving element 35, and the flexible areas 32 are shaped like the Buddhist cross with the moving element 35 at the center. That is, the thin portions 32S of the flexible areas 32 are placed at equal intervals in every direction with the moving element 35 at the center. Further, each thin portion 32S is joined at an opposite end to the end of each side of a semiconductor substrate 33 of a quadrangular frame via a thermal insulation area 37.

Each flexible area 32 is made up of the thin portion 32S and a thin film 32M made of aluminum, nickel, etc., like the flexible area in the first embodiment, and each diffused resistor 36 of heating means is formed on the surface of the thin portion 32S as in the first embodiment. External power is supplied to the diffused resistors 36 via electrode pads 34 placed at the four corners of the semiconductor substrate 33 and wiring 34a. The semiconductor substrate 33, the flexible areas 32, and the thermal insulation area 37 make up a semiconductor device 38.

In the semiconductor microactuator 31, like the semiconductor microactuator of the first embodiment, as the temperatures of the diffused resistors 36 rise, the flexible areas 32 are heated and are displaced downward because of the thermal expansion difference between each thin portion 32S and each thin film 32M (if the thin film 32M has a larger thermal expansion coefficient than the thin portion 32S). The flexible areas 32 are displaced downward, whereby the moving element 35 joined to the flexible areas 32 receives the thermal stress of the flexible areas 32 and is displaced downward with respect to the semiconductor substrate 33.

In the embodiment, the flexible areas 32 are shaped like the Buddhist cross with the moving element 35 at the center as described above, thus the displacement of the moving element 35 contains rotation in the horizontal direction with respect to the semiconductor substrate 33. Since each flexible area 32 is shaped like L, the length of the flexible area 32 can be made long as compared with the case where the flexible area 32 is shaped simply like a quadrangle piece, and the displacement of the flexible area 32 becomes large, so that displacement of the moving element 35 can be made large. The semiconductor device 38 may adopt any of the structures shown in FIGS. 3, 6, and 9, and a semiconductor microactuator having similar advantages to those of the semiconductor microactuators described above can be provided.

Fifth Embodiment

Figure 21:
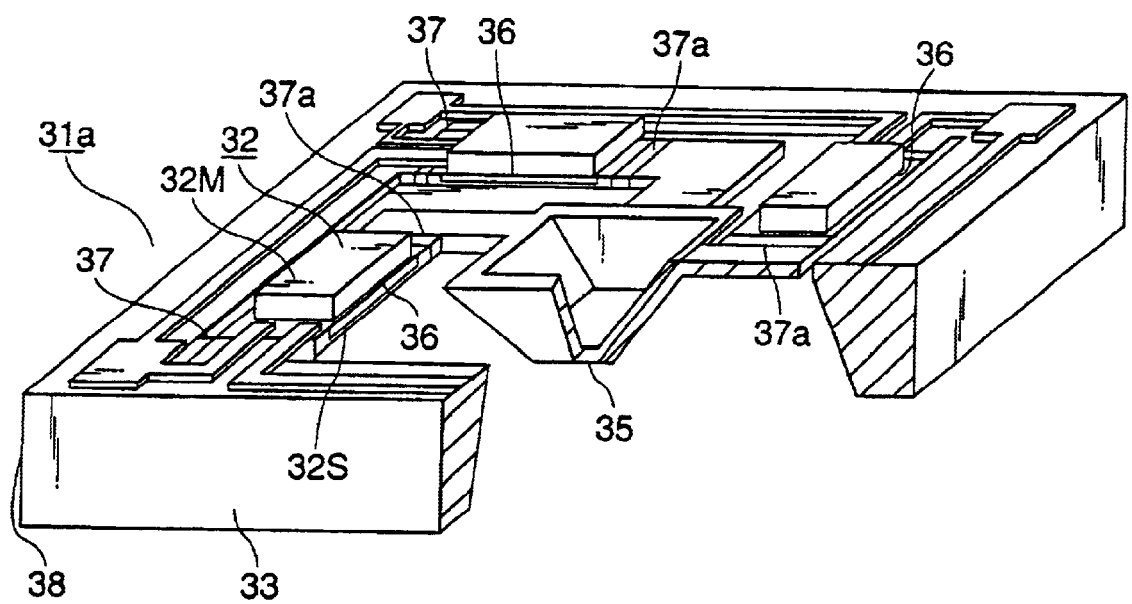
FIG. 21 is a partially cutaway view in perspective of the structure of a semiconductor microactuator corresponding to a fifth embodiment of the invention.
Figure 22:
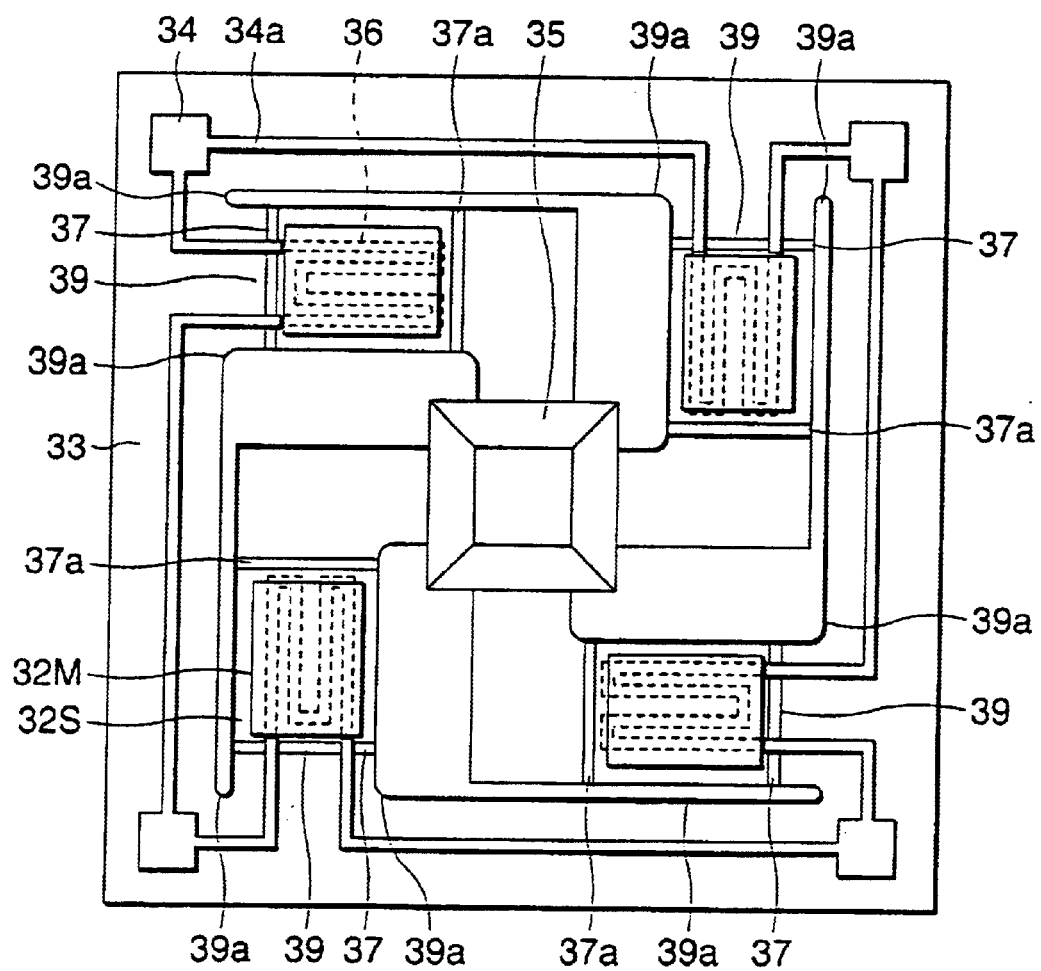
FIG. 22 is a top view to show the structure of the semiconductor microactuator corresponding to the fifth embodiment of the invention.

Next, a fifth embodiment of the invention will be discussed. FIGS. 21 and 22 are a perspective view and a top view to show the structure of a semiconductor microactuator of the fifth embodiment of the invention. A semiconductor microactuator 31a of the embodiment also includes flexible areas 32 shaped like the Buddhist cross with a moving element 35 at the center and has thermal expansion areas 37a each placed between the moving element 35 and each flexible area 32 for joining the moving element 35 and the flexible areas 32.

The thermal expansion areas 37a thus provided, whereby the heat insulation properties between the flexible areas 32 and the moving element 35 is enhanced and the heat generated by diffused resistors 36 can be prevented from escaping to the moving element 35. Therefore, the flexible areas 32 can be heated efficiently for decreasing power consumption as compared with the fourth embodiment.

In the embodiment, a round for easing a stress applied when the flexible area 32 is displaced is provided in the proximity of the joint part of the flexible area 32 and a semiconductor substrate 33 or the joint part of the flexible area 32 and the moving part 5 as in the embodiment previously described with reference to FIGS. 11 and 12. For example, as shown in FIG. 22A, a round 39a shaped like R is formed at both base end part ends of a projection part 39 projecting inward from each side end part of the semiconductor substrate 33.

Sixth Embodiment

Figure 23:
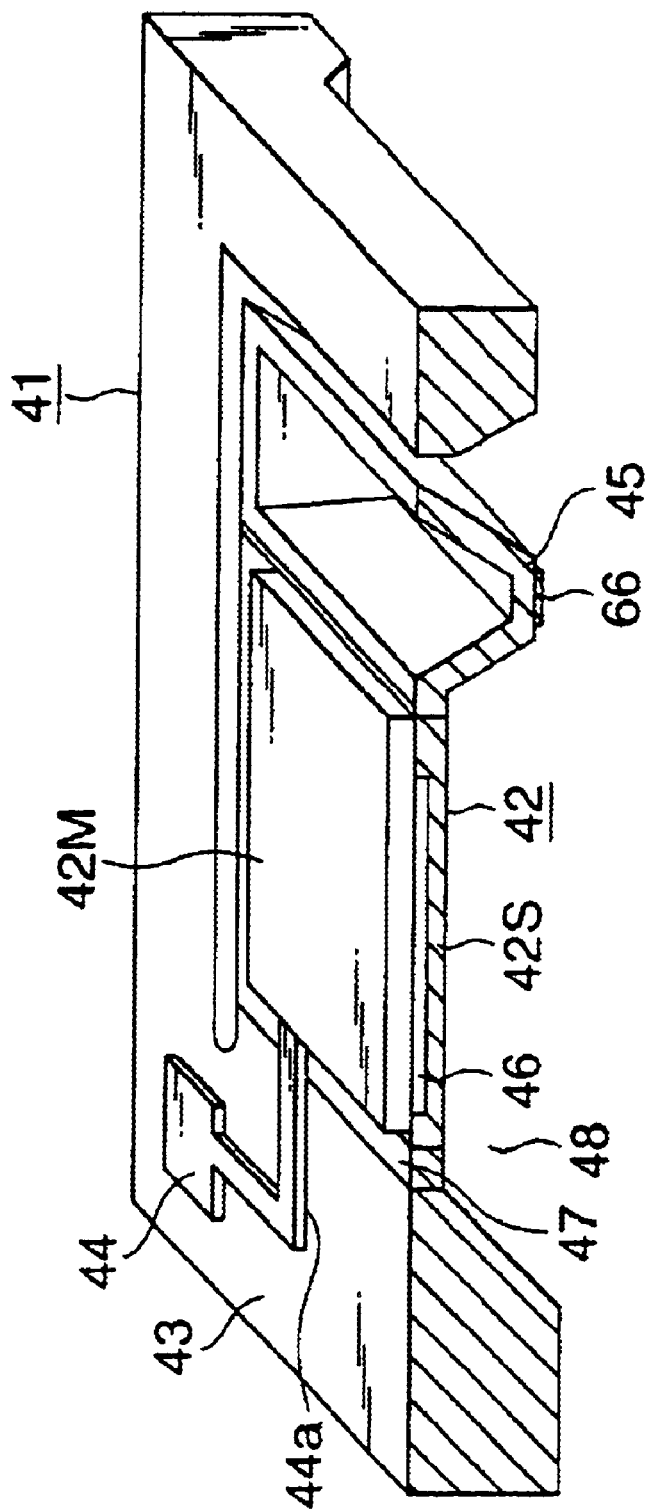
FIG. 23 is a partially cutaway view in perspective of the structure of a semiconductor microactuator corresponding to a sixth embodiment of the invention.

Next, a sixth embodiment of the invention will be discussed. FIG. 23 is a perspective view to show the structure of a semiconductor microactuator of the sixth embodiment of the invention. A semiconductor microactuator 41 of the embodiment includes a semiconductor substrate 43 which becomes a hollow frame shaped roughly like a quadrangle, four thin portions 42S each shaped roughly like a quadrangle piece, the thin portions 42S separated from the semiconductor substrate 43 with one ends joined via thermal insulation areas 47 inwardly from the sides of the semiconductor substrate 43, a moving element 45 formed like a hollow quadrangular prismoid with the top face opened like a quadrangle and narrower toward the bottom, the moving element 45 having top opening margins connected to opposite ends of the thin portions 42S, and thin films 42M of aluminum thin films, nickel thin films, or the like placed on the top faces of the thin portions 42S, each thin film 42M and each thin portion 42S making up a flexible area 42.

The semiconductor substrate 43, the thin portions 42S, and the moving element 45 are formed, for example, by working a semiconductor substrate of a silicon substrate, etc. Each thin portion 42S is formed on a surface with an impurity-diffused resistor 46 (diffused resistor 46) of heating means. Power is supplied to the diffused resistors 46 by wiring 44a connected to electrode pads 44 placed on the semiconductor substrate 43 and connected to an external power supply, and the temperatures of the diffused resistors 46 rise, heating the flexible areas 42. The thin film 42M is made of aluminum, nickel, or the like as described above and the thin portion 42S is made of silicon, etc.; the thin film 42M and the thin portion 42S have different thermal expansion coefficients.

Each thermal insulation area 47 for joining the semiconductor substrate 43 and the flexible area 42 has roughly the same thickness as the thin portion 42S and is made of a thermal insulation material such as a fluoridated resin or polyimide for thermally insulating the semiconductor substrate 43 and the flexible area 42. The semiconductor substrate 43, the flexible areas 42, and the thermal insulation areas 47 each between the semiconductor substrate 43 and the flexible area 42 make up a semiconductor device 48. The semiconductor microactuator 41 has a cantilever structure with each flexible area 42 supported at one end on the semiconductor substrate 43.

In the semiconductor microactuator 41, upon application of power to the diffused resistors 46, the temperature rises, heating the flexible areas 42, and a thermal stress occurs because of the difference between the thermal expansion coefficients of the thin film 42M and the thin portion 42S making up each flexible area 42. For example, if metal thin films of aluminum, nickel, etc., are formed as the thin films 42M, the metal of aluminum, nickel, etc., has a lager thermal expansion coefficient than silicon forming the thin portions 42S, so that the flexible areas 42 are bent downward in the figure. The moving element 45 placed contiguous with the flexible areas 42 receives the thermal stress of the flexible areas 42 and is displaced downward with respect to the semiconductor substrate 43.

In the embodiment, the flexible areas 42 are of cantilever structure, so that large flexibility of the flexible areas 42 can be provided and displacement of the flexible areas 42 at the heating time becomes large. Thus, displacement of the moving element 45 becomes large and a large force is provided. The semiconductor device 48 may adopt any of the structures previously described with reference to FIGS. 3, 6, and 9 in the first embodiment, and a semiconductor microactuator having similar advantages to those of the semiconductor microactuators described above can be provided.

Seventh Embodiment

Figure 24:
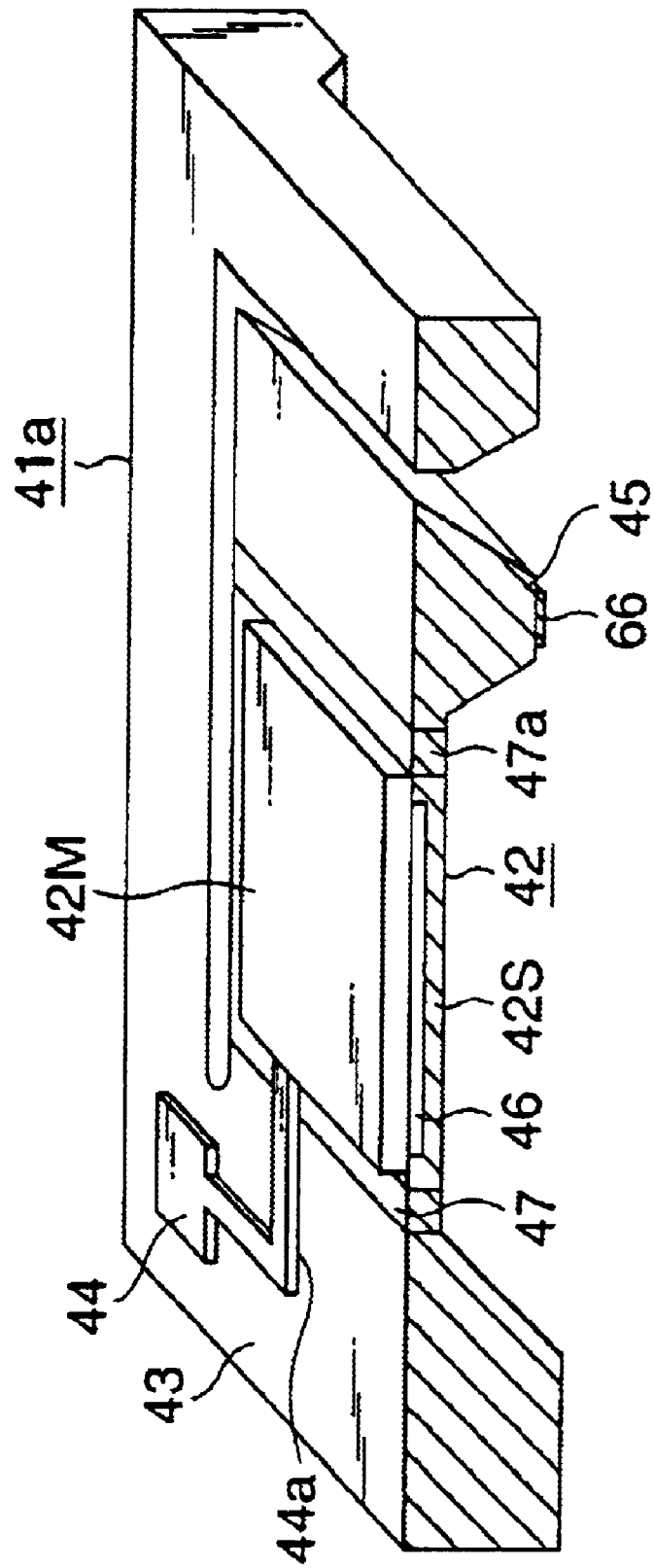
FIG. 24 is a partially cutaway view in perspective of the structure of a semiconductor microactuator corresponding to a seventh embodiment of the invention.

Next, a seventh embodiment of the invention will be discussed. FIG. 24 is a perspective view to show the structure of a semiconductor microactuator 41a of the seventh embodiment of the invention. The seventh embodiment differs from the sixth embodiment in that each flexible area 42 and a moving element 45 are joined by a thermal insulation area 47a made of a resin such as polyimide or a fluoridated resin, the thermal insulation area 47a being placed between the flexible area 42 and the moving element 45.

The new thermal insulation area 47a is thus provided, whereby the insulation properties between the flexible area 42 and the moving element 45 are enhanced and heat generated by a diffused resistor 46 can be prevented from escaping to the moving element 45; the flexible areas 42 can be heated efficiently for decreasing power consumption as compared with the sixth embodiment.

Eighth Embodiment

Figure 25:
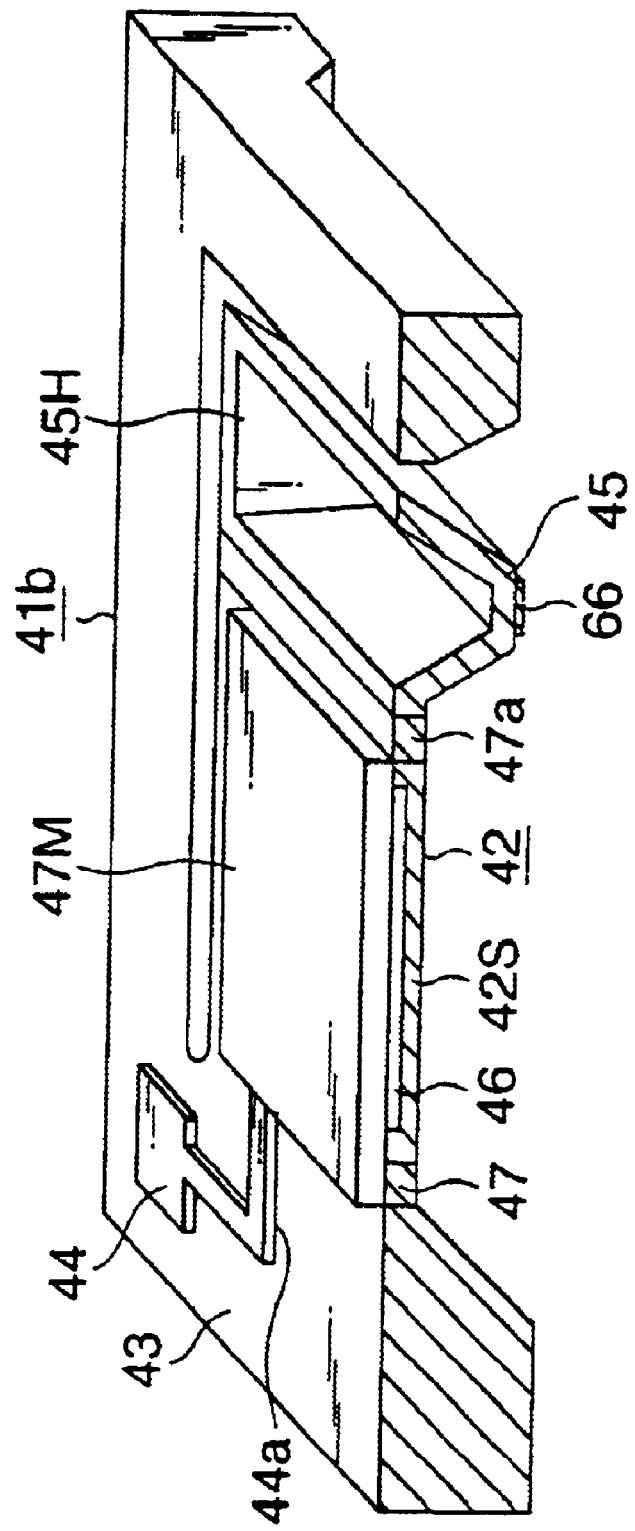
FIG. 25 is a partially cutaway view in perspective of the structure of a semiconductor microactuator corresponding to an eighth embodiment of the invention.

Next, an eighth embodiment of the invention will be discussed. FIG. 25 is a perspective view to show the structure of a semiconductor microactuator 41b of the eighth embodiment of the invention. The eighth embodiment differs from the seventh embodiment in that a thin film 47M of a flexible area 42 and a thermal insulation area 47 are made of the same material, a resin having thermal insulation properties, such as polyimide or a fluoridated resin, whereby it is made possible to form the thermal insulation area 47 and the thin film 47M at the same time; the manufacturing process can be simplified.

Figure 26:
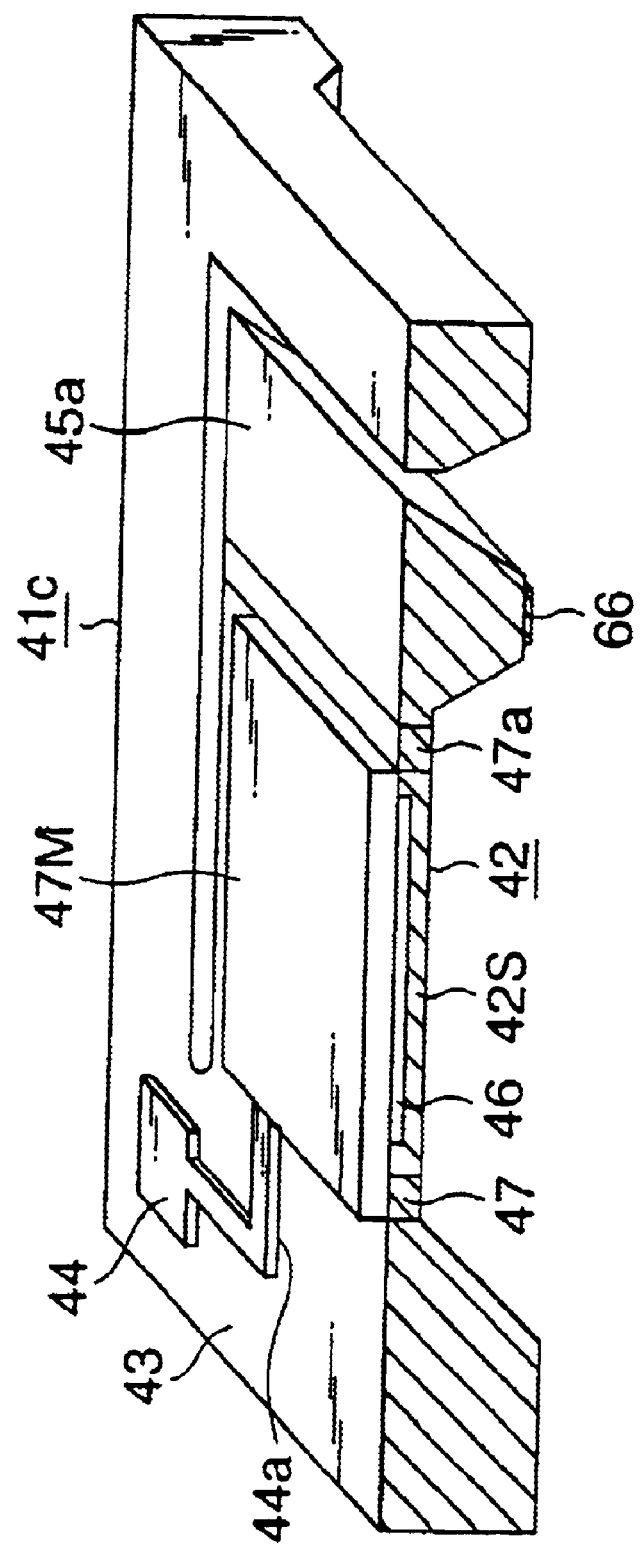
FIG. 26 is a partially cutaway view in perspective of the structure of another semiconductor microactuator.

A moving element 45 of the semiconductor microactuator 41b is formed with a concave part 45H as a groove made from the top face. The heat capacity of the moving element 45 lessens as compared with a moving element 45a of a semiconductor microactuator 41c shown in FIG. 26 (the moving element 45a formed with no concave part), so that the temperatures of the flexible areas 42 can be raised rapidly. The concave part 45H is formed, whereby the weight (volume) of the moving element lessens, so that the semiconductor microactuator 41b also has the advantage that it does not malfunction upon reception of an external shock.

Ninth Embodiment

Figure 27:
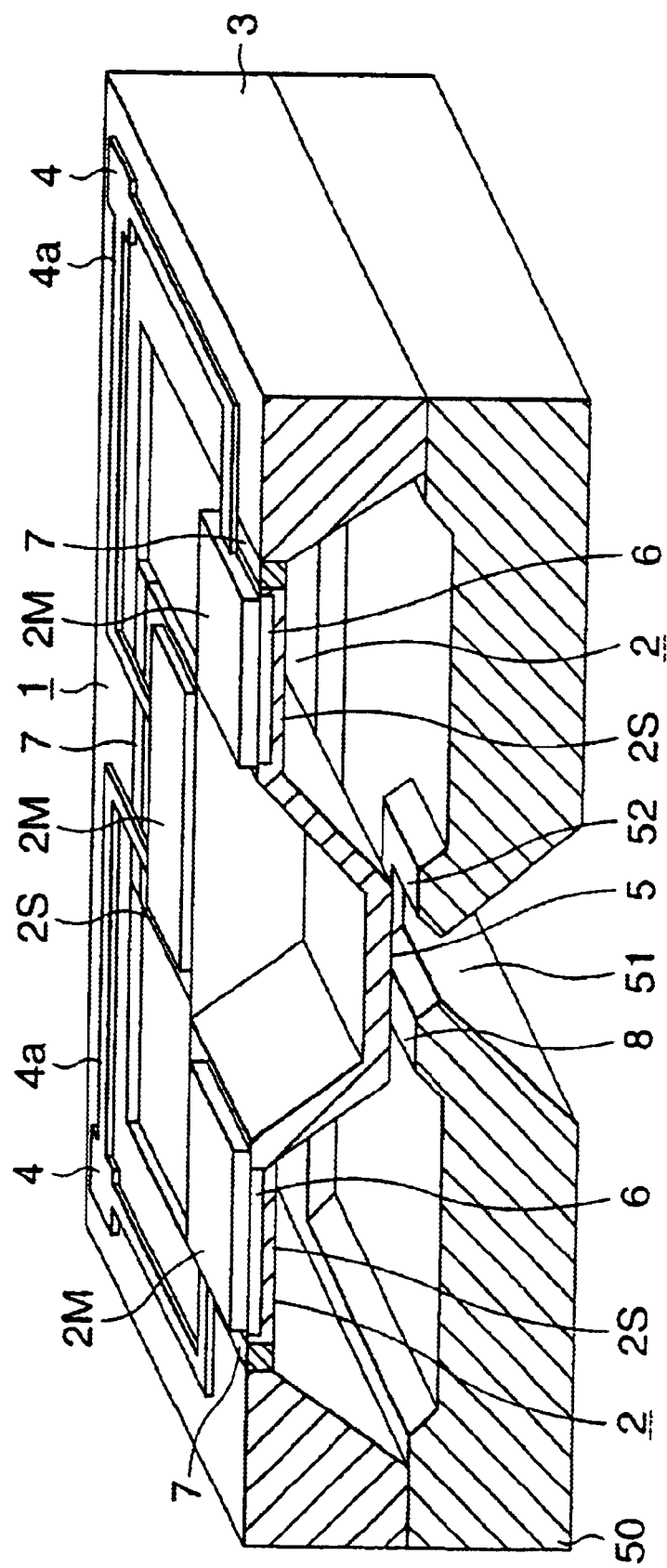
FIG. 27 is a partially cutaway view in perspective of the structure of a semiconductor microvalve corresponding to a ninth embodiment of the invention.

Next, a ninth embodiment of the invention will be discussed. FIG. 27 is a partially cutaway view in perspective of the structure of a semiconductor microvalve 55 in the ninth embodiment of the invention. The semiconductor microvalve 55 includes a pedestal 50 of a fluid element formed by working a substrate and an actuator section joined onto the top of the pedestal 50 by anodic junction or eutectic junction. The semiconductor microactuator 1 comprising the flexible areas 2 in the shape of a cross with the moving element 5 at the center previously described with reference to FIGS. 1 and 2 is used as the actuator section.

The pedestal 50 is formed with a through hole 51 (so-called orifice) corresponding to a fluid flow passage at the position corresponding to the moving element 5 of the semiconductor microactuator 1 placed on the surface of the pedestal 50, and a bed part 52 with a roughly flat top face, projecting from the surroundings is formed in the periphery of a top face opening of the through hole 51. The moving element 5 corresponds to a so-called valve body.

In the described semiconductor microvalve 55, when power is supplied to the diffused resistors 6 for heating the flexible areas 2, each flexible area 2 is displaced because of the thermal expansion difference between the thin portion 2S and the thin film 2M and the moving element 5 joined to the flexible areas 2 is displaced. As the moving element 5 is displaced, the spacing between the bottom face part of the moving element 5 and the bed part 52 of the pedestal 51 changes, controlling the quantity of the fluid flowing through the through hole 51.

The semiconductor microvalve 55 of the embodiment is also formed with the thermal insulation area 7 made of a resin of polyimide, etc., between the semiconductor substrate 3 and each flexible area 2, so that the heat for heating the flexible areas 2 can be prevented from escaping to the semiconductor substrate 3. Thus, it is made possible to suppress power consumption in driving the semiconductor microvalve.

Since the four flexible areas 2 are in the shape of a cross with the moving element 5 at the center, the semiconductor microvalve is provided with good control accuracy of the moving element 5 and fluid.

Figure 28:
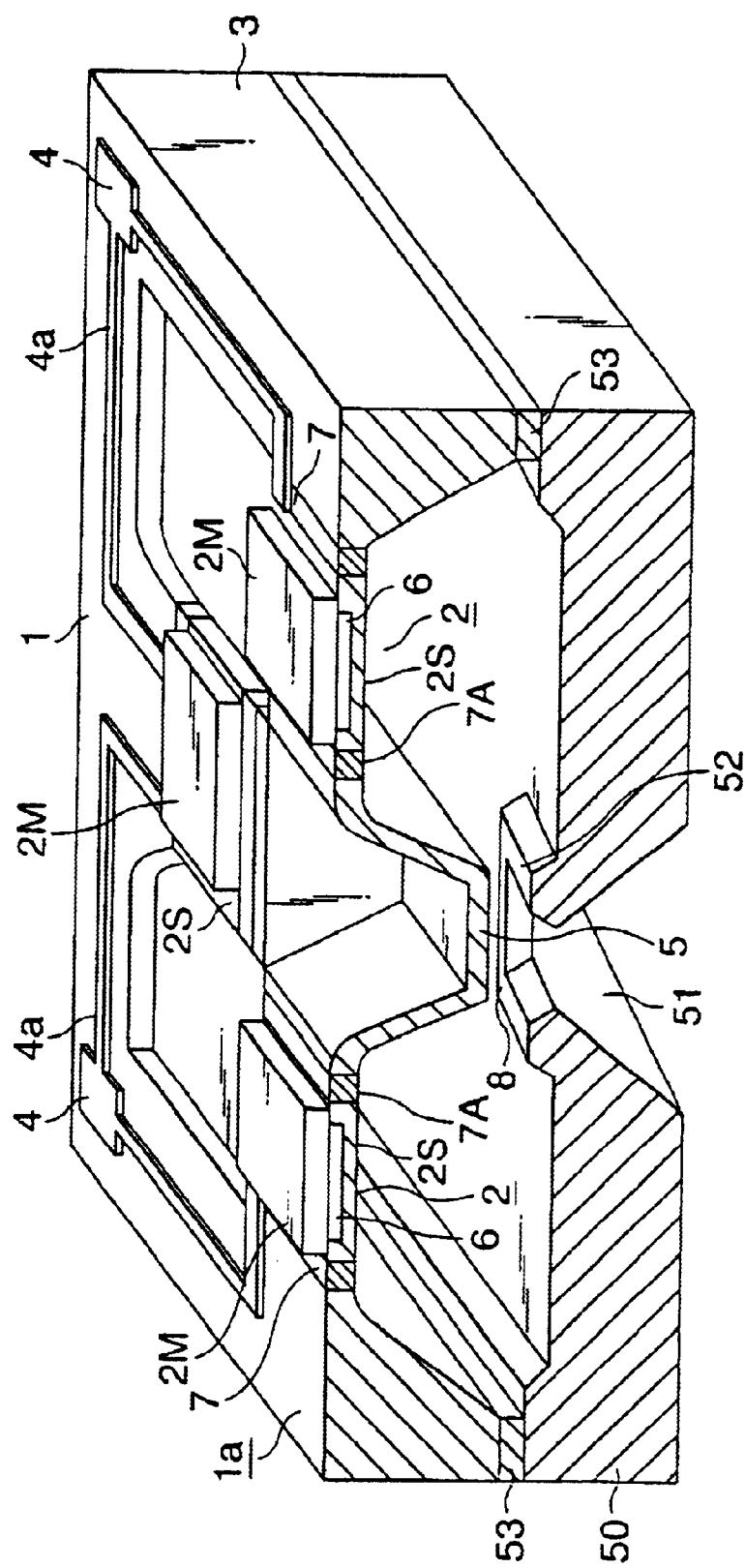
FIG. 28 is a partially cutaway view in perspective of the structure of another semiconductor microvalve.

FIG. 28 shows a configuration example of using the semiconductor microactuator 1a previously described with reference to FIGS. 11 and 12 as the actuator section of the semiconductor microvalve in FIG. 27. The semiconductor microvalve in FIG. 28 includes the pedestal 50 and the semiconductor microactuator 1a joined via spacer layers 53 made of polyimide.

The thermal insulation area 7A is also provided between each flexible area 2 and the moving element 5, so that it is made possible to more lessen the escape heat from the flexible areas 2 as compared with the semiconductor microvalve shown in FIG. 27, and power consumption in driving the semiconductor microvalve can be suppressed.

The advantage provided by providing rounds each for easing a stress applied when the flexible area 2 is displaced in the joint part of the flexible area 2 and the semiconductor substrate 3 or in the proximity of the joint part of the flexible area 2 and the moving part 5 is similar to that previously described with reference to FIGS. 11 and 12.

Further, the spacer layers 53 are formed between the pedestal 50 and the semiconductor microactuator 1a, whereby the following advantage is provided: Normally, the semiconductor microactuator 1a is made of a silicon substrate and the pedestal 50 is made of a glass substrate. Since both are joined under a high temperature (anodically joined at 400° C.), a stress occurs therebetween at a room temperature because of the shrinkage degree difference caused by the thermal expansion difference between the silicon and glass substrates. Since the stress concentrates on the flexible areas 2 of the semiconductor microactuator 1a, sufficient displacement of the flexible areas 2 cannot be provided and the drivability of the semiconductor microvalve worsens. Then, the spacer layers 53 are provided between the pedestal 50 and the semiconductor microactuator 1a, whereby the stress occurring therebetween can be absorbed and eased as described above.

The operation of the semiconductor microvalve in FIG. 28 is similar to that of the semiconductor microvalve in FIG. 27 and therefore will not be discussed again.

Figure 29:
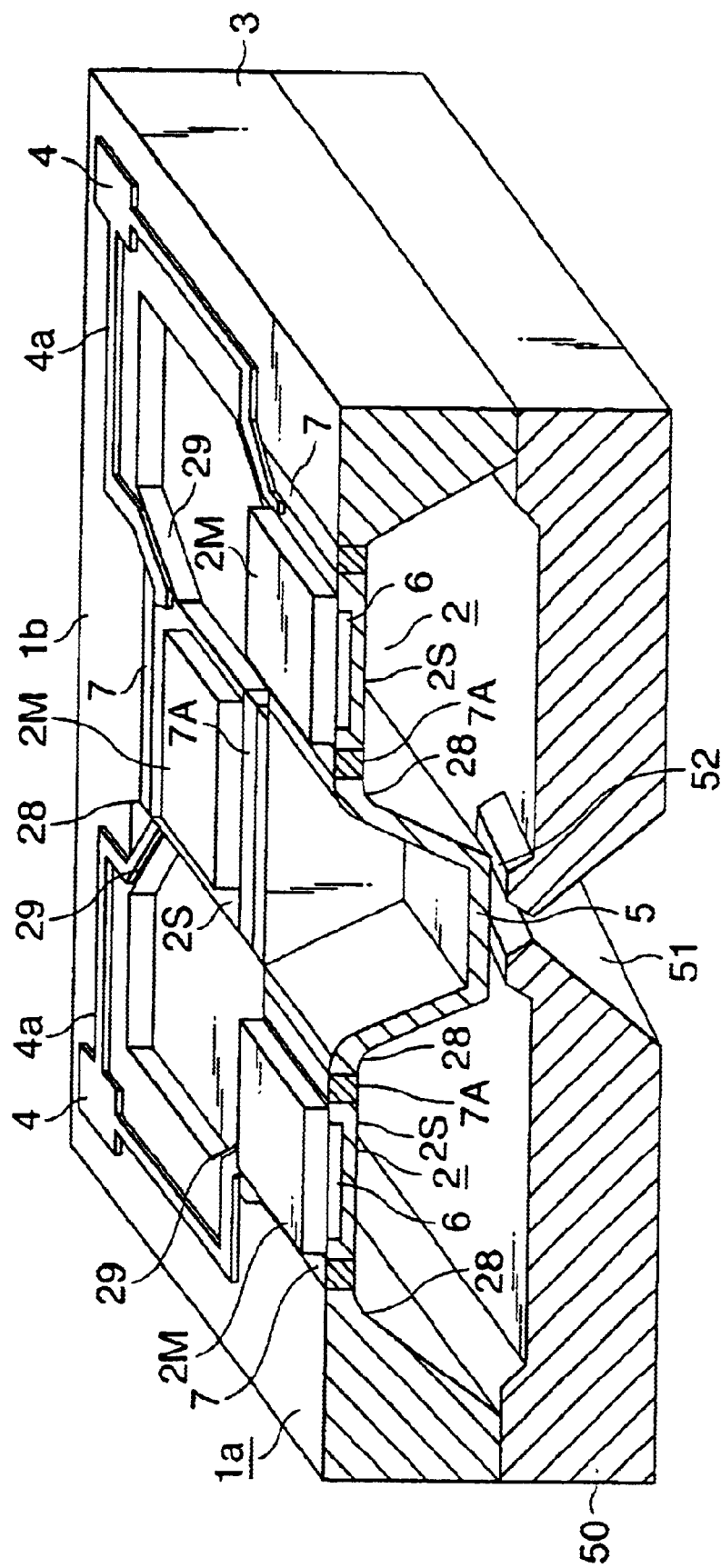
FIG. 29 is a partially cutaway view in perspective of the structure of still another semiconductor microvalve.

FIG. 29 shows a configuration example of using the semiconductor microactuator 1b previously described with reference to FIG. 17 as the actuator section of the semiconductor microvalve in FIG. 27. The semiconductor microvalve in FIG. 29 differs from that shown in FIG. 28 in that the wiring 4a for supplying power to the diffused resistors 6 for heating the flexible areas 2 is formed without the intervention of the thermal insulation areas 7. Since it is made possible to provide a large thermal insulation distance of the wiring 4a, the semiconductor microvalve can be provided with a higher thermal insulation effect and power consumption for driving the semiconductor microvalve can be suppressed.

The operation of the semiconductor microvalve in FIG. 29 is similar to that of the semiconductor microvalve in FIG. 27 and therefore will not be discussed again.

Tenth Embodiment

Figure 30:
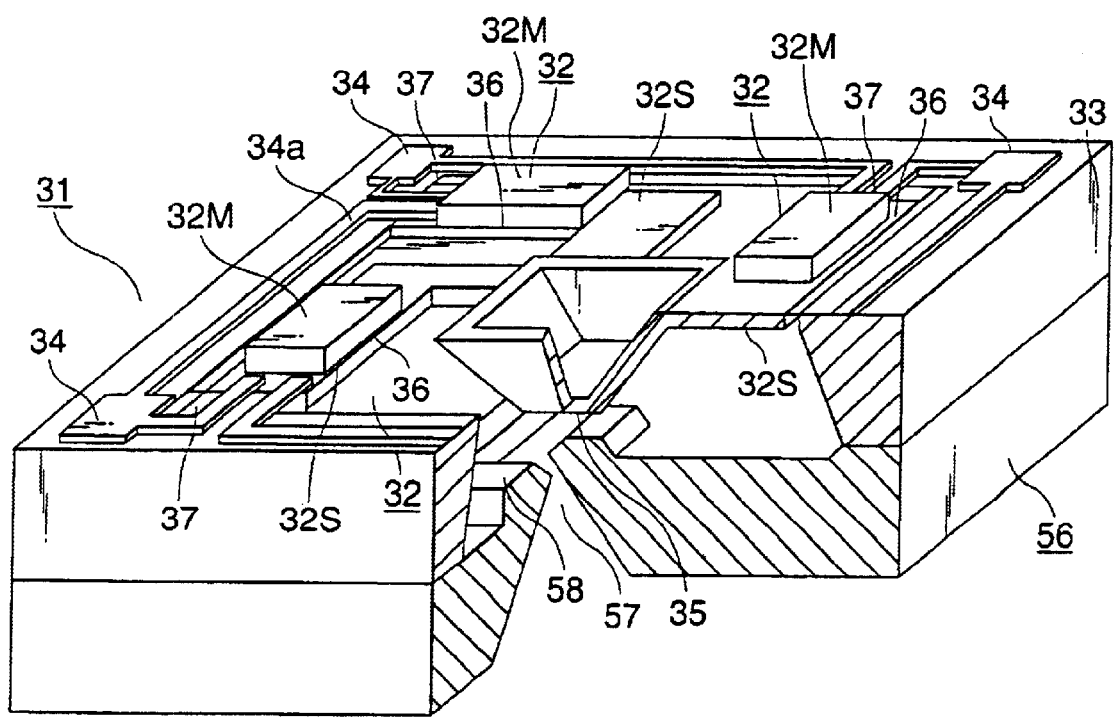
FIG. 30 is a partially cutaway view in perspective of the structure of a semiconductor microvalve corresponding to a tenth embodiment of the invention.

Next, a tenth embodiment of the invention will be discussed. FIG. 30 is a partially cutaway view in perspective of the structure of a semiconductor microvalve in the tenth embodiment of the invention. The semiconductor microvalve includes a pedestal 56 of a fluid element formed by working a substrate and an actuator section joined onto the top of the pedestal 56 by anodic junction or eutectic junction. The semiconductor microactuator 31 comprising the flexible areas 32 shaped like the Buddhist cross with the moving element 35 at the center previously described with reference to FIGS. 19 and 20 is used as the actuator section.

The pedestal 56 is formed with a through hole 57 (so-called orifice) corresponding to a fluid flow passage at the position corresponding to the moving element 35 of the semiconductor microactuator 31 placed on the surface of the pedestal 56, and a bed part 58 with a roughly flat top face, projecting from the surroundings is formed in the periphery of a top face opening of the through hole 57. The moving element 35 corresponds to a so-called valve body.

In the described semiconductor microvalve, when power is supplied to the diffused resistors 36 for heating the flexible areas 32, each flexible area 32 is displaced because of the thermal expansion difference between the thin portion 32S and the thin film 32M and the moving element 35 joined to the flexible areas 32 is displaced. As the moving element 35 is displaced, the spacing between the bottom face part of the moving element 35 and the bed part 58 of the pedestal 56 changes, controlling the quantity of the fluid flowing through the through hole 57.

The semiconductor microvalve of the embodiment is also formed with the thermal insulation area 37 made of a resin of polyimide, etc., between the semiconductor substrate 33 and each flexible area 32, so that the heat for heating the flexible areas 32 can be prevented from escaping to the semiconductor substrate 33. Thus, it is made possible to suppress power consumption in driving the semiconductor microvalve.

Since the semiconductor microvalve of the embodiment includes the flexible areas 32 each shaped like L, the length of each flexible area is long, so that displacement of the flexible areas 32 becomes large, thus displacement of the moving element 35 can be made large. Therefore, the semiconductor microvalve is provided with a wide range of fluid flow quantity control.

Figure 31:
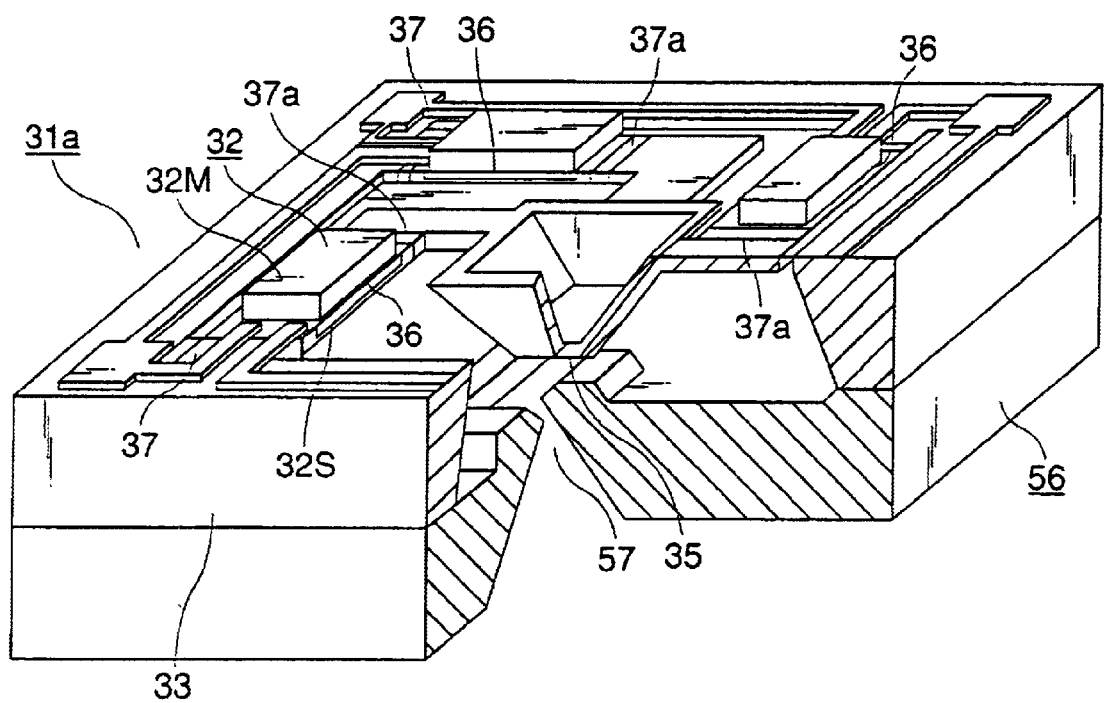
FIG. 31 is a partially cutaway view in perspective of the structure of another semiconductor microvalve.

FIG. 31 shows a configuration example of using the semiconductor microactuator 31a previously described with reference to FIGS. 21 and 22 as the actuator section in FIG. 30. The semiconductor microvalve in FIG. 31 also includes the thermal insulation area 37a provided between each flexible area 32 and the moving element 35, so that it is made possible to more lessen the escape heat from the flexible areas 32 as compared with the semiconductor microvalve shown in FIG. 30, and power consumption in driving the semiconductor microvalve can be suppressed.

The advantage provided by providing rounds each for easing a stress applied when the flexible area 32 is displaced in the proximity of the joint part of the flexible area 32 and the semiconductor substrate 33 or the joint part of the flexible area 32 and the moving part 35 is similar to that previously described with reference to FIGS. 21 and 22.

Eleventh Embodiment

Figure 32:
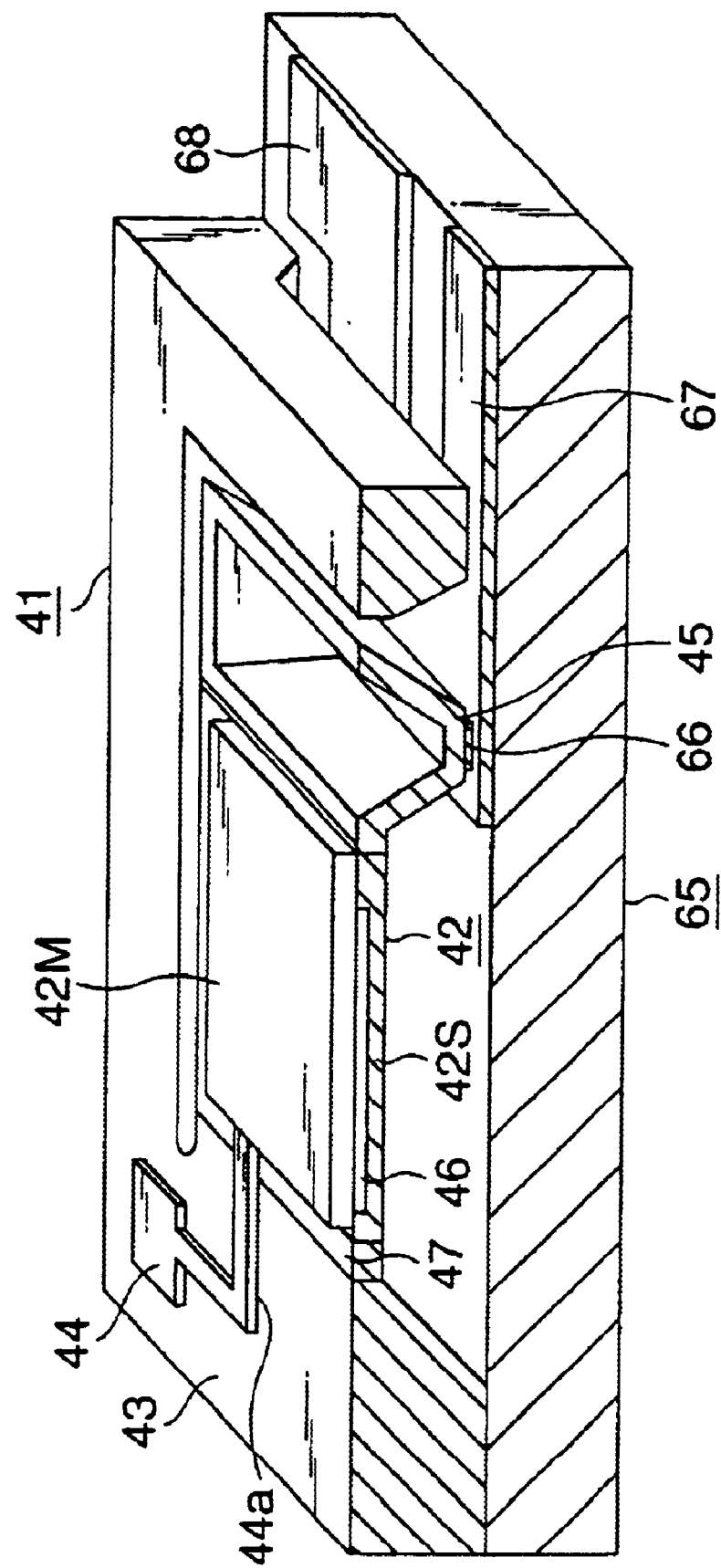
FIG. 32 is a partially cutaway view in perspective of the structure of a semiconductor microrelay corresponding to an eleventh embodiment of the invention.

Next, an eleventh embodiment of the invention will be discussed. FIG. 32 is a partially cutaway view in perspective of the structure of a semiconductor microrelay in the eleventh embodiment of the invention. The semiconductor microrelay in FIG. 32 includes a fixed piece 65 of a fixed element formed on a surface with fixed contacts 67 and 68 and an actuator section joined onto the top of the fixed piece 65 by anodic junction or eutectic junction. The semiconductor microactuator 41 previously described with reference to FIG. 23 is used as the actuator section.

A moving contact 66 is provided on the bottom face of the moving element 45 of the semiconductor microactuator 41, and the fixed contacts 67 and 68 on the fixed piece 65 are placed at the positions corresponding to the moving contact 66 away therefrom so that they can come in contact with the moving contact 66.

When an electric current flows into the diffused resistors 46 and the flexible areas 42 are heated, each flexible area 42 is displaced because of the thermal expansion difference between the thin portion 42S and the thin film 42M and the moving element 45 is displaced. As the moving element 45 is displaced, the moving contact 66 provided on the bottom face of the moving element 45 comes in contact with the fixed contacts 67 and 68, and the fixed contacts 67 and 68 are brought into conduction through the fixed contact 66, turning on the relay.

The actuator section of the semiconductor microrelay of the embodiment uses the semiconductor microactuator 41; the semiconductor microrelay is provided with a high thermal insulation effect between the flexible areas 42 and the semiconductor substrate 43 and small power consumption as described in the sixth embodiment. The semiconductor microactuator 41 is of a cantilever structure with the semiconductor substrate 43 as a fixed end and the semiconductor microrelay is provided with a large contact pressure.

Twelfth Embodiment

Figure 33:
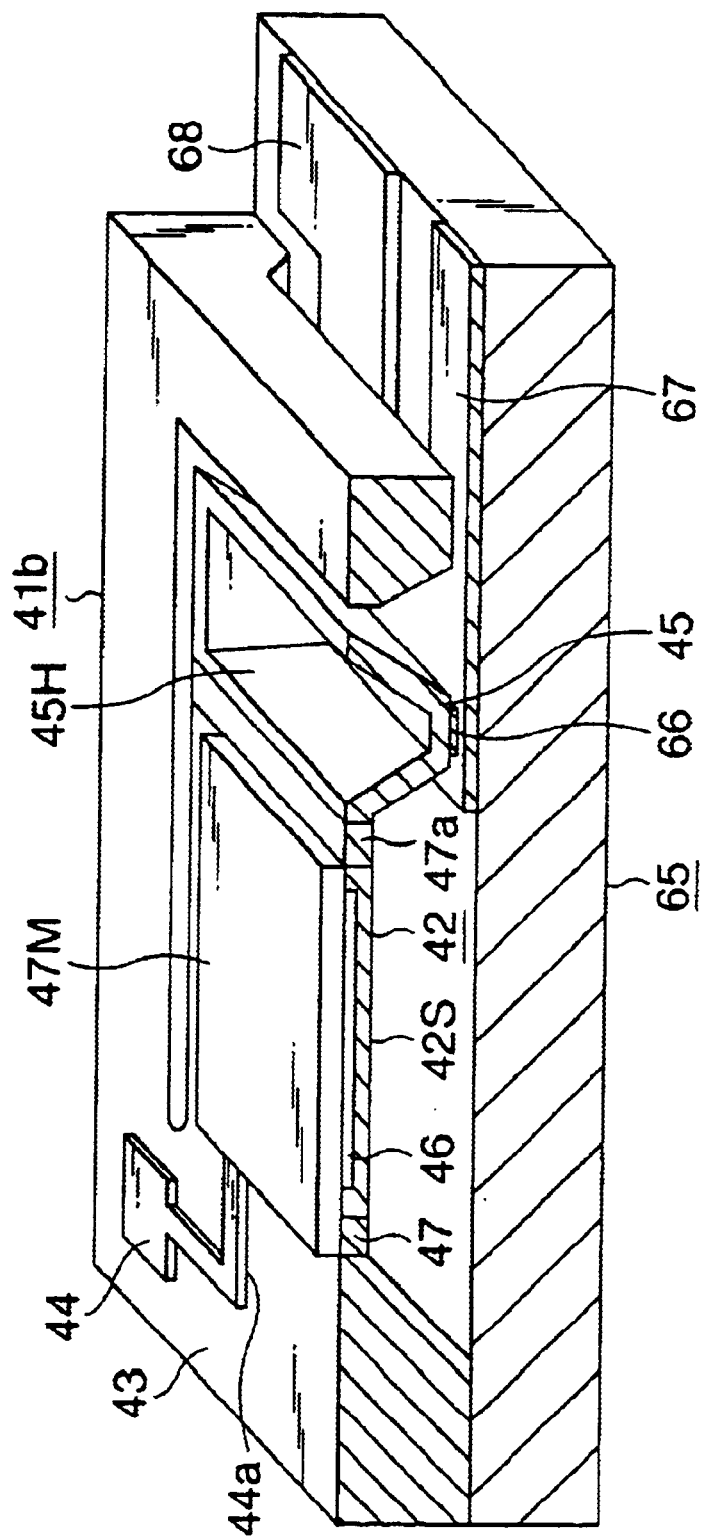
FIG. 33 is a partially cutaway view in perspective of the structure of a semiconductor microrelay corresponding to a twelfth embodiment of the invention.

Next a twelfth embodiment of the invention will be discussed. FIG. 33 is a perspective view to show the structure of a semiconductor microrelay in the twelfth embodiment of the invention. The actuator section shown in FIG. 32 uses the semiconductor microactuator 41b previously described with reference to FIG. 25.

That is, in the semiconductor microrelay of the embodiment, the thin films 47M of the flexible areas 42 and the thermal insulation areas 47 for joining the flexible areas 42 and the semiconductor substrate 43 are made of the same material, such as polyimide.

Figure 37:
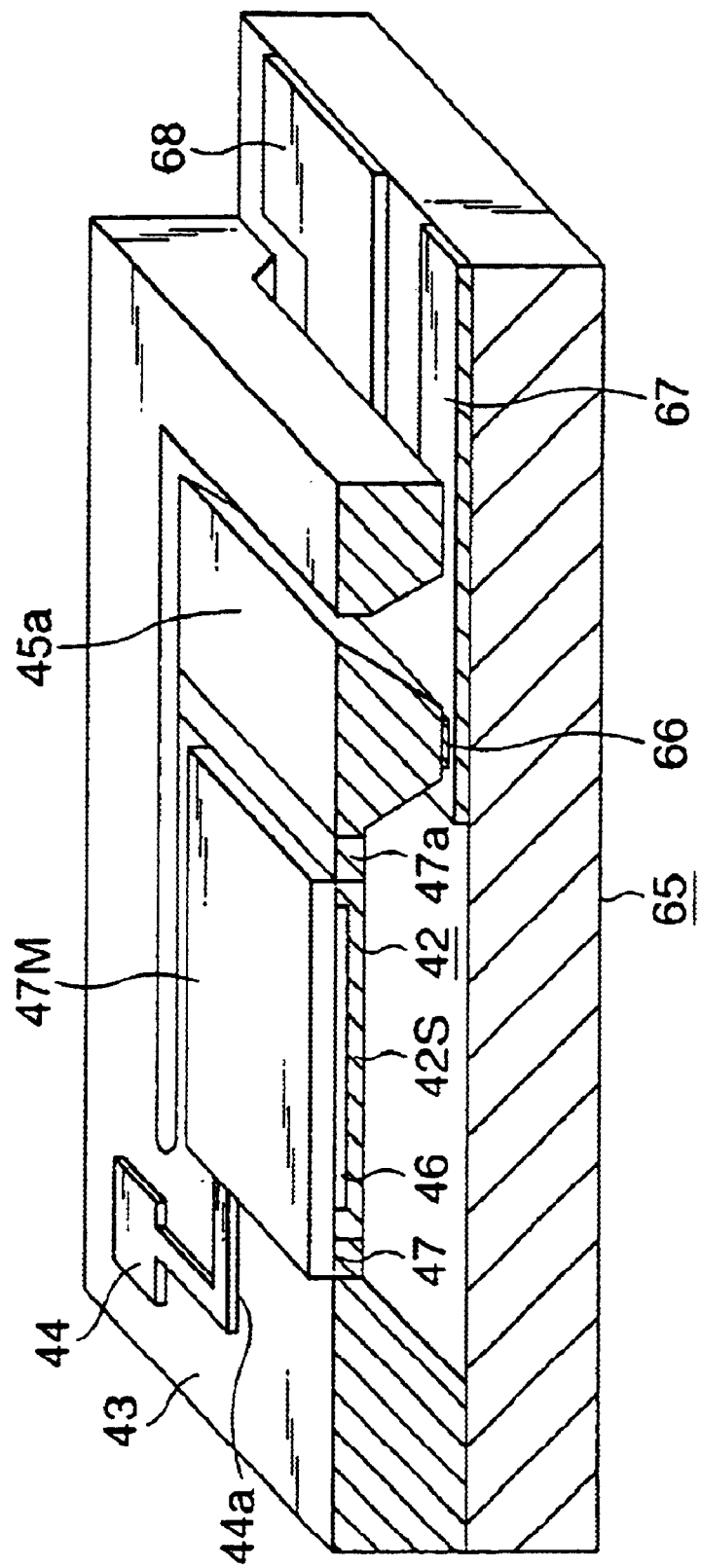
FIG. 37 is a partially cutaway view in perspective of the structure of another semiconductor microrelay.

In the semiconductor microrelay shown in FIG. 33, the moving element 45 is formed with the concave part 45H. As compared with a moving element formed with no concave part shown in FIG. 37, the small heat capacity is small and the temperatures of the flexible areas 42 can be raised rapidly, and the weight (volume) of the moving element lessens, thus the moving element does not malfunction upon reception of an external shock, as previously described with reference to FIG. 25.

Figure 34A:
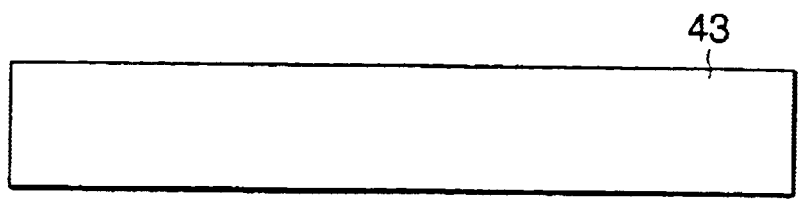
FIGS. 34(a) to 34(d) are sectional views to show a manufacturing method of the semiconductor microrelay in FIG. 33.
Figure 34B:
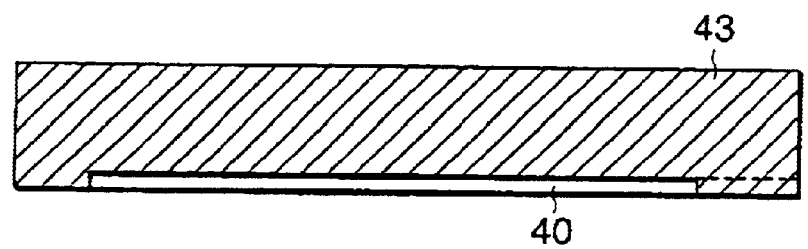

Next, a semiconductor microrelay manufacturing method in the embodiment will be discussed. A semiconductor substrate 43, such as a silicon substrate, (see FIG. 34A) is etched for removal from the bottom face with KOH, etc., with a silicon nitride film, etc., as a mask, forming a gap 40 (see FIG. 34B). The gap 40 becomes a contact gap between moving and fixed contacts in the semiconductor microrelay. The semiconductor substrate 43 of a silicon substrate may be the p or n type and preferably the crystal orientation is <100>.

Figure 34C:
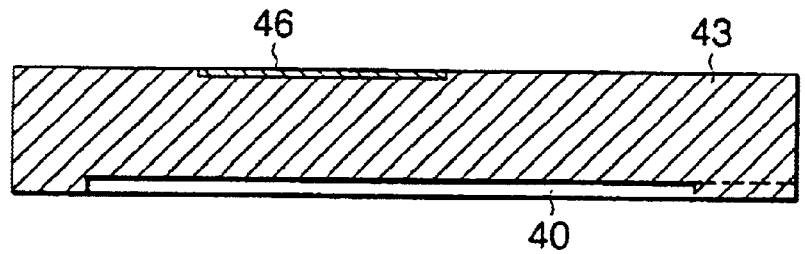

Next, a diffused resistor 46 is formed on the top face of the semiconductor substrate 43 by ion implantation or impurity diffusion (see FIG. 34C). The impurities may be the p or n type.

Figure 34D:
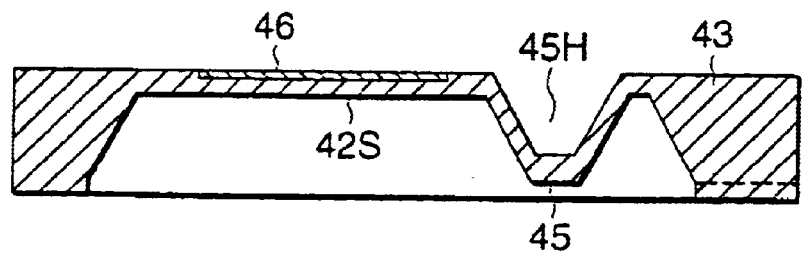

Further, a silicon nitride film, etc., is formed on both faces of the semiconductor substrate 43 and patterning is performed. Then, etching (anisotropic etching) is executed for removal with KOH, etc., from the top face of the semiconductor substrate 43 and a concave part 45H is formed on the top of a moving element 45 as a hollow shape. At the same time, etching (anisotropic etching) is executed for removal with KOH, etc., from the bottom face of the semiconductor substrate 43 to make a concave part, and the bottom face portion of the concave part is formed as a thin portion 42S forming a part of a flexible area (see FIG. 34D).

Figure 35A:
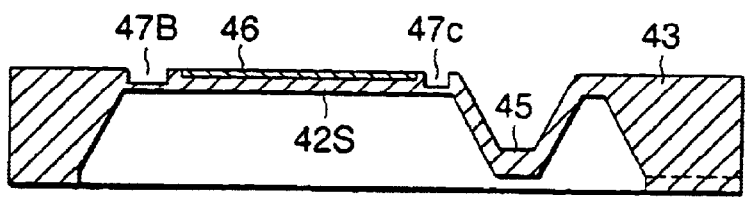
FIGS. 35(a) to 35(e) are sectional views to show a manufacturing method of the semiconductor microrelay in FIG. 33.

Next, etching is executed for removal with a silicon nitride film, etc., as a mask from the top face of the semiconductor substrate 43 to make holes 47B and 47C in the portions which will become thermal insulation areas 47 and 47a (see FIG. 35A). The etching depth corresponds to the thickness of the thermal insulation area 47, 47a.

Figure 35B:
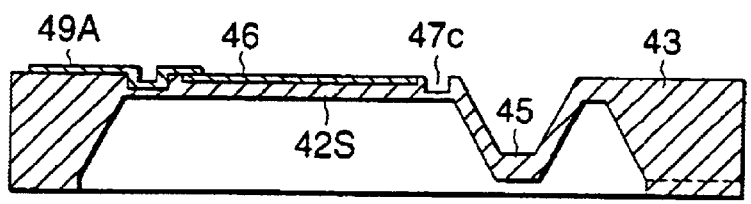

At the next step, an aluminum thin film is formed by sputtering, etc., and patterning is performed, whereby wiring 49A for supplying power to the diffused resistor 46 and the like are formed (see FIG. 35B).

Figure 35C:
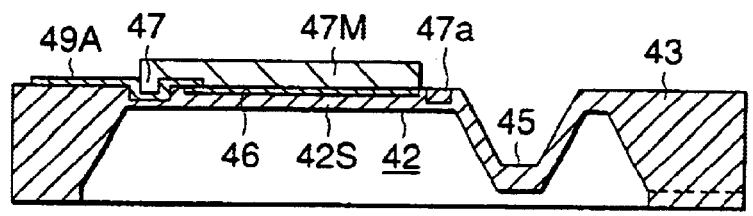
Figure 35D:
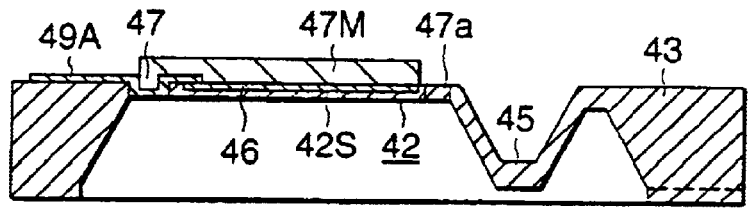
Figure 35E:
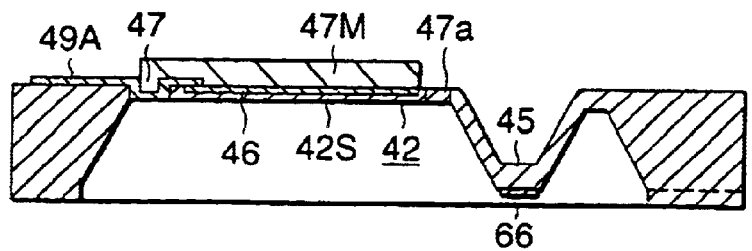

Next, the full face of the semiconductor substrate 43 is coated with a film of thermal insulation material of polyimide, etc., to fill in the holes 47B and 47C. Then, the thermal insulation material except that of the fill-in portions or that above the thin portion 42S is removed by etching, etc., and the thermal insulation areas 47 and 47a and a thin film 47M are formed of the same material of polyimide, etc., (see FIG. 35C). The bottom face sides of the thermal insulation areas 47 and 47a are etched for removal (see FIG. 35D) and the moving element 45 is formed on the bottom face side with a moving contact 66 (described later) made of gold cobalt, etc., by plating, etc., (see FIG. 35E).

Figure 36A:
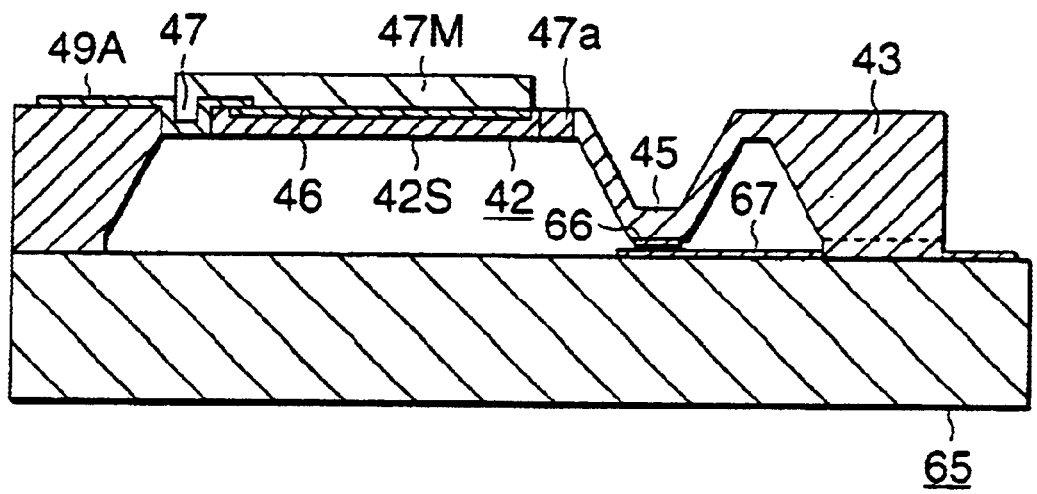
FIGS. 36(a) and 36(b) are sectional views to show a manufacturing method of the semiconductor microrelay in FIG. 33.
Figure 36B:
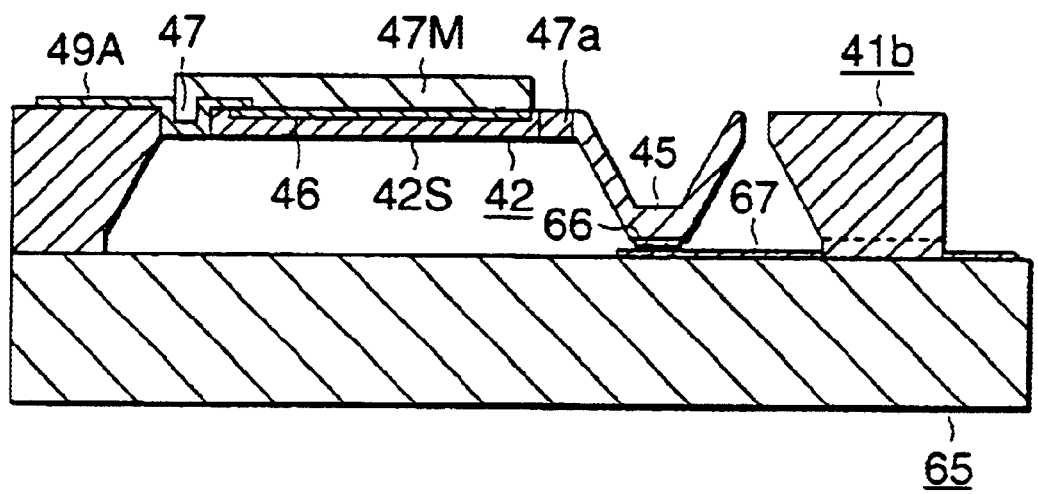

Then, the semiconductor substrate 43 thus worked and a fixed piece 65 formed with a fixed contact 67 of gold cobalt, etc., by plating are joined by anodic junction, etc., (see FIG. 36A). Last, the moving element 45 and the flexible area 42 are separated from the semiconductor substrate 43 which becomes a frame by RIE, etc., for manufacturing a semiconductor microrelay (see FIG. 36B). That is, the semiconductor microactuator 41b is manufactured.

Since the thin film 47M of the flexible area 42 and the thermal insulation area 47 are thus formed of the same material at the same time, so that the manufacturing process is simplified and the costs can be reduced.

Figure 38:
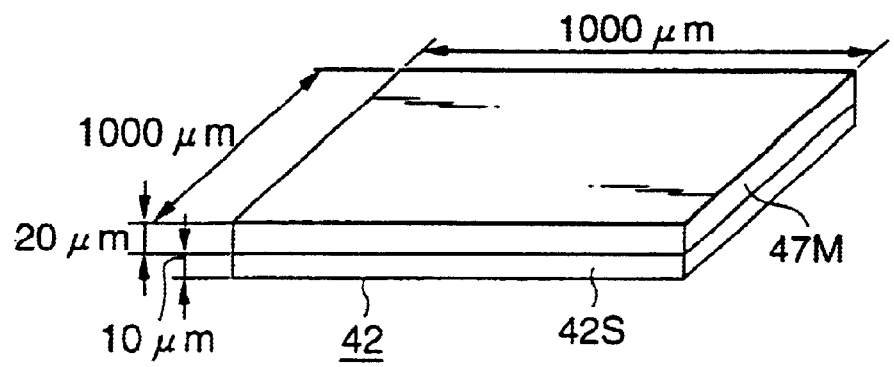
FIG. 38 is a perspective view used to describe the function of the semiconductor microrelay in FIG. 33.

FIG. 38 shows a so-called bimetal structure consisting of the thin portion 42S and the thin film 47M of the flexible area 42 in the semiconductor microrelay of the embodiment. As shown in the figure, polyimide (trade name "Photonis") 20 μm thick as the thin film 47M is formed on the top of the thin portion 42S made of silicon 10 μm thick. The flexible area 42 has plane dimensions of 1000 μm×1000 μm. At this time, the bend of the flexible area 42 is represented by the following Timochenko's expression:

$$\frac{1}{\rho} = \frac{6(\alpha_{Si} - \alpha_{ph})\Delta T(t_{Si} + t_{ph})t_{Si} \cdot t_{ph} \cdot E_{Si} \cdot E_{ph}}{3(t_{Si} + t_{ph})^2 t_{Si} t_{ph} E_{Si} E_{ph} + (t_{Si} E_{Si} + t_{ph} E_{ph})(t_{Si}^3 E_{Si} + t_{ph}^3 E_{ph})}$$ [Expression 16]

$$w = 2\rho \sin^2\left(\frac{L}{2\rho}\right); \quad \frac{L}{2\rho} [\text{rad}] \text{ in [rad] units}$$

where ΔT denotes temperature change.

Figure 39:
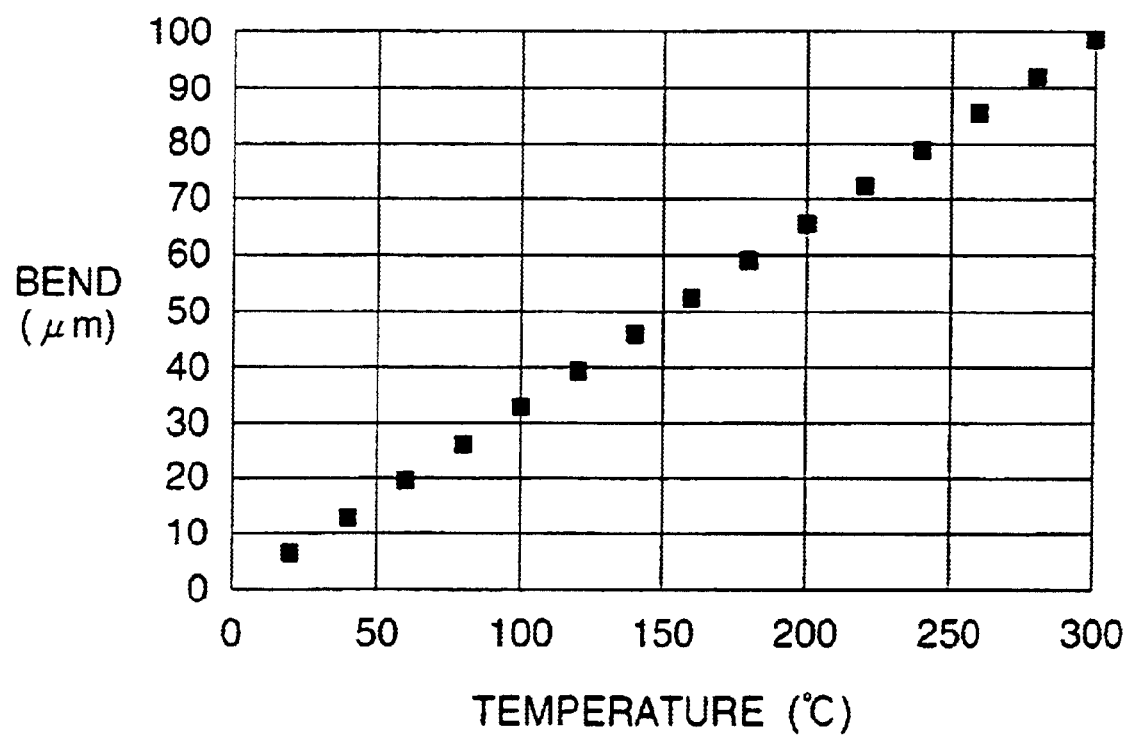
FIG. 39 is a relation drawing used to describe the function of the semiconductor microrelay in FIG. 33.

FIG. 39 shows the calculation result of the expression to which specific numeric values are assigned. As shown in FIG. 39, the higher the temperature of the flexible area 42, the larger the displacement (bend) of the flexible area 42. If the bend becomes larger than the contact gap between the moving contact 66 and the fixed contact 67, 68 of the semiconductor microrelay, the moving contact 66 comes in contact with the fixed contacts 67 and 68, turning on the relay.

The bimetal operation when the contact gap is 20 μm and the bimetal is at 200° C. will be discussed. As shown in FIG. 39, displacement of the bimetal at 200° C. is about 65 μm.

Figure 40:
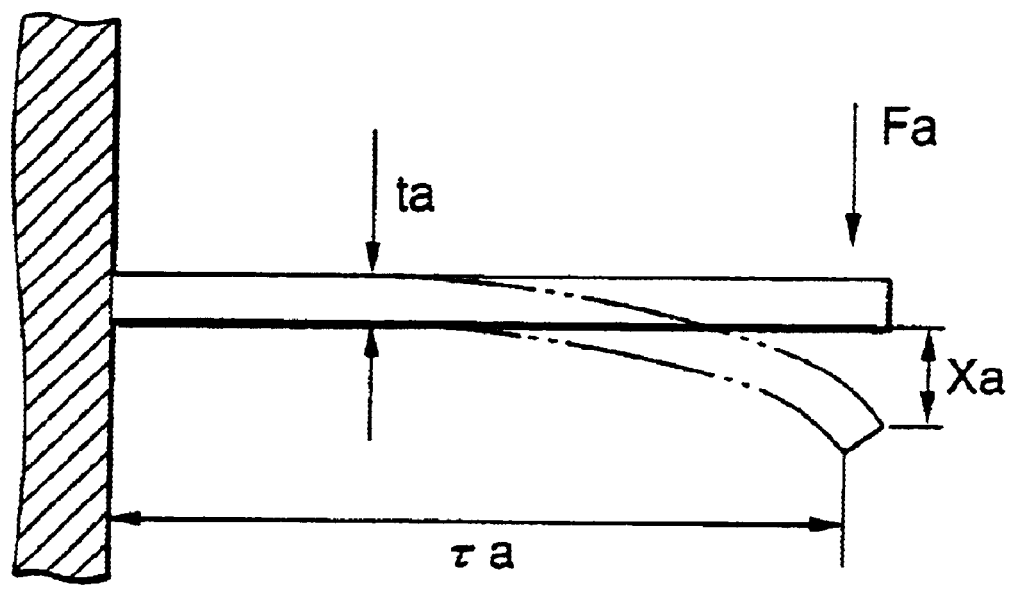
FIG. 40 is a side view used to describe the function of the semiconductor microrelay in FIG. 33.

The semiconductor microrelay is of a cantilever structure and the beam corresponding to the flexible area 42 is displaced as shown in FIG. 40. Displacement of the tip, Xa, is represented as $Xa = (Fa\, \tau a^3)/(3 Ea\, Ia)$. Fa denotes the force applied to the tip of the beam, ta denotes the thickness of the beam, τa denotes the length of the beam, and Ea denotes the Young's modulus of the beam. Ia denotes the secondary moment of the cross section of the beam. If the beam is rectangular in cross section, $Ia = ba\, ta^3/12$ (where ba denotes the deep width of the beam), thus the bend of the tip, $Xa, = 4 Fa\, \tau a^3/(ba\, ta^3\, Ea)$. According to this expression, the force applied to the tip of the beam, Fa, is represented as $Fa = (Xa\, ba\, ta^3\, Ea)/(4\, \tau a^3)$. Letting the contact gap be 20 μm, contact pressure fa becomes equal to $((Xa-20\,\mu m)\, ba\, ta^3\, Ea)/(4\, \tau a^3)$. Since the bend of the tip, Xa, is 65 μm, the contact pressure fa becomes equal to 0.87 gf=8.5×10⁻³ N; the contact pressure almost close to 1 gf (9.8×10⁻³ N) is provided.

Thirteenth Embodiment

Figure 41:
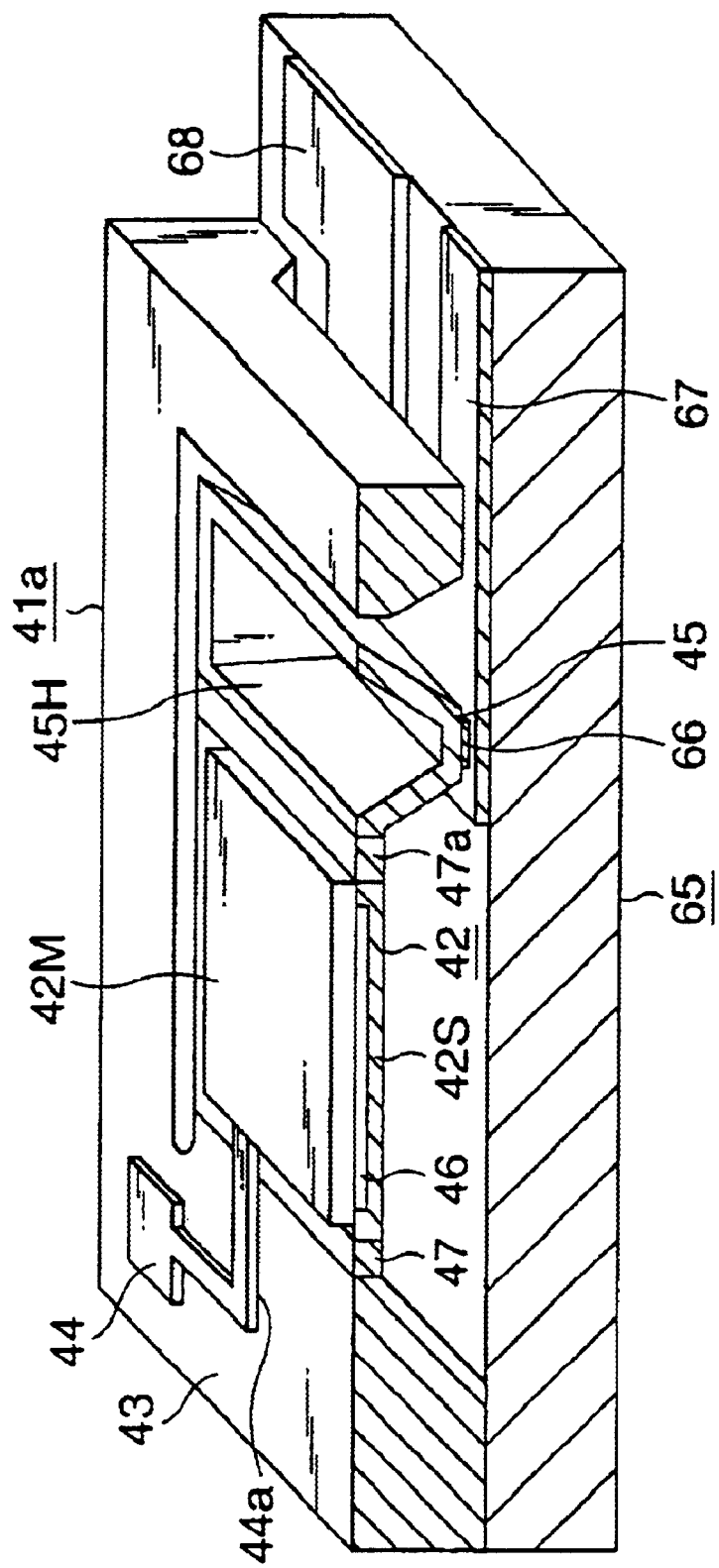
FIG. 41 is a partially cutaway view in perspective of the structure of a semiconductor microrelay corresponding to a thirteenth embodiment of the invention.

Next, a thirteenth embodiment of the invention will be discussed. FIG. 41 is a perspective view to show the structure of a semiconductor microrelay of the thirteenth embodiment of the invention. The semiconductor microrelay shown in FIG. 41 includes the semiconductor microactuator 41 previously described with reference to FIG. 23 as the actuator section of the semiconductor microrelay shown in FIG. 33. The semiconductor microrelay of the embodiment differs from the semiconductor microrelay in FIG. 33 in that the thin film 42M of each flexible area 42 is made of a metal thin film such as an aluminum or nickel thin film.

Figure 48:
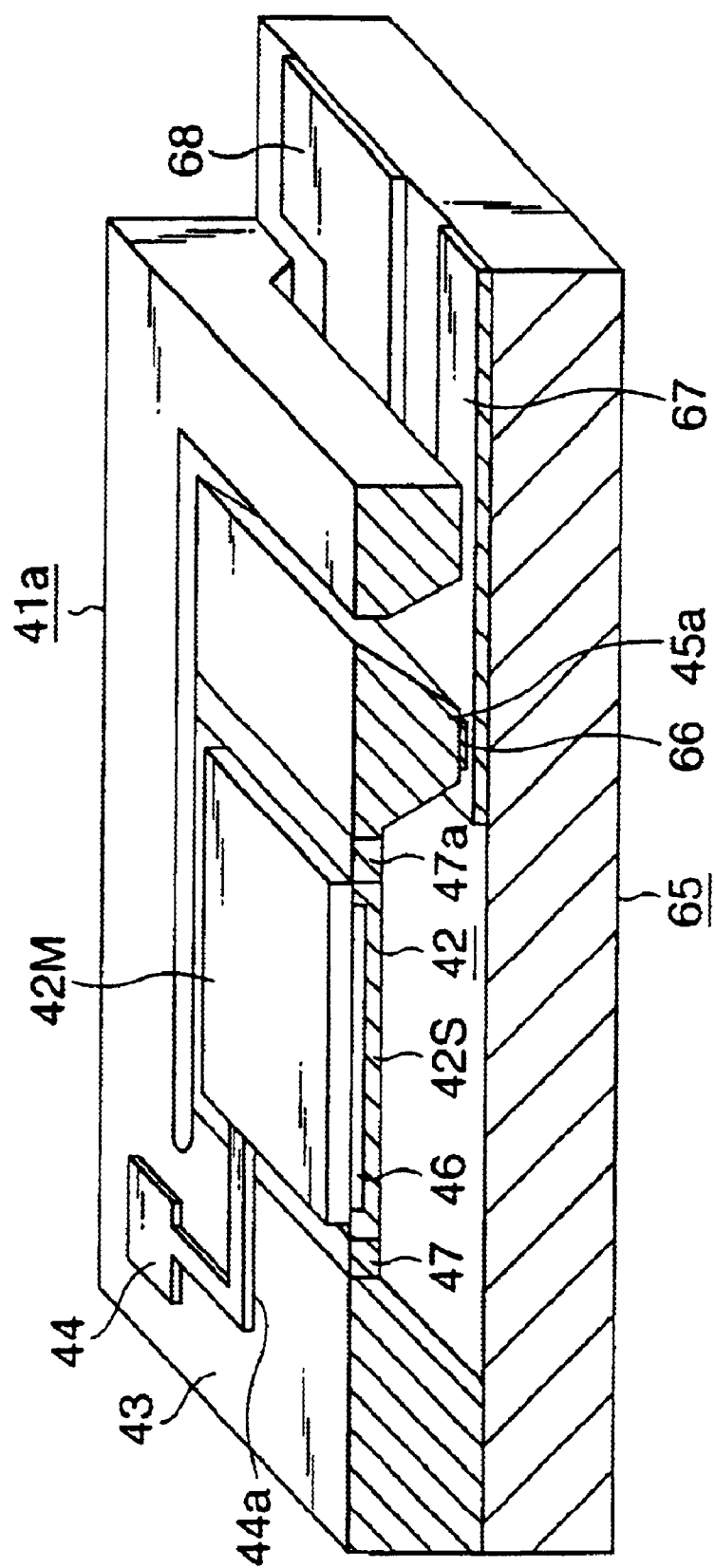
FIG. 48 is a partially cutaway view in perspective of the structure of another semiconductor microrelay.

Also in the semiconductor microrelay of the embodiment, the moving element 45 is formed with the concave part 45H; as compared with a semiconductor microrelay shown in FIG. 48 with a moving element formed with no concave part, the temperatures of the flexible areas 42 can be raised rapidly, and the weight (volume) of the moving element lessens, thus malfunction can be prevented upon reception of an external shock, as in the twelfth embodiment.

Next, manufacturing methods of the semiconductor microrelay shown in FIG. 41 will be discussed. First, a manufacturing method of the semiconductor microrelay wherein the thin film 42M forming a part of each flexible area 42 is made of an aluminum thin film will be discussed.

Figure 42A:
FIGS. 42(a) to 42(d) are sectional views to show a manufacturing method of the semiconductor microrelay in FIG. 41.
Figure 42B:
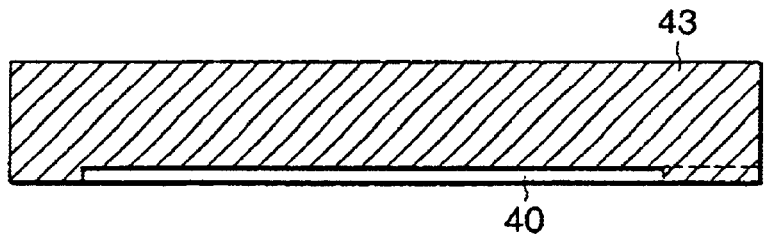

A semiconductor substrate 43, such as a silicon substrate, (see FIG. 42A) is etched for removal from the bottom face with KOH, etc., with a silicon nitride film, etc., as a mask, forming a gap 40 (see FIG. 42B). The gap 40 becomes a contact gap between moving and fixed contacts in the semiconductor microrelay. The semiconductor substrate 43 (silicon substrate) may be the p or n type and preferably the crystal orientation is <100>.

Figure 42C:
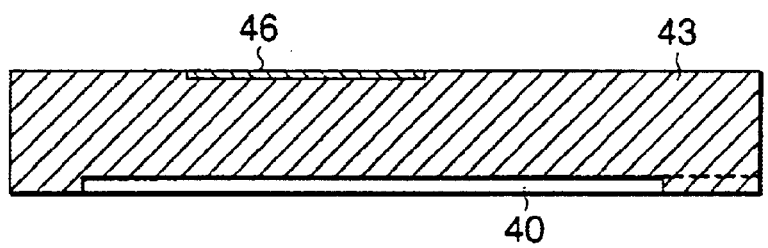

Next, a diffused resistor 46 is formed on the top face of the semiconductor substrate 43 by ion implantation or impurity diffusion (see FIG. 42C). The impurities may be the p or n type.

Figure 42D:
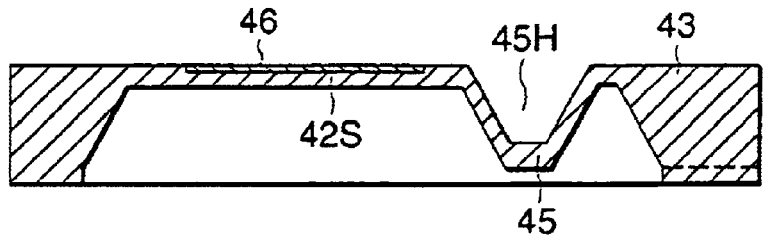

Further, a silicon nitride film, etc., is formed on both faces of the semiconductor substrate 43 and patterning is performed. Then, etching (anisotropic etching) is executed for removal with KOH, etc., from the top face of the semiconductor substrate 43 and a concave part 45H is formed on the top of a moving element 45 as a hollow shape. At the same time, etching (anisotropic etching) is executed for removal with KOH, etc., from the bottom face of the semiconductor substrate 43 to make a concave part, and the bottom face portion of the concave part is formed as a thin portion 42S forming a part of a flexible area (see FIG. 42D).

Figure 43A:
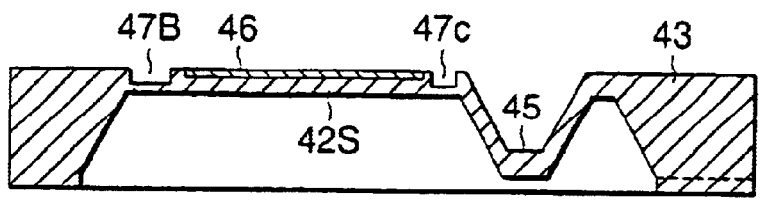
FIGS. 43(a) to 43(e) are sectional views to show a manufacturing method of the semiconductor microrelay in FIG. 41.

Next, etching is executed for removal with a silicon nitride film, etc., as a mask from the top face of the semiconductor substrate 43 to make holes 47B and 47C in the portions which will become thermal insulation areas 47 and 47a (see FIG. 43A). The etching depth corresponds to the thickness of the thermal insulation area 47, 47a.

Figure 43B:
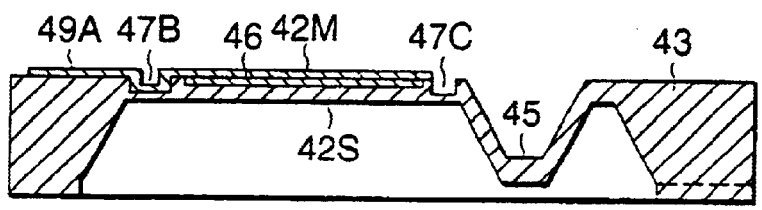
Figure 43C:
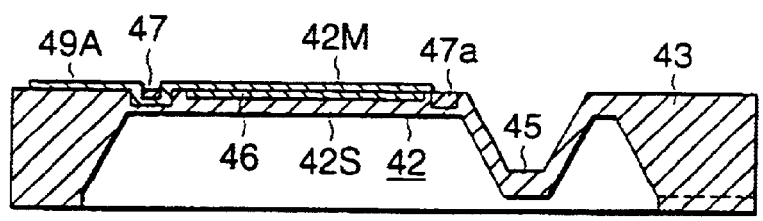

At the next step, an aluminum thin film is formed by sputtering, etc., and patterning is performed, whereby a thin film 42M forming a part of a flexible area and wiring 49A for supplying power to the diffused resistor 46 are formed, as shown in FIG. 43B. Then, the full face of the semiconductor substrate 43 is coated with a film of thermal insulation material of polyimide, etc., to fill in the holes 47B and 47C made in the top face of the semiconductor substrate 43, and the thermal insulation material other than the fill-in portions is removed by etching, etc., and the thermal insulation areas 47 and 47a are formed (see FIG. 43c).

Figure 43D:
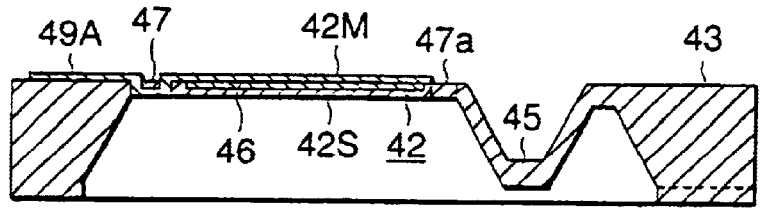
Figure 43E:
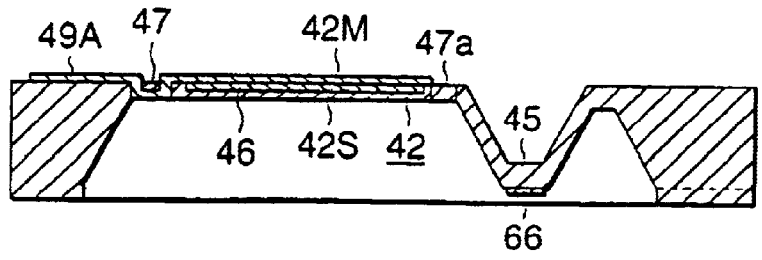
Figure 44A:
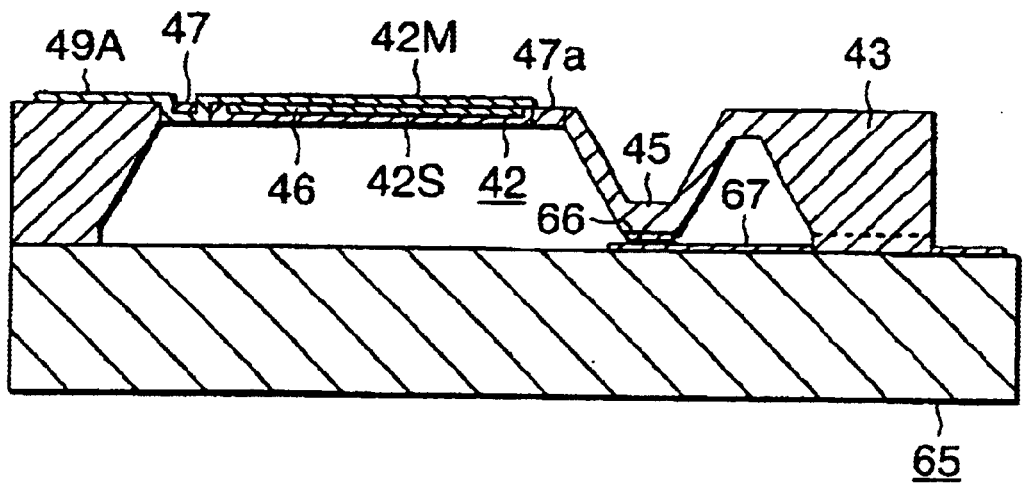
FIGS. 44(a) and 44(b) are sectional views to show a manufacturing method of the semiconductor microrelay in FIG. 33.
Figure 44B:
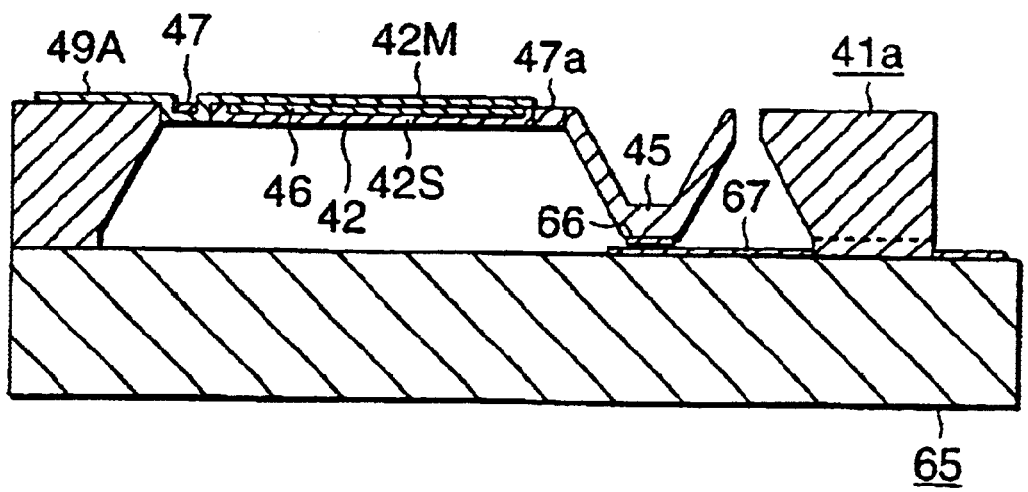
Figure 45A:
FIGS. 45(a) to 45(d) are sectional views to show another manufacturing method of the semiconductor microrelay in FIG. 41.
Figure 45B:
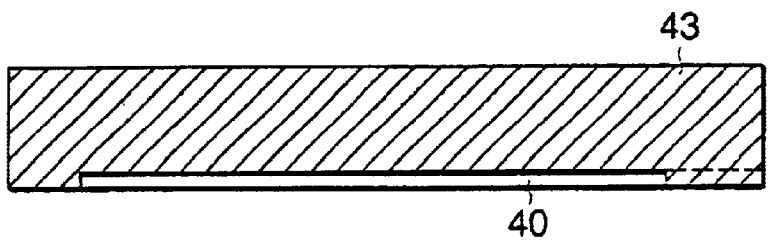
Figure 45C:
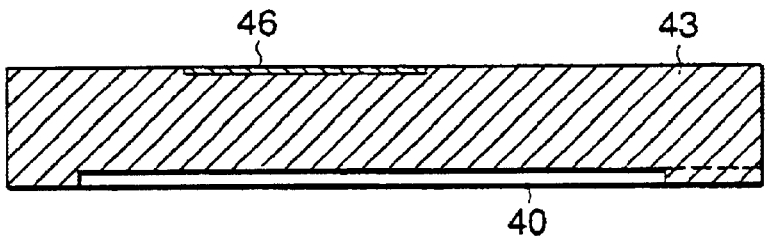
Figure 45D:
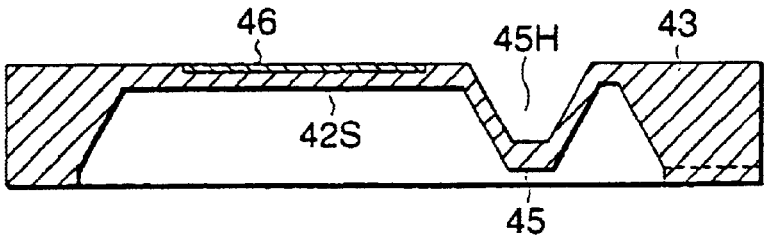
Figure 45E:
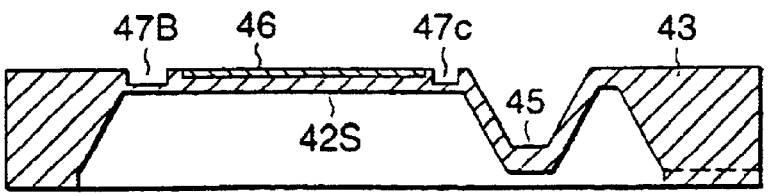

Then, the bottom face sides of the thermal insulation areas 47 and 47a are etched for removal for forming the thermal insulation areas 47 and 47a the thermal insulation areas 47 and 47a made of only the thermal insulation material (see FIG. 43D). Next, the moving element 45 is formed on the bottom face side with a moving contact 66 made of gold cobalt, etc., by plating, etc.

Next, the semiconductor substrate 43 thus worked and a fixed piece 65 formed with a fixed contact 67 of gold cobalt, etc., by plating are joined by anodic junction, etc., (see FIG.

44A). Last, the moving element 45 and the flexible area 42 are separated from the semiconductor substrate 43 which becomes a frame by RIE, etc., for manufacturing a semiconductor microrelay. That is, the semiconductor microactuator 41a is manufactured.

Next, a manufacturing method of the semiconductor microrelay shown in FIG. 41 wherein the thin film 42M is made of nickel will be discussed. As shown in FIGS. 45A to 45E, the step of forming a gap 40 in the bottom face of a semiconductor substrate 43, the step of forming a diffused resistor 46 in the top face of the semiconductor substrate 43, the step of forming a concave part 45H on the top of a moving element 45, the step of forming a thin portion 42S of a flexible area 42, and the step of making holes 47B and 47C of portions which will become thermal insulation areas are similar to the steps previously described with reference to FIGS. 42A to 42D and 43A and therefore will not be discussed again.

Figure 46A:
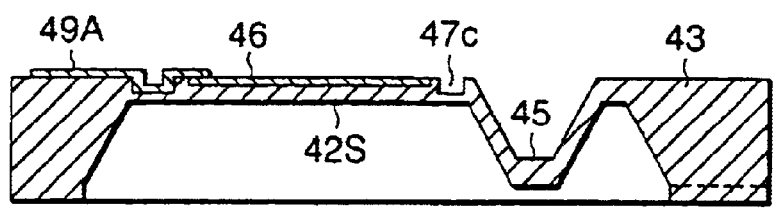
FIGS. 46(a) to 46(e) are sectional views to show another manufacturing method of the semiconductor microrelay in FIG. 41.
Figure 46B:
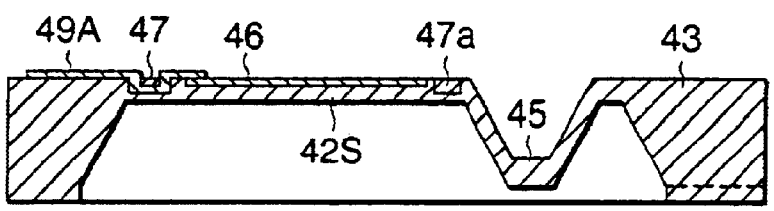

At the next step, an aluminum thin film is formed by sputtering, etc., and patterning is performed, whereby wiring 49A for supplying power to the diffused resistor 46 and the like are formed, as shown in FIG. 46A. Next, the full face of the semiconductor substrate 43 is coated with a film of thermal insulation material of polyimide, etc., to fill in the holes 47B and 47C made in the top face of the semiconductor substrate 43, the thermal insulation material other than the fill-in portions is removed by etching, etc., and the thermal insulation areas 47 and 47a are formed, as shown in FIG. 46B.

Figure 46C:
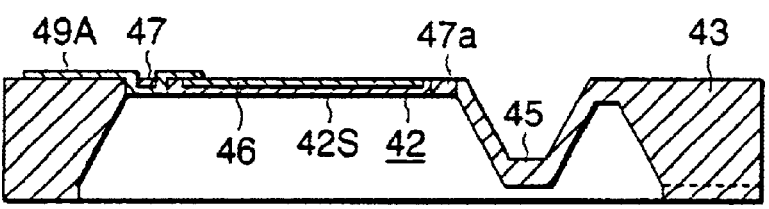
Figure 46D:
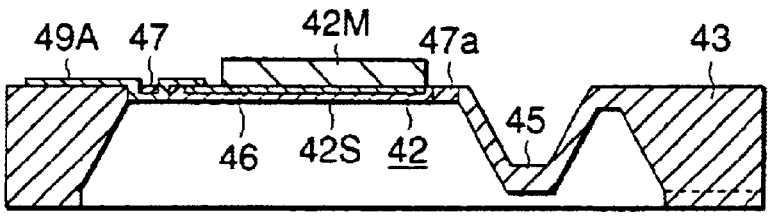
Figure 46E:
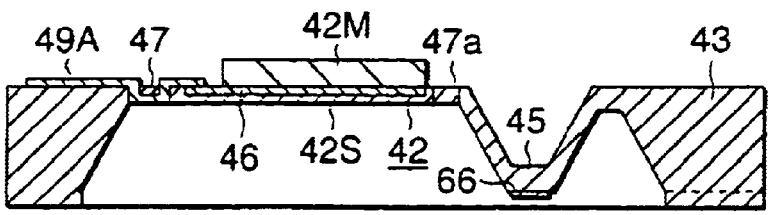

Then, the bottom face sides of the thermal insulation areas 47 and 47a are etched for removal (see FIG. 46C), the thin portion 42S is formed on the top face with a nickel thin film as thin film 42M by plating, etc., (see FIG. 46D), and the moving element 45 is formed on the bottom face side with a moving contact 66 made of gold cobalt, etc., by plating, etc., (see FIG. 46E).

Figure 47A:
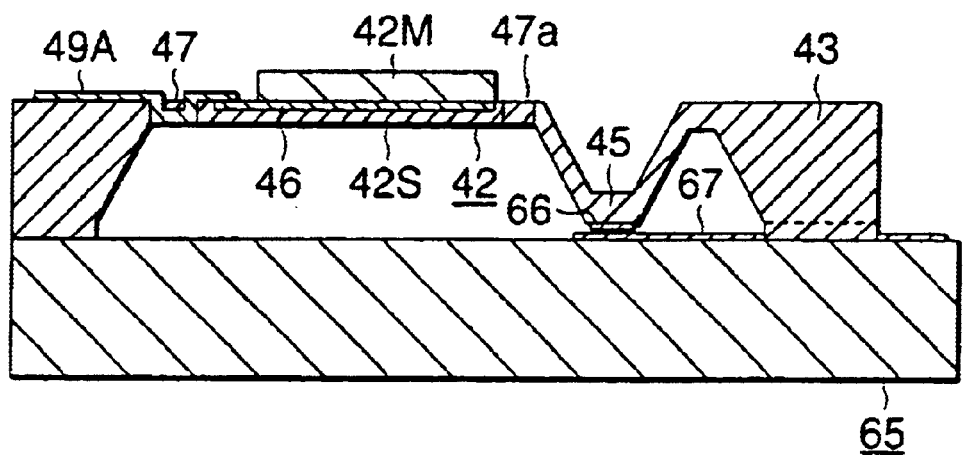
FIGS. 47(a) and 47(b) are sectional views to show another manufacturing method of the semiconductor microrelay in FIG. 33.
Figure 47B:
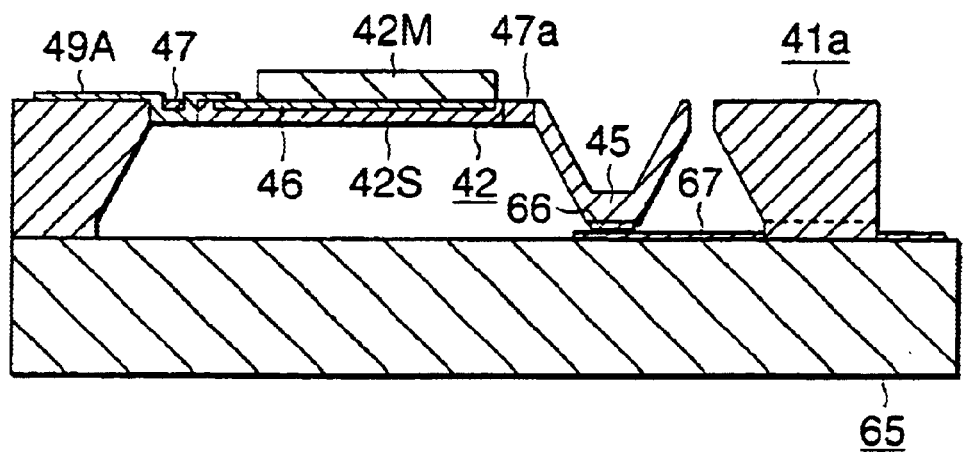

Next, the semiconductor substrate 43 thus worked and a fixed piece 65 formed with a fixed contact 67 of gold cobalt, etc., by plating are joined by anodic junction, etc., (see FIG. 47A). Last, the moving element 45 and the flexible area 42 are separated from the semiconductor substrate 43 which becomes a frame by RIE, etc., for manufacturing a semiconductor microrelay (see FIG. 47B). That is, the semiconductor microactuator 41a is manufactured.

Figure 49:
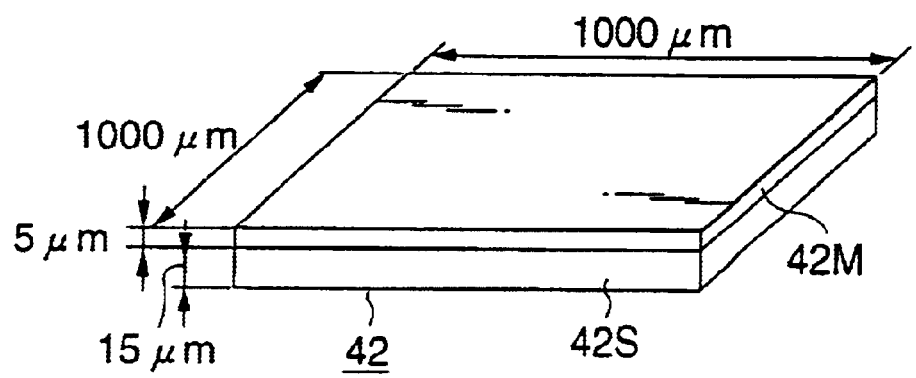
FIG. 49 is a perspective view used to describe the function of the semiconductor microrelay in FIG. 41.

FIG. 49 shows a so-called bimetal structure consisting of the thin portion 42S and the thin film 42M of the flexible area 42 in the semiconductor microrelay shown in FIG. 41. As shown in FIG. 49, an aluminum thin film 5 $\mu$m thick as the thin film 42M is formed on the top of the thin portion 42S made of silicon 15 $\mu$m thick. The flexible area 42 has plane dimensions of 1000 $\mu$m×1000 $\mu$m.

At this time, the displacement (bend) of the flexible area 42 is represented by the following Timochenko's expression:

$$\frac{1}{\rho} = \frac{6(\alpha_{Si} - \alpha_{Al})\Delta T(t_{Si} + t_{Al})t_{Si} \cdot t_{Al} \cdot E_{Si} \cdot E_{Al}}{3(t_{Si} + t_{Al})^2 t_{Si} t_{Al} E_{Si} E_{Al} + (t_{Si} E_{Si} + t_{Al} E_{Al})(t_{Si}^3 E_{Si} + t_{Al}^3 E_{Al})}$$ [Expresssion 17]

$$W = 2\rho \sin^2\left(\frac{L}{2\rho}\right); \frac{L}{2\rho} \text{ in [rad] units}$$

where $\Delta T$ denotes temperature change.

Figure 50:
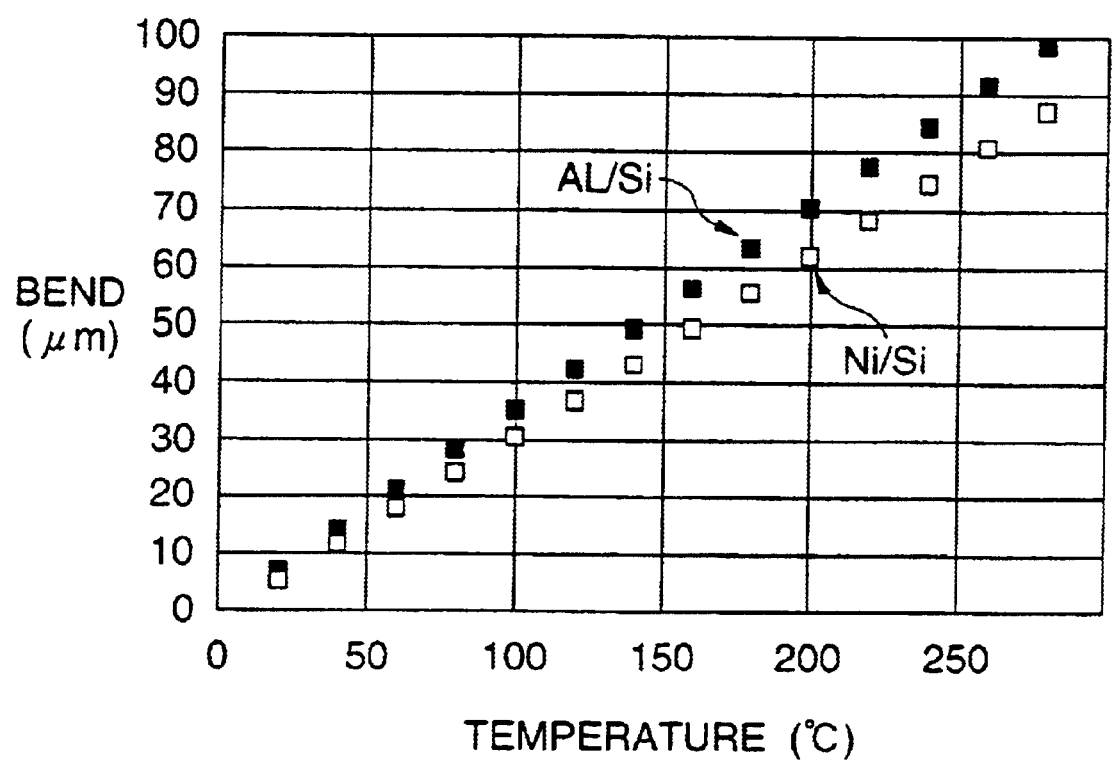
FIG. 50 is a relation drawing used to describe the function of the semiconductor microrelay in FIG. 41.

FIG. 50 shows the calculation result of the expression to which specific numeric values are assigned. As shown in FIG. 50, the higher the temperature of the flexible area 42, the larger the displacement (bend) of the flexible area 42. If the displacement becomes larger than the contact gap between the moving contact 66 and the fixed contact 67, 68 of the semiconductor microrelay, the moving contact 66 comes in contact with the fixed contacts 67 and 68, turning on the relay.

The bimetal operation when the contact gap is 20 $\mu$m and the flexible area 42 is at 200° C. will be discussed. As shown in FIG. 50, displacement of the flexible area 42 at 200° C. is about 70 $\mu$m.

The contact pressure fa is represented as fa=((Xa−20 $\mu$m) ba ta$^3$ Ea)/(4 $\tau$a$^3$), as described above. If the contact pressure fa is found, fa=0.82 gf=8.0×10$^{-3}$ N; the contact pressure almost close to 1 gf (9.8×10$^{-3}$ N) is provided.

On the other hand, to use a nickel thin film as the thin film 42M, nickel has a smaller thermal expansion coefficient than aluminum, thus the displacement (bend) of the flexible area 42 in response to temperature change is small. However, nickel has a larger Young's modulus than aluminum, so that a large thermal stress can be generated.

Figure 51:
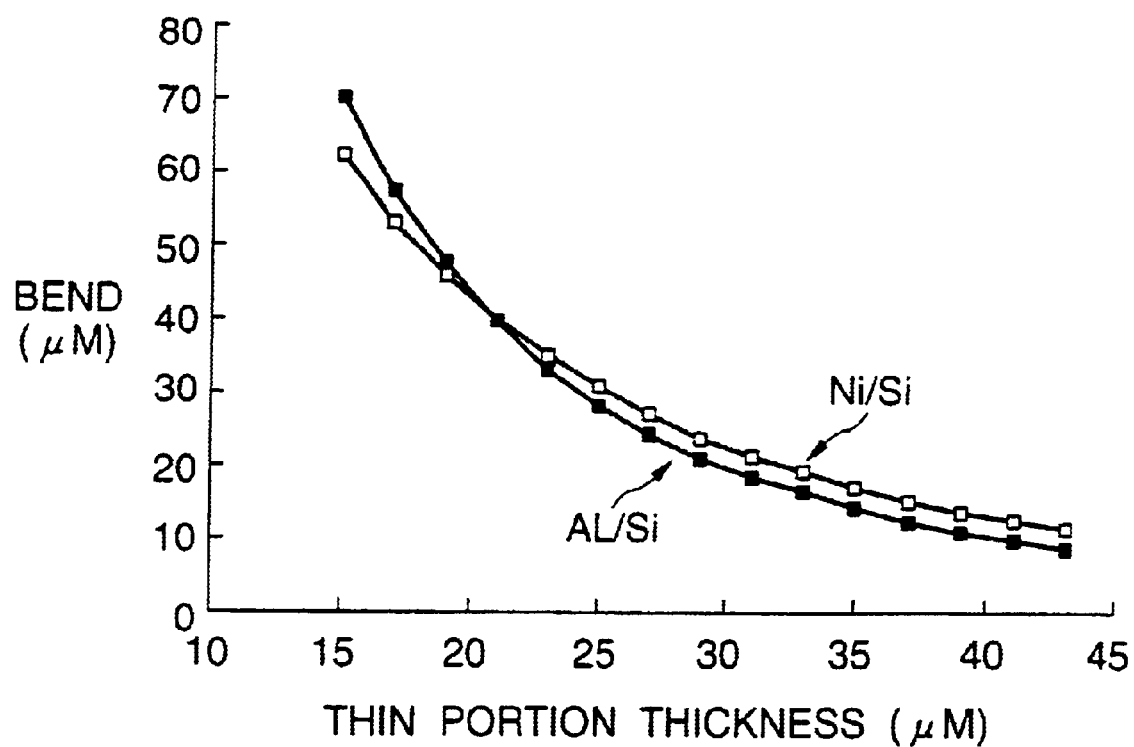
FIG. 51 is a relation drawing used to describe the function of the semiconductor microrelay in FIG. 41.

FIG. 51 shows the displacement characteristics of the flexible area 42 with the thin film 42M made of aluminum and that with the thin film 42M made of nickel as the thickness of the thin portion 42S made of silicon is changed, wherein the aluminum film and the nickel film are each 5 $\mu$m thick and the temperature of the flexible area 42 is 200° C. As seen in the figure, when the thin portion 42S is 20 $\mu$m thick, the characteristics of the flexible area 42 with aluminum and that with nickel are inverted and when the thin portion 42S becomes more than 20 $\mu$m thick, the displacement characteristic of the flexible area 42 with the thin film 42M made of nickel becomes larger than that with the thin film 42M made of aluminum. Thus, if the thin portion 42S is thick, a good characteristic can be provided by using nickel as the thin film 42M.

Figure 52:
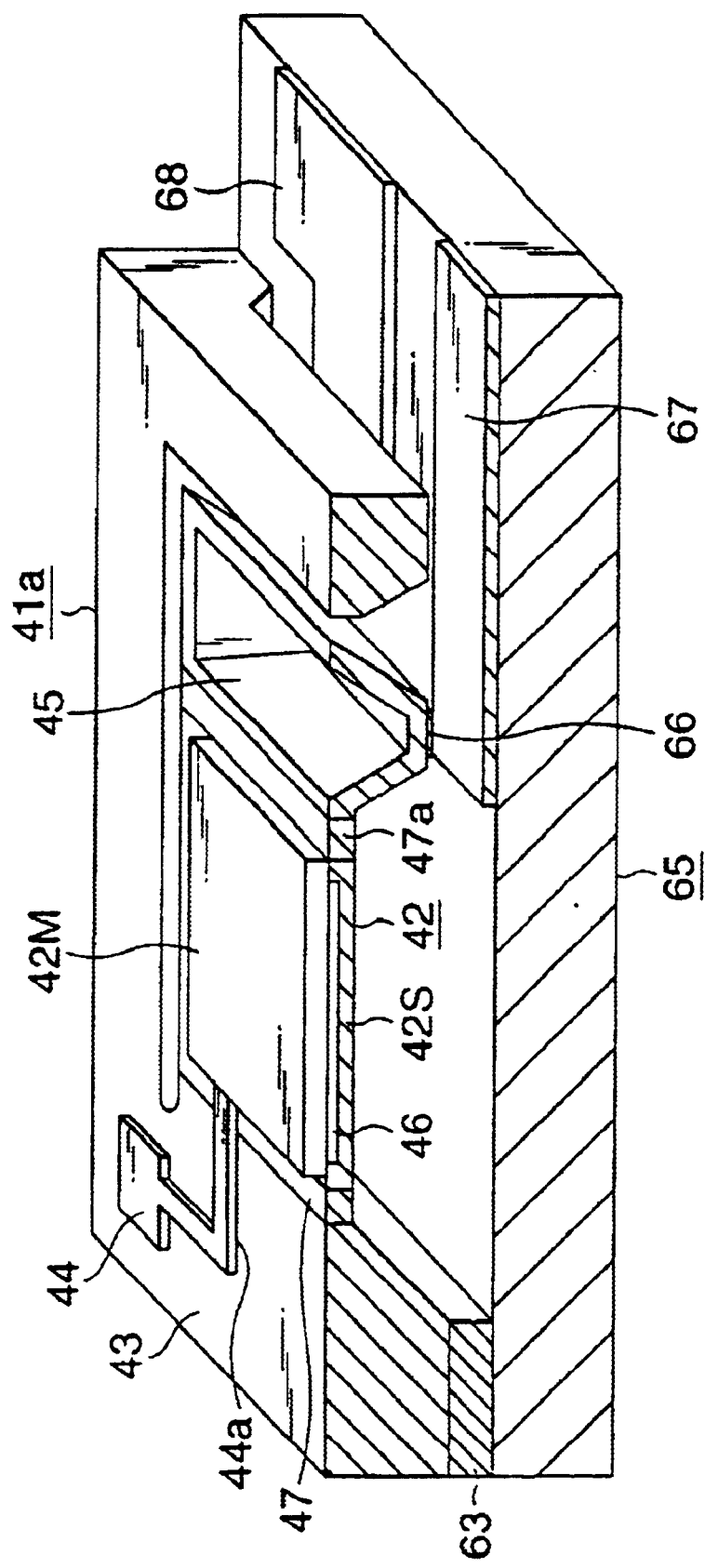
FIG. 52 is a partially cutaway view in perspective of the structure of another semiconductor microrelay.
Figure 53:
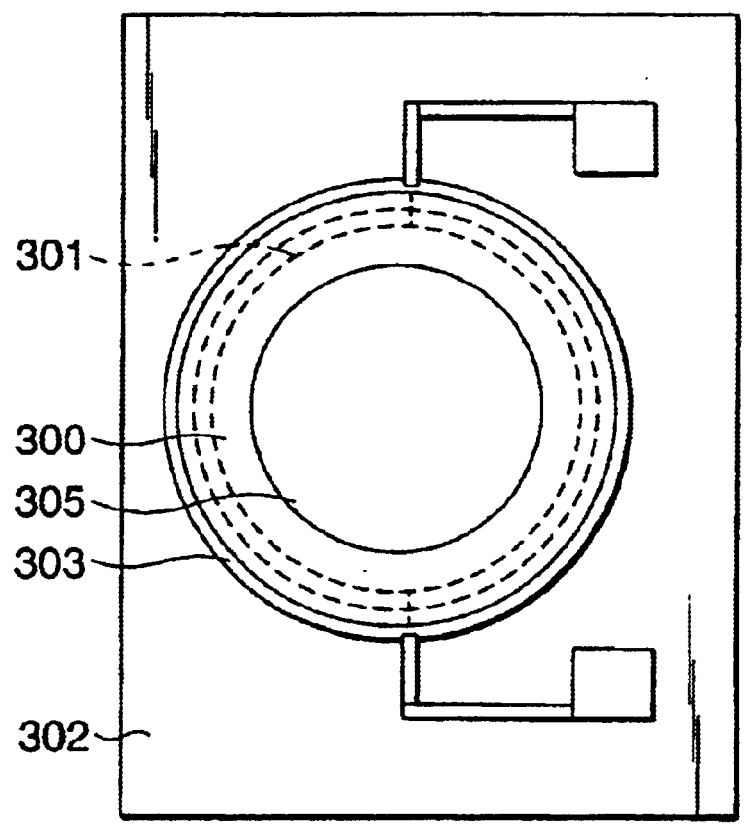
FIG. 53 is a top view to show the structure of a semiconductor microactuator in a related art.
Figure 54:
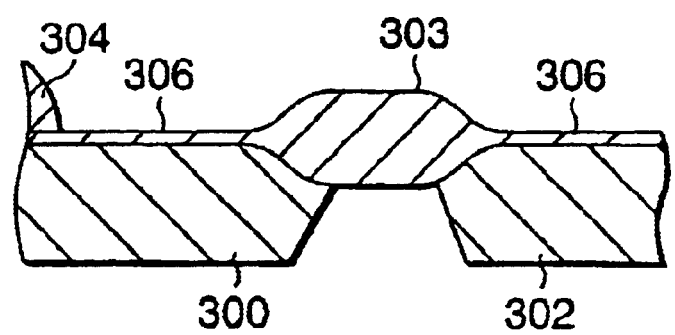
FIG. 54 is a sectional view to show the structure of the semiconductor microactuator in the related art.
Figure 55:
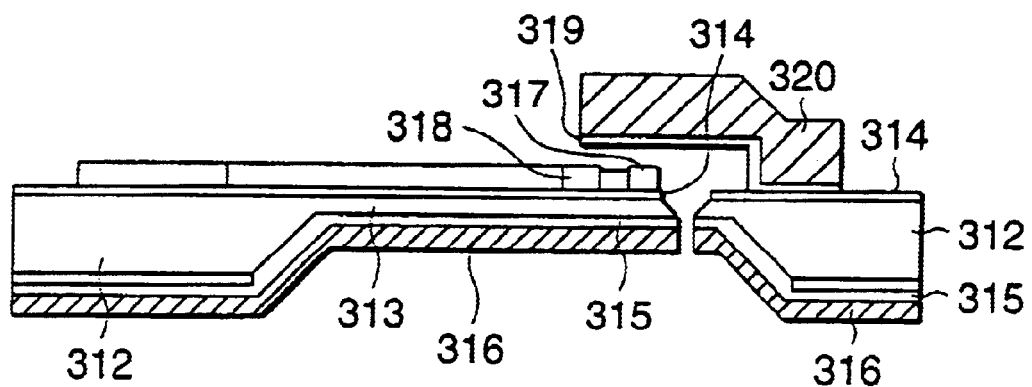
FIG. 55 is a sectional view to show the structure of a semiconductor microrelay in a related art.
Figure 56:
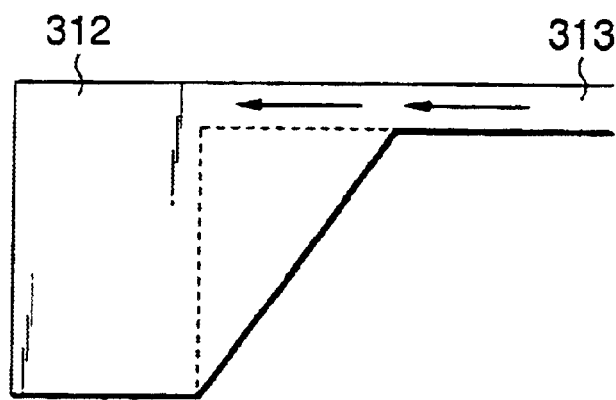
FIG. 56 is a schematic drawing used to describe the function of the semiconductor microrelay in the related art.

FIG. 52 shows another configuration example of the semiconductor microrelay in the embodiment. The semiconductor microrelay in FIG. 52 differs from that in FIG. 41 in that it includes the fixed piece 65 and the semiconductor microactuator 41a joined via a spacer layer 63 made of polyimide (for example, anodic junction). The stress occurring between the fixed piece 65 and the semiconductor microactuator 41a can be absorbed and eased, as in the embodiment previously described with reference to FIG. 28.

Figure 57:
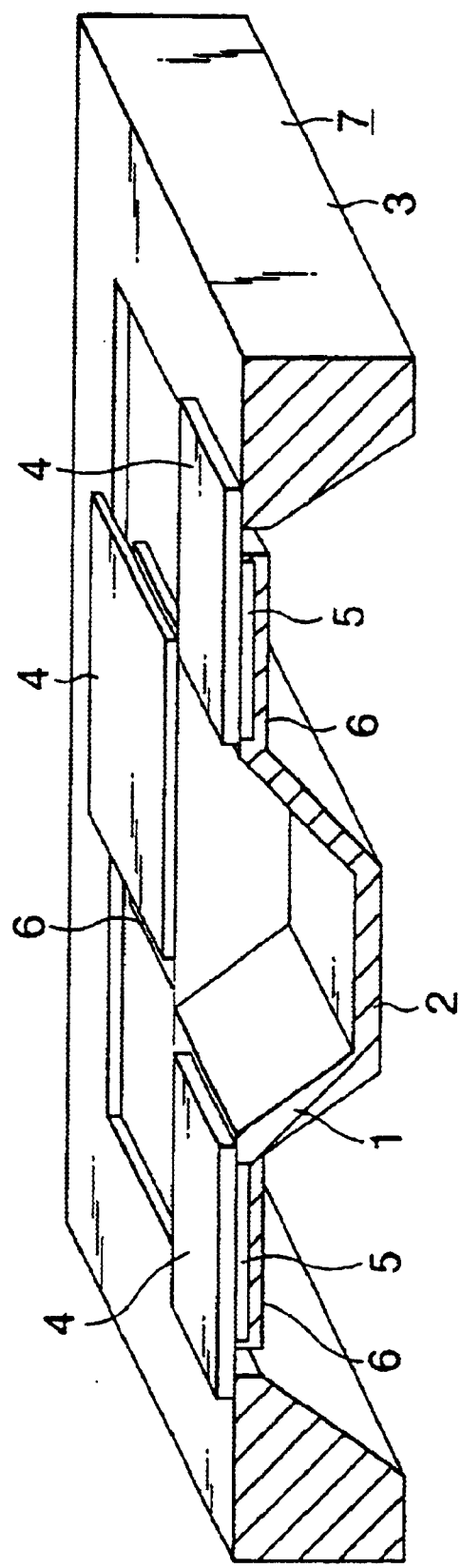
FIG. 57 is a partially cutaway view in perspective of the structure of a semiconductor microactuator using a semiconductor device corresponding to another embodiment of the invention.
Figure 58A:
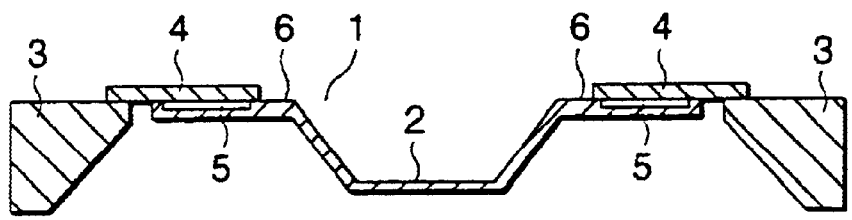
FIG. 58(a) is a sectional view to show the structure of the semiconductor microactuator in FIG. 57.
Figure 58B:
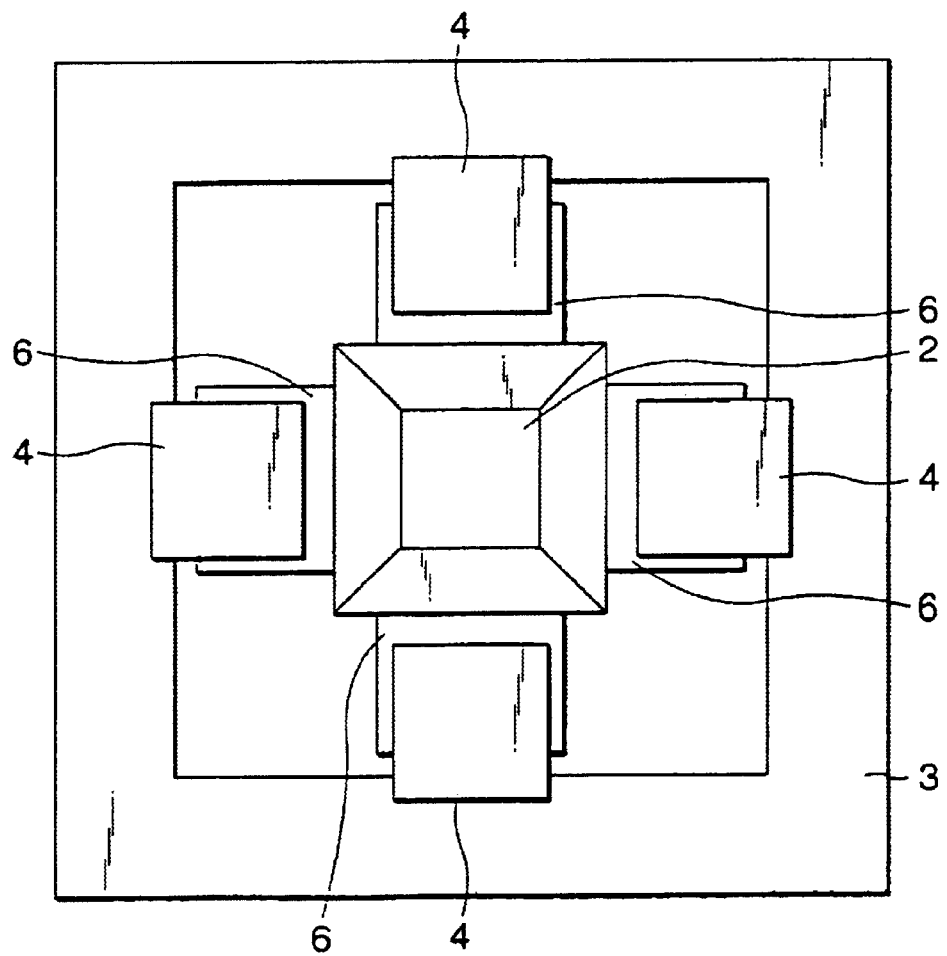
FIG. 58(b) is a top view to show the structure of the semiconductor microactuator in FIG. 57.

FIGS. 57 and 58 show another configuration example of the semiconductor microactuator. FIG. 58(a) is a sectional view and FIG. 58(b) is a top view. A semiconductor microactuator 7 shown in these figures is defined by the semiconductor substrate 3, made of the silicon or the like, which becomes a hollow parallelepiped shaped frame and a moving element 1, made of the silicon or the like, jointed at four portions through suspending means 4 from an inner side of the semiconductor substrate to suspend the moving element 1 from the semiconductor substrate 3.

The moving element 1 is shaped in a hollow truncated right pyramid in such a manner that quadrangle shaped portion is gradually reduced in an area along with a downwardly direction. A boss 2 is defined by the lower quadrangle portion of the truncated right pyramid. The boss 2 is suspended by cantilevered beam 6 in such a manner that each cantilevered beam extends in a downwardly direction from one side of upper quadrangle of the truncated right pyramid. Each cantilevered beam 6 of four them serves as the extended leg portion of the crosswise through the boss 2. The suspending means 4 is made of polyimide, fluoridated resin or the like and is formed in such a manner that the surface of the semiconductor substrate 3 is jointed to the suspending means 4 contacted overlappingly to the upper side of the cantilevered beam 6 to join the semiconductor substrate 3 and the moving element 1. The cantilevered beam 6 is provided with heating means 5, made of the diffusion resistor or the like, for heating the cantilevered beam 6.

Figure 59:
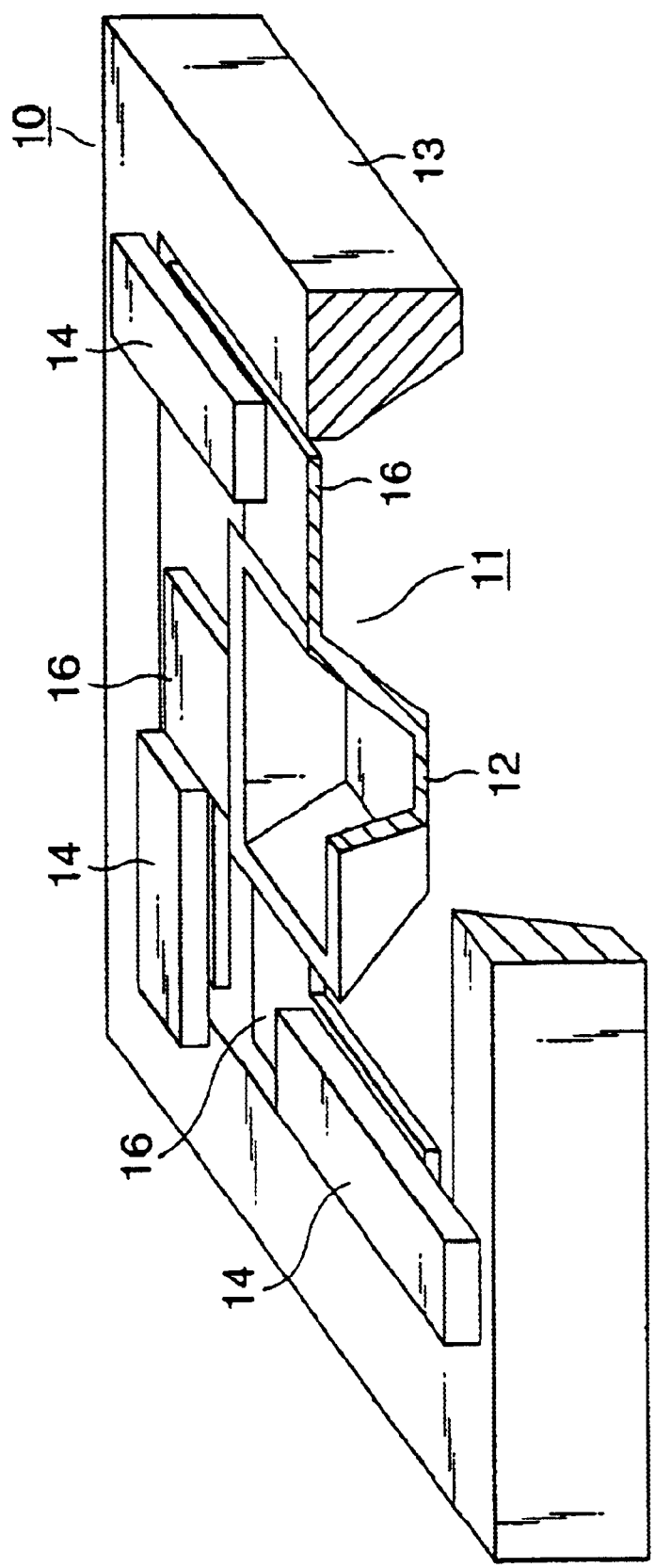
FIG. 59 is a partially cutaway view in perspective of the structure of a semiconductor microactuator using a semiconductor device corresponding to another embodiment of the invention.
Figure 60:
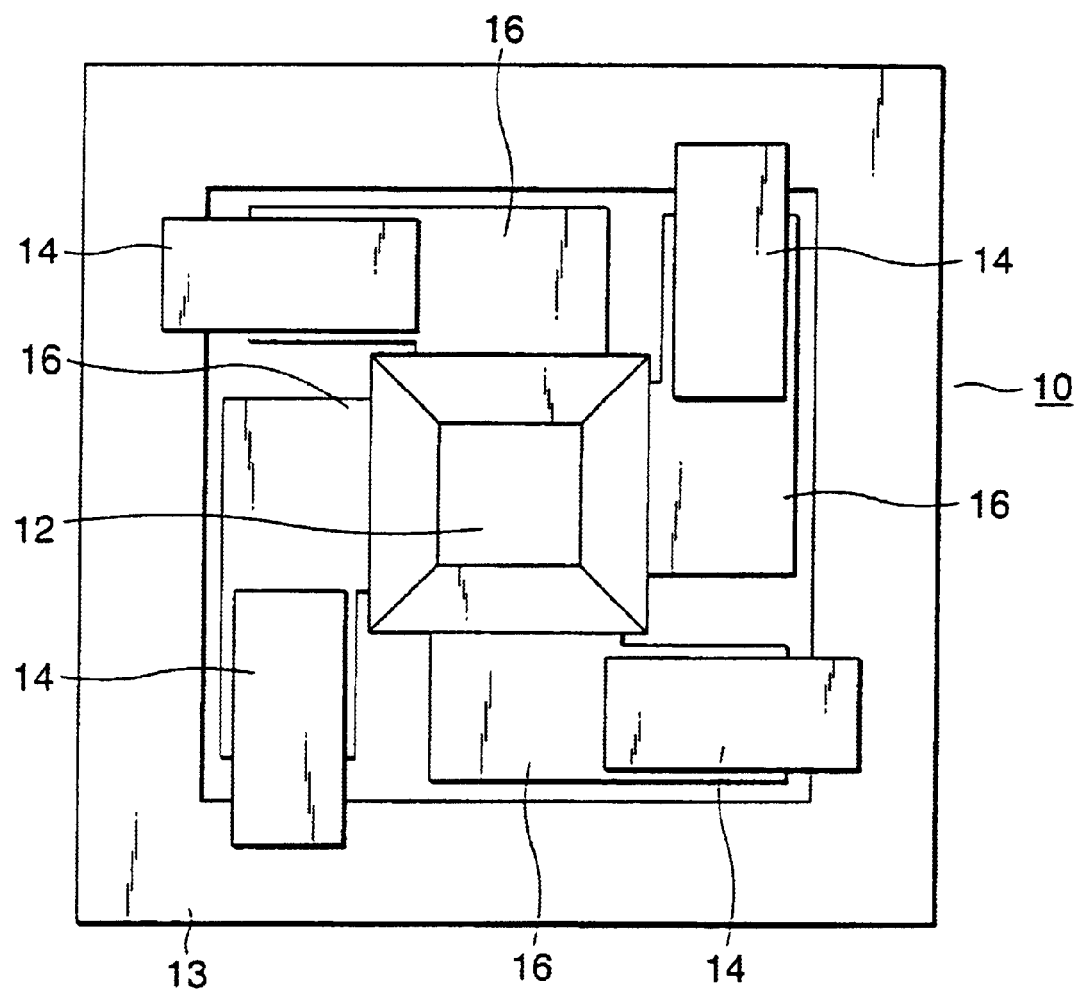
FIG. 60 is a top view to show the structure of the semiconductor microactuator in FIG. 59.

FIGS. 59 and 60 show another configuration example of the semiconductor microactuator. FIG. 59 is a partially cut away view in perspective of the structure of a semiconductor microactuator using semiconductor device of the present invention. FIG. 60 is a top view. A semiconductor microactuator 10 shown in these figures is defined by the semiconductor substrate 13, made of the silicon or the like, which becomes a hollow parallelepiped shaped frame and a moving element 11, made of the silicon or the like, jointed at four portions through suspending means 14 from an inner side of the semiconductor substrate to suspend the moving element 11 from the semiconductor substrate 13.

The moving element 11 is shaped in a hollow truncated right pyramid in such a manner that quadrangle shaped portion is gradually reduced in an area along with a downwardly direction. A boss 12 is defined by the lower quadrangle portion of the truncated right pyramid. The boss 12 is suspended by cantilevered beam 16 in such a manner that each cantilevered beam extends in a downwardly direction from one side of upper quadrangle of the truncated right pyramid. Each cantilevered beam 16 of four them serves as the extended leg portion of the gammadion through the boss 12. The suspending means 4 is made of polyimide, fluoridated resin or the like and is formed in such a manner that the surface of the semiconductor substrate 13 is jointed to the suspending means 14 contacted overlappingly to the upper side of the cantilevered beam 16 to join the semiconductor substrate 13 and the moving element 11.

Figure 61:
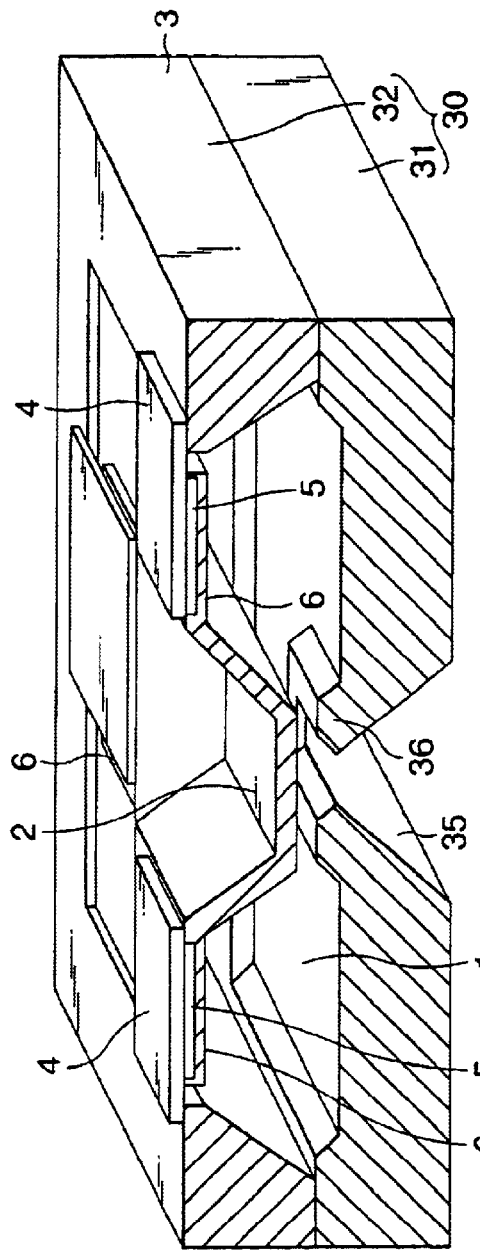
FIG. 61 is a partially cutaway view in perspective of the structure of a semiconductor microvalve using a semiconductor device corresponding to another embodiment of the invention.

FIG. 61 shows another configuration example of the semiconductor microvalve, and is a partially cut away view in perspective of the structure of a semiconductor microvalve using semiconductor device of the present invention. A semiconductor microvalve 30 is defined by a valve mount 31 serving as a fluid control element and a valve body 32 joined to the upper portion of the valve mount 31 through anodic junction or eutectic junction. This valve body employs the structure as same as the microactuator as shown in FIGS. 57 and 58.

A orifice 35 is provided on the surface of the valve mount 31 to be confronted with a boss 2 of the valve body 32, and serves as a hole portion corresponding to the fluid flow path. A mount portion 36 with an upper flat surface is formed by projecting a portion vicinity of the orifice 35 to surround the orifice 35.

At that time, a current flows to the heating means 5 to deform the beam of the moving element 1 so as to actuate the moving element 1. An actuation of the moving element 1 changes the gap defined by the bottom surface of the boss 2 of the valve body 41 and the mount portion 36 to control a flow amount passing through the orifice 35.

Figure 62:
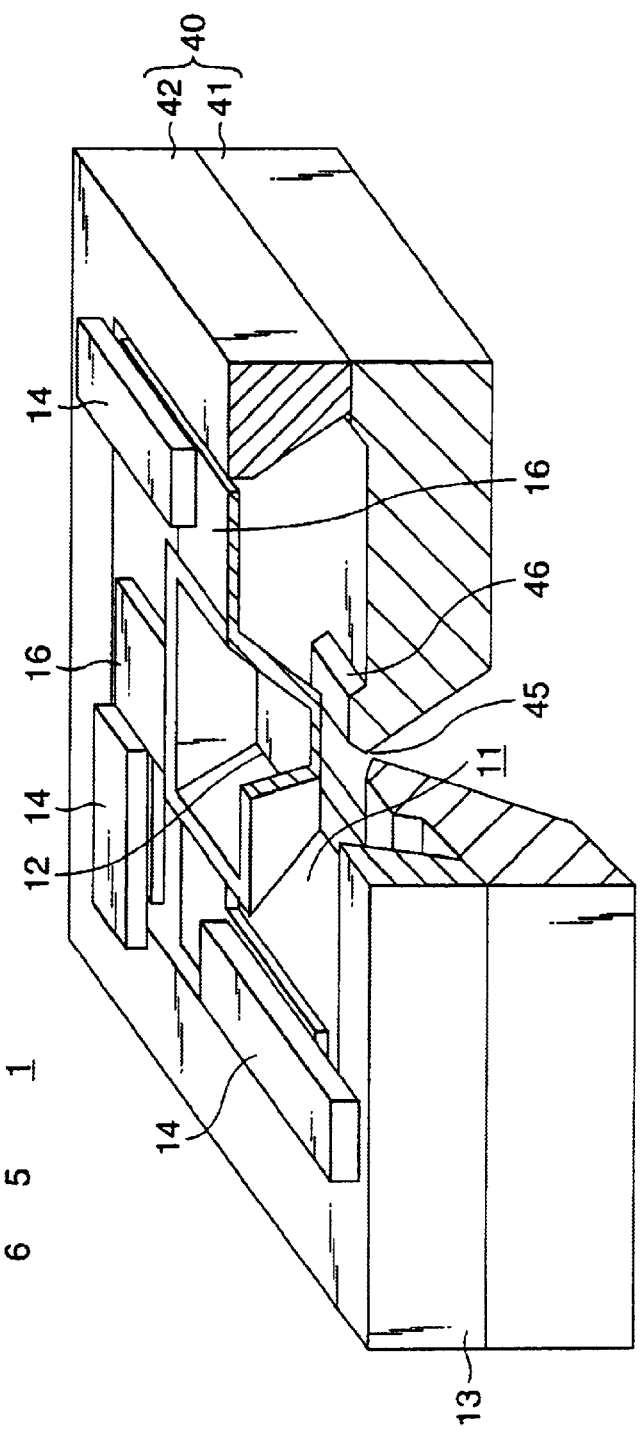
FIG. 62 is a partially cutaway view in perspective of the structure of a semiconductor microvalve using a semiconductor device corresponding to another embodiment of the invention.

FIG. 62 shows another configuration example of the semiconductor microvalve, and is a partinally cut away view in perspective of the structure of a semiconductor microvalve using semiconductor device of the present invention. A semiconductor microvalve is defined by a valve mount 41 serving as a fluid control element and a valve body 42 joined to the upper portion of the valve mount 41 through anodic junction or eutectic junction. This valve body employs the structure as same as the microactuator 10 as shown in FIGS. 59 and 60.

A orifice 45 is provided on the surface of the valve mount 41 to be confronted with a boss 12 of the valve body 42, and serves as a hole portion corresponding to the fluid flow path. A mount portion 46 with an upper flat surface is formed by projecting a portion vicinity of the orifice 45 to surround the orifice 45.

At that time, a current flows to the heating means (not shown in Figures) to deform the beam 16 of the moving element 11 so as to actuate the moving element 11. An actuation of the moving element 1 changes the gap defined by the bottom surface of the boss 12 of the valve body 41 and the mount portion 46 to control a flow amount passing through the orifice 45.

As described above, the semiconductor microactuator using the semiconductor device, the semiconductor microvalve, and the semiconductor microrelay in the related arts require large power consumption and thus it becomes difficult to drive them with a battery and it is made impossible to miniaturize them for portable use.

It is therefore an object of the invention to provide a semiconductor device with small power consumption, manufactured by an easy manufacturing process, a semiconductor microactuator using the semiconductor device, a semiconductor microvalve, a semiconductor microrelay, and a semiconductor microactuator manufacturing method.

Means for Solving the Problem

To the end, according to a first aspect of the present invention, there is provided a semiconductor device comprising a semiconductor substrate, a flexible area being isolated from the semiconductor substrate and displaced in response to temperature change, and a thermal insulation area being placed between the semiconductor substrate and the flexible area and made of a resin for joining the semiconductor substrate and the flexible area. The thermal insulation area made of a resin is placed between the semiconductor substrate and the flexible area, whereby heat escape when the temperature of the flexible area is changed is prevented, so that power consumption can be suppressed and further the manufacturing method is simple.

In a second aspect to the present invention, in the semiconductor device as first aspect of the present invention, the material of which the thermal insulation area is made has a thermal conductivity coefficient of about 0.4 W/(m° C.) or less. The heat insulation properties between the flexible area and the semiconductor substrate are enhanced.

In a third aspect of the present invention, in the semiconductor device as the second aspect of the present invention, the material of which the thermal insulation area is made is polyimide. The heat insulation properties between the flexible area and the semiconductor substrate are enhanced and manufacturing the semiconductor device is facilitated.

In a fourth aspect of the present invention, in the third aspect of the present invention, the material of which the thermal insulation area is made is a fluoridated resin. The heat insulation properties between the flexible area and the semiconductor substrate are enhanced and manufacturing the semiconductor device is facilitated.

In a fifth aspect of the present invention, in the first to fourth aspect of the present invention, a reinforcement layer made of a harder material than the material of which the thermal insulation area is made is provided on at least one face orthogonal to a thickness direction of the thermal insulation area. The joint strength of the semiconductor substrate and the flexible area can be increased.

In a sixth aspect of the present invention, in the fifth aspect of the present invention, the reinforcement layer has a Young's modulus of $9.8 \times 10^9$ N/m$^2$ or more. The joint strength of the semiconductor substrate and the flexible area can be increased.

In a seventh aspect of the present invention, in the sixth aspect of the present invention, the reinforcement layer is a silicon dioxide thin film. The joint strength of the semiconductor substrate and the flexible area can be increased.

In an eighth aspect of the present invention, in the first to seventh aspect of the present invention, the portions of the semiconductor substrate and the flexible area in contact with the thermal insulation area form comb teeth. The joint strength of the semiconductor substrate and the flexible area can be increased.

According to a ninth aspect of the present invention, there is provided a semiconductor device comprising a semiconductor device as the first to eighth aspect of the present invention and a moving element placed contiguous with the flexible area, wherein when temperature of the flexible area changes, the moving element is displaced relative to the semiconductor substrate. The semiconductor device which has similar advantages to those in the invention as claimed in claims 1 to 8 as well as can be driven with low power consumption can be provided.

In a tenth aspect of the present invention, in the ninth aspect of the present invention, the flexible area has a cantilever structure. The semiconductor device can be provided with large displacement of the moving element.

In an eleventh aspect of the present invention, in ninth aspect of the present invention, the moving element is supported by a plurality of flexible areas. The moving element can be supported stably.

In a twelfth aspect of the present invention, in the eleventh aspect of the present invention, the flexible areas are in the shape of a cross with the moving element at the center. Good displacement accuracy of the moving element can be provided.

In a thirteenth aspect of the present invention, in the ninth aspect of the present invention, displacement of the moving element contains displacement rotating in a horizontal direction to a substrate face of the semiconductor substrate. The displacement of the moving element becomes large.

In a fourteenth aspect of the present invention, in the eleventh or thirteenth aspect of the present invention, the flexible areas are four flexible areas each shaped like L, the four flexible areas being placed at equal intervals in every direction with the moving element at the center. The lengths of the flexible areas can be increased, so that the displacement of the moving element can be made large.

In a fifteenth aspect of the present invention, in the ninth to fourteenth aspect of the present invention, the flexible area is made up of at least two areas having different thermal expansion coefficients and is displaced in response to the difference between the thermal expansion coefficients. As the temperature of the flexible area is changed, the flexible area can be displaced.

In a sixteenth aspect of the present invention, in the fifteenth aspect of the present invention, the flexible area includes an area made of silicon and an area made of aluminum. As the temperature of the flexible area is changed, the flexible area can be displaced because of the thermal expansion difference between aluminum and silicon.

In a seventeenth aspect of the present invention, in the fifteenth aspect of the present invention, the flexible area includes an area made of silicon and an area made of nickel. As the temperature of the flexible area is changed, the flexible area can be displaced because of the thermal expansion difference between nickel and silicon.

In a eighteenth aspect of the present invention, in the fifteenth aspect of the present invention, at least one of the areas making up the flexible area is made of the same material as the thermal insulation area. Since the flexible area and the thermal insulation area can be formed at the same time, the manufacturing process is simplified and the costs can be reduced.

In a nineteenth aspect of the present invention, in the eighteenth aspect of the present invention, the flexible area includes an area made of silicon and an area made of polyimide as the area made of the same material as the thermal insulation area. In addition to a similar advantage to that in the invention, as the temperature of the flexible area is changed, the flexible area can be displaced because of the thermal expansion difference between silicon and polyimide, and the heat insulation properties of the flexible area owing to polyimide.

In a twentieth aspect of the present invention the invention, in the eighteenth aspect of the present invention, the flexible area includes an area made of silicon and an area made of a fluoridated resin as the area made of the same material as the thermal insulation area. In addition to a similar advantage, as the temperature of the flexible area is changed, the flexible area can be displaced because of the thermal expansion difference between silicon and the fluoridated resin, and the heat insulation properties of the flexible area owing to the fluoridated resin.

In a twenty-first aspect of the present invention, in the ninth to fourteenth aspect of the present invention, the flexible area is made of a shape memory alloy. As the temperature of the flexible area is changed, the flexible area can be displaced.

In a twenty-second aspect of the present invention, in the ninth to twenty-first aspect of the present invention, a thermal insulation area made of a resin for joining the flexible area and the moving element is provided between the flexible area and the moving element. The heat insulation properties between the flexible area and the moving element can be provided and power consumption when the temperature of the flexible area is changed can be more suppressed.

In a twenty-third aspect of the present invention, in the twenty-second aspect of the present invention, wherein rigidity of the thermal insulation area provided between the semiconductor substrate and the flexible area is made different from that of the thermal insulation area provided between the flexible area and the moving element. The displacement direction of the moving element can be determined depending on the rigidity difference between the thermal insulation areas.

In a twenty-fourth aspect of the present invention, in the ninth to twenty-third aspects of the present invention, the flexible area contains heat means for heating the flexible area. The semiconductor device can be miniaturized.

In a twenty-fifth aspect of the present invention, in the ninth to twenty-fifth aspects of the present invention, wiring for supplying power to the heat means for heating the flexible area is formed without the intervention of the thermal insulation area. The heat insulation distance of the wiring can be increased and the heat insulation properties of the flexible area can be enhanced.

In a twenty-sixth aspect of the present invention, in the ninth to twenty-fifth aspect of the present invention, the moving element is formed with a concave part. The heat capacity of the moving element is lessened, so that the temperature change of the flexible area can be accelerated.

In a twenty-seventh aspect of the present invention, in the ninth to twenty-sixth aspects of the present invention, a round for easing a stress is provided in the proximity of the joint part of the flexible area and the moving element or the semiconductor substrate. The stress applied in the proximity of the joint part when the flexible area is displaced is spread by means of the round, whereby the part can be prevented from being destroyed.

In a twenty-eighth aspect of the present invention, in the twenty-seventh aspect of the present invention, the semiconductor substrate is formed with a projection part projecting toward the joint part to the flexible area and the round is formed so that the shape of the round on the substrate face on the semiconductor substrate becomes like R at both ends of the base end part of the projection part. The stress applied to both ends of the base end part of the projection part when the flexible area is displaced is spread by means of the round, whereby the portion can be prevented from being destroyed.

In a twenty-ninth aspect of the present invention, in twenty-seventh aspect of the present invention, the semiconductor substrate is etched from the substrate face to make a concave part, the flexible area is formed in a bottom face part of the concave part, and the round is formed so as to become shaped like R on the boundary between the bottom face part and a flank part of the concave part. The stress applied to the boundary between the bottom face part and the flank part of the concave part when the flexible area is displaced is spread by means of the round, whereby the portion can be prevented from being destroyed.

According to a thirtieth aspect of the present invention, there is provided a semiconductor microvalve comprising a semiconductor device in any of ninth to twenty-ninth aspects and a fluid element being joined to the semiconductor device and having a flow passage with a flowing fluid quantity changing in response to displacement of the moving element. The semiconductor microvalve which has similar advantages in ninth to twenty-ninth aspect of the present invention as well as can be driven with low power consumption can be provided.

In a thirty-first aspect of the present invention, in the thirties of the present invention, the semiconductor device and the fluid element are joined by anodic junction. It is made possible to join the semiconductor device and the fluid element.

In a thirty-second aspect of the present invention, in the thirties aspect of the present invention, the semiconductor device and the fluid element are joined by eutectic junction. It is made possible to join the semiconductor device and the fluid element.

In a thirty-third aspect of the present invention, in the thirtieth aspect of the present invention, the semiconductor device and the fluid element are joined via a spacer layer. The thermal expansion difference between the semiconductor device and the fluid element when they are joined is absorbed in the spacer layer and the stress applied to the flexible area can be suppressed.

In a thirty-fourth aspect of the present invention, in the thirty-third aspect of the present invention, the spacer layer is made of polyimide. The thermal expansion difference between the semiconductor device and the fluid element when they are joined is absorbed because of elasticity of polyimide and the stress applied to the flexible area can be suppressed.

According to a thirty-fifth aspect of the present invention, there is provided a semiconductor microrelay comprising a semiconductor device as the ninth to twenty ninth aspect of the present invention and a fixed element being joined to the semiconductor device and having fixed contacts being placed at positions corresponding to a moving contact provided on the moving element, the fixed contacts being able to come in contact with the moving contact. The semiconductor microrelay which has similar advantages to those in the invention as claimed in claims 9 to 29 as well as can be driven with low power consumption can be provided.

In a thirty-sixth aspect of the present invention, in the thirty-fifth aspect of the present invention, the fixed contacts are placed away from each other and come in contact with the moving contact, whereby they are brought into conduction via the moving contact. The semiconductor microrelay wherein the fixed contacts placed away from each other can be brought into conduction can be provided.

In a thirty-seventh aspect of the present invention, in the thirty-fifth or thirty-sixth aspect of the present invention, the moving contact and the fixed contacts are gold cobalt. The moving contact and the fixed contacts can be brought into conduction.

In a thirty-eighth aspect of the present invention, in the thirty-fifth to thirty-seventh aspect of the present invention, the semiconductor device and the fixed element are joined by anodic junction. It is made possible to join the semiconductor device and the fixed element.

In a thirty-ninth aspect of the present invention, in the thirty-fifth to thirty-seventh aspect of the present invention, the semiconductor device and the fixed element are joined by eutectic junction. It is made possible to join the semiconductor device and the fixed element.

In a fortieth aspect of the present invention, in the thirty-fifth to thirty-seventh aspect of the present invention, the semiconductor device and the fixed element are joined via a spacer layer. The thermal expansion difference between the semiconductor device and the fluid element when they are joined is absorbed in the spacer layer and the stress applied to the flexible area can be suppressed.

In a forty-first aspect of the present invention, in the fortieth aspect of the present invention, the spacer layer is made of polyimide. The thermal expansion difference between the semiconductor device and the fluid element when they are joined is absorbed because of elasticity of polyimide and the stress applied to the flexible area can be suppressed.

According to a forty-second aspect of the present invention, there is provided a manufacturing method of a semiconductor device in the eighteenth aspect of the present invention prepared by a process comprising the steps of:

etching and removing one face of the semiconductor substrate to form a bottom face part as one area forming a part of the flexible area;

etching and removing the other face of the semiconductor substrate to form the concave part in the moving element;

etching and removing the other face of the semiconductor substrate to form at least a portion which becomes the thermal insulation area placed between the semiconductor substrate and the flexible area;

filling the portion which becomes the thermal insulation area with a thermal insulation material to form the thermal insulation area; and applying a coat of the thermal insulation material to the one face of the semiconductor substrate to form one area forming a part of the flexible area.

The thermal insulation area and one area forming a part of the flexible area are formed of the same material at the same time, whereby the manufacturing process is simplified and the costs can be reduced.

According to a forty-third aspect of the present invention, there is provided a manufacturing method of a semiconductor device area;

etching and removing the other face of the semiconductor substrate to form the concave part in the moving element;

etching and removing the other face of the semiconductor substrate to form at least a portion which becomes the thermal insulation area placed between the semiconductor substrate and the flexible area;

forming a wire for applying an electric power to the heating means;

filling the portion which becomes the thermal insulation area with a thermal insulation material to form the thermal insulation area; and forming a nickel thin film as an area defined in the flexible area on the other face of the semiconductor substrate, whereby the area defined by nickel could be formed in the flexible area.

According to a forty-fifth aspect of the present invention there is provided a manufacturing method of a semiconductor device in the first aspect of the present invention prepared by a process comprising the steps of:

etching and removing one face of the semiconductor substrate to form at least a portion which becomes the thermal insulation area placed between the semiconductor substrate and the flexible area;

filling the portion which becomes the thermal insulation area with a thermal insulation material to form the thermal insulation area; and etching and removing the other face of the semiconductor substrate to form the thermal insulation area, whereby the thermal isolation area could be placed between the semiconductor substrate and the flexible area.

According to a forty-sixth aspect of the present invention, there is provided a manufacturing method of a semiconductor device in the fifth aspect of the present invention prepared by a process comprising the steps of:

etching and removing one face of the semiconductor substrate to form at least a portion which becomes the thermal insulation area placed between the semiconductor substrate and the flexible area;

forming a reinforce layer in the thermal insulation area;

filling the portion which becomes the thermal insulation area with a thermal insulation material to form the thermal insulation area; and etching and removing the other face of the semiconductor substrate to form the thermal insulation area, whereby the thermal isolation area could be placed between the semiconductor substrate and the flexible area and the reinforce layer could be formed in the thermal insulation area.

What is claimed is:

1. A semiconductor microvalve comprising:
   a semiconductor substrate;
   a flexible member isolated from said semiconductor substrate and displaced in response to temperature change;
   a thermal isolation member placed between said semiconductor substrate and said flexible member and made of a resin for joining said semiconductor substrate and said flexible member; and
   a moving element placed contiguous with the flexible member, said moving element being displaced relative to the semiconductor substrate when temperature of the flexible member changes;
   a fluid element being joined to said semiconductor device and having a flow passage with a flowing fluid quantity changing in response to displacement of the moving element, and
   wherein portions of said semiconductor substrate and said flexible member in contact with said thermal isolation member form comb teeth.

2. The semiconductor microvalve as claimed in claim 1, wherein said semiconductor device and said fluid element are joined via a spacer layer.

3. The semiconductor device as claimed in claim 1, wherein the material of which said thermal isolation member is made has a thermal conductivity coefficient of about 0.4 W/(m° C.) or less.

4. The semiconductor device as claimed in claim 1, wherein the material of which said thermal isolation member is made is polyimide.

5. The semiconductor device as claimed in claim 1, wherein the material of which said thermal isolation member is made is a fluoridated resin.

6. The semiconductor device as claimed in claim 1, wherein a reinforcement layer made of a harder material than the material of which said thermal isolation member is made is provided on at least one face orthogonal to a thickness direction of said thermal isolation member.

7. The semiconductor device as claimed in claim 6, wherein the reinforcement layer has a Young's modulus of $9.8 \times 10^9$ N/m$^2$ or more.

8. The semiconductor device as claimed in claim 6, wherein the reinforcement layer is a silicon dioxide thin film.

9. The semiconductor device as claimed in claim 1, wherein the flexible member has a cantilever structure.

10. The semiconductor device as claimed in claim 1, wherein said moving element is supported by a plurality of flexible members.

11. The semiconductor device as claimed in claim 10, wherein the flexible members are in the shape of a cross with said moving element at the center.

12. The semiconductor device as claimed in claim 10, wherein displacement of said moving element includes displacement rotating in a horizontal direction to a substrate face of the semiconductor substrate.

13. The semiconductor device as claimed in claim 10, wherein the flexible members are four flexible members each shaped in L, the four flexible members being placed at equal intervals in every direction with said moving element at the center.

14. The semiconductor device as claimed in claim 1, wherein the flexible member is made up of at least two members having different thermal expansion coefficients and is displaced in response to a difference between the thermal expansion coeffficients.

15. The semiconductor device as claimed in claim 14, wherein the flexible member includes an member made of silicon and an member made of aluminum.

16. The semiconductor device as claimed in claim 14, wherein the flexible member includes an member made of silicon and an member made of nickel.

17. The semiconductor device as claimed in claim 14, wherein at least one of the members making up the flexible member is made of the same material as the thermal isolation member.

18. The semiconductor device as claimed in claim 17, wherein the flexible member includes an member made of silicon and an member made of polyimide as the member made of the same material as the thermal isolation member.

19. The semiconductor device as claimed in claim 17, wherein the flexible member includes an member made of silicon and an member made of a fluoridated resin as the member made of the same material as the thermal isolation member.

20. The semiconductor device as claimed in claim 1, wherein the flexible member is made of a shape memory alloy.

21. The semiconductor device as claimed in claim 1, wherein a thermal isolation member made of a resin for joining the flexible member and said moving element is provided between the flexible member and said moving element.

22. The semiconductor device as claimed in claim 21, wherein rigidity of the thermal isolation member provided between the semiconductor substrate and the flexible member is made different form that of the thermal isolation member provided between the flexible member and said moving element.

23. The semiconductor device as claimed in claim 1, wherein the flexible member contains a heater for heating the flexible member.

24. The semiconductor device as claimed in claim 23 further comprising:

wiring for supplying power to the heater for heating the flexible member is formed without the intervention of the thermal isolation member.

* * * * *